(12) United States Patent
Hirai et al.

(10) Patent No.: US 6,487,372 B2
(45) Date of Patent: Nov. 26, 2002

(54) PHOTOMETRY DEVICE

(75) Inventors: Isamu Hirai; Yoshikazu Iida, both of Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/897,927

(22) Filed: Jul. 5, 2001

(65) Prior Publication Data

US 2002/0003959 A1 Jan. 10, 2002

(30) Foreign Application Priority Data

Jul. 6, 2000 (JP) ........................................ 2000-204566

(51) Int. Cl.$^7$ ................................................. G03B 7/28
(52) U.S. Cl. ........................................ 396/225; 396/234
(58) Field of Search ................................ 396/225, 233, 396/234

(56) References Cited

U.S. PATENT DOCUMENTS

| | | | |
|---|---|---|---|
| 4,887,121 A | * 12/1989 | Pritchard | 396/225 |
| 5,596,387 A | 1/1997 | Takagi | 396/225 X |
| 5,617,175 A | 4/1997 | Asakura et al. | 396/225 X |
| 5,710,948 A | 1/1998 | Takagi | 396/225 X |
| 5,987,265 A | 11/1999 | Iwasaki | 396/225 |
| 6,128,270 A | 10/2000 | Nishikawa | 369/275.4 |
| 6,175,693 B1 | 1/2001 | Iida | 396/225 X |

FOREIGN PATENT DOCUMENTS

| | | | |
|---|---|---|---|
| JP | 5-340804 | 12/1993 | G01J/1/02 |
| JP | 6-281994 | 10/1994 | G03B/7/28 |
| JP | 7-84299 | 3/1995 | G03B/7/28 |
| JP | 10253449 | 9/1998 | G01J/1/44 |

OTHER PUBLICATIONS

English Language Translation of Japanese Laid Open Publication No. 7–84299A.

* cited by examiner

Primary Examiner—W. B. Perkey
(74) Attorney, Agent, or Firm—Greenblum & Bernstein, P.L.C.

(57) ABSTRACT

A photometry device has a normal light photometry sensor and a external light sensor. The normal light photometry sensor performs photometry with respect to an object. The external light sensor performs photometry with respect color components of the external light. An exposure amount of an object is determined based on an output of a normal light sensor. If a difference between the exposure values is greater than the predetermined value, a color judged in the colorimetry procedure is forcibly set to "colorless" and no substantial colorimetric compensation is performed. If the Bv difference is not greater than the predetermined value, the light source compensation data preliminary stored is used for the colorimetric compensation.

66 Claims, 39 Drawing Sheets

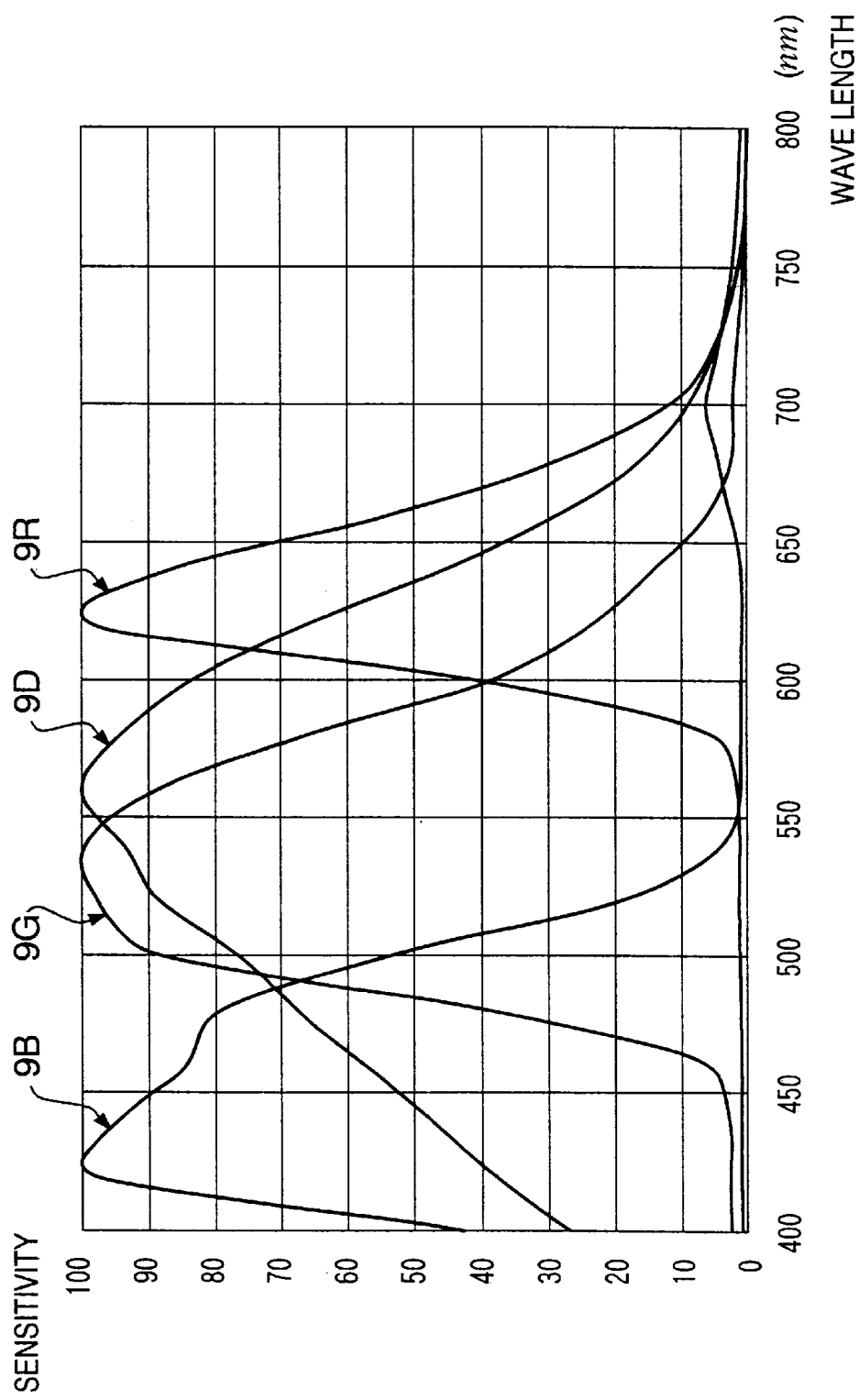

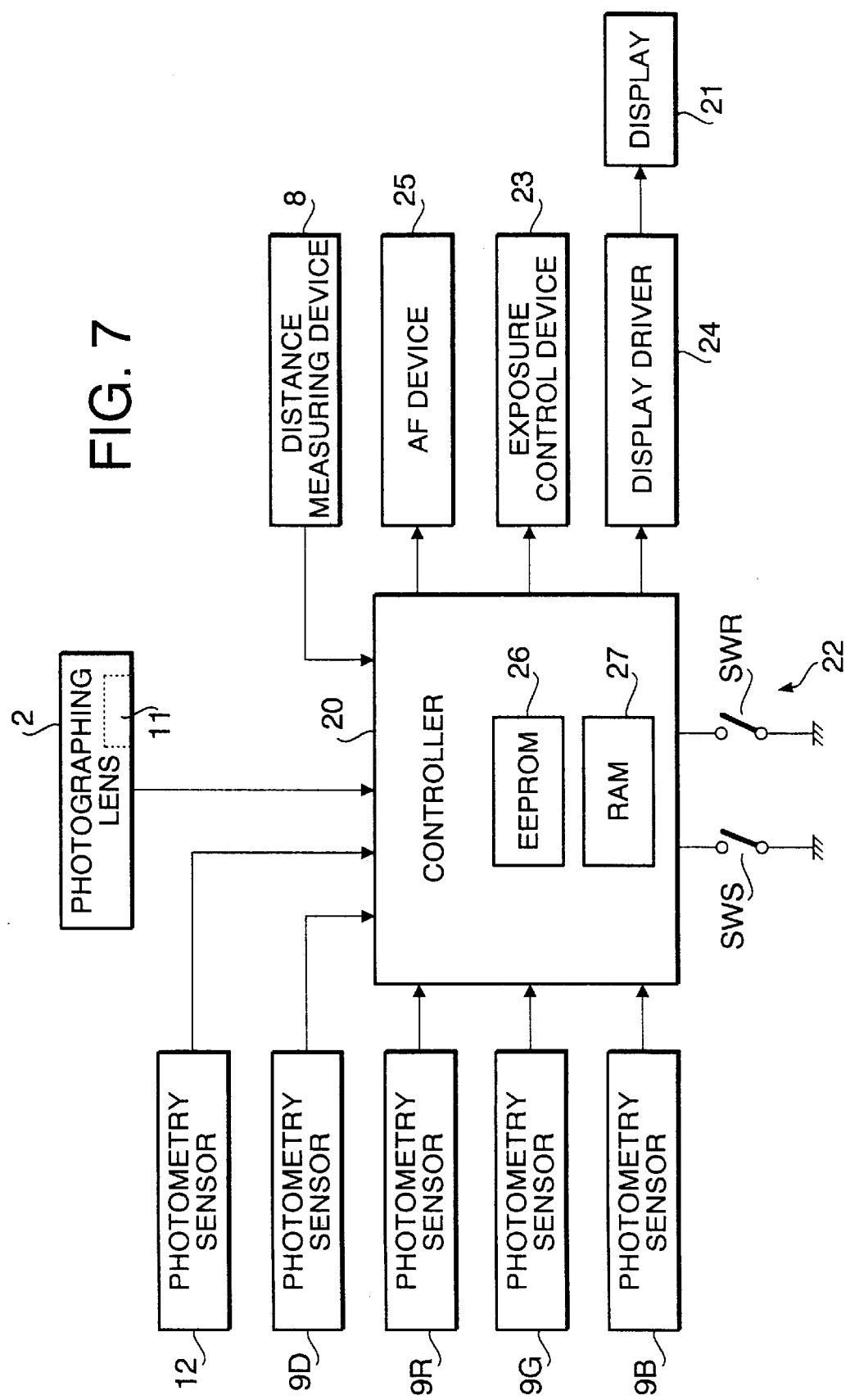

FIG. 8

| PHOTOMETRY MODE | LIGHT SOURCE DATA | | COLORIMETRY | | COLOR JUDGMENT | COLORIMETRIC COMPENSATION AMOUNT |
|---|---|---|---|---|---|---|
| | FIXED (EEPROM) | OUTPUT OF SENSOR | DONE | UNDONE | | |
| 1 | USE | | YES | | COLORLESS | ○ |
| 2 | USE | | | YES | | ○ |
| 3 | USE | | YES | | JUDGED VALUE | CALCULATED VALUE |
| 4 | | USE | YES | | COLORLESS | ○ |
| 5 | | USE | | YES | | ○ |
| 6 | | USE | YES | | JUDGED VALUE | CALCULATED VALUE |
| 7 | SELECT | | YES | | JUDGED VALUE | CALCULATED VALUE |
| 8 | INTERMEDIATE (VARIABLE) | | YES | | JUDGED VALUE | CALCULATED VALUE |

FIG. 9

| PROCEDURE | DRAWINGS | PHOTOMETRY MODE ||||||||
|---|---|---|---|---|---|---|---|---|---|
| | | 1 | 2 | 3 | 4 | 5 | 6 | 7 | 8 |
| MAIN | FIG.10 | ○ | ○ | ○ | ○ | ○ | ○ | ○ | ○ |
| LENS COMMUNICATION | FIG.11 | ○ | ○ | ○ | ○ | ○ | ○ | ○ | ○ |
| PHOTOMETRY SENSOR OUTPUT Bvd CALCULATION | FIG.12 | ○ | ○ | ○ | ○ | ○ | ○ | ○ | ○ |
| PHOTOMETRY SENSOR OUTPUT Bvd CALCULATION | FIG.13 | ○ | ○ | ○ | ○ | ○ | ○ | ○ | ○ |
| PHOTOMETRY SENSOR OUTPUT Bvd CALCULATION | FIG.14 | ○ | ○ | ○ | ○ | ○ | ○ | ○ | ○ |
| COLORIMETRY | FIG.15A | | | ○ | | | ○ | ○ | ○ |
| COLORIMETRY | FIG.15B | ○ | | | ○ | | | | |
| COLORIMETRY | FIG.15C | | ○ | | | ○ | | | |
| Bv DIFFERENCE DETECTION | FIG.16A | ○ | ○ | | ○ | ○ | | | |
| Bv DIFFERENCE DETECTION | FIG.16B | | | | | | | ○ | |
| Bv DIFFERENCE DETECTION | FIG.16C | | | ○ | | | ○ | | ○ |
| LIGHT SOURCE COMPENSATION | FIG.17A | ○ | ○ | ○ | | | | | |
| LIGHT SOURCE COMPENSATION | FIG.17B | | | | ○ | ○ | ○ | | |
| LIGHT SOURCE COMPENSATION | FIGS.18A-18B | | | | | | | ○ | |
| LIGHT SOURCE COMPENSATION | FIG.19 | | | | | | | | ○ |
| LIGHT SOURCE DIFFERENCE COMPENSATION | FIG.20 | ○ | ○ | ○ | ○ | ○ | ○ | ○ | ○ |
| COLORIMETRY PARAMETER CALCULATION | FIG.22 | ○ | ○ | ○ | ○ | ○ | ○ | ○ | ○ |
| COLORIMETRY COEFFICIENTS SETTING | FIG.23 | ○ | ○ | ○ | ○ | ○ | ○ | ○ | ○ |
| COLOR JUDGMENT | FIGS.25-26 | ○ | ○ | ○ | ○ | ○ | ○ | ○ | ○ |
| AREA COLORIMETRY COMPENSATION CALCULATION | FIG.27 | | ○ | ○ | | ○ | ○ | ○ | ○ |
| AREA COLORIMETRY COMPENSATION CALCULATION | FIG.28 | ○ | | | ○ | | | | |
| CC CALCULATION | FIG.29 | ○ | ○ | | ○ | ○ | | ○ | ○ |
| CC CALCULATION | FIG.30 | | | ○ | | | ○ | | |

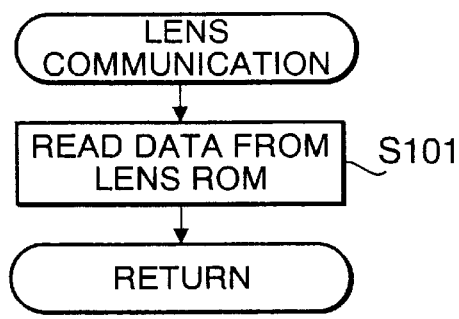
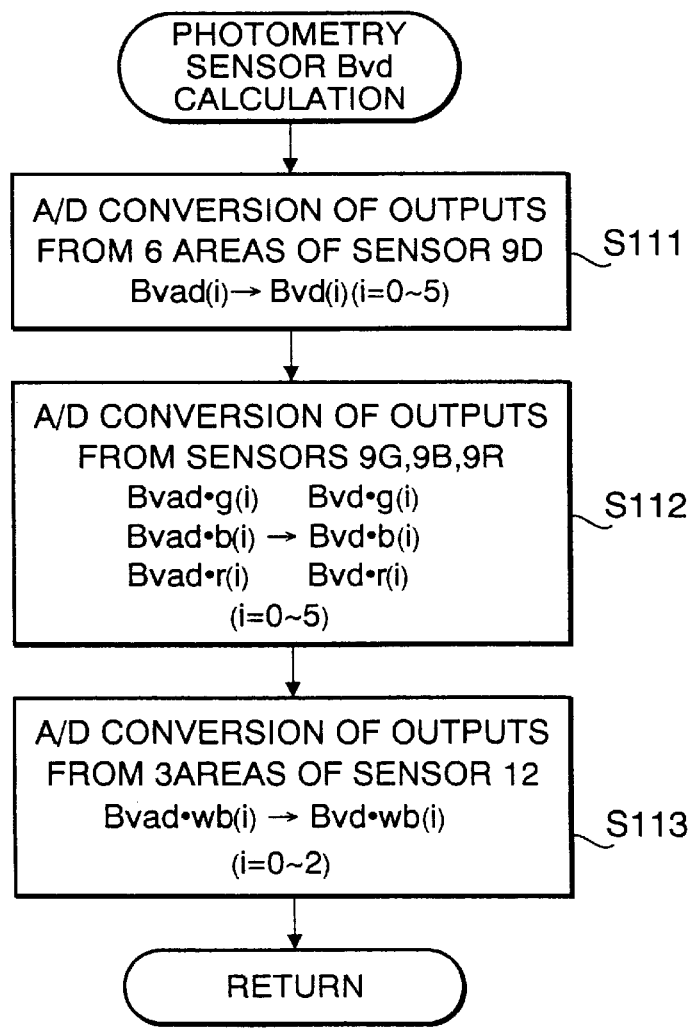

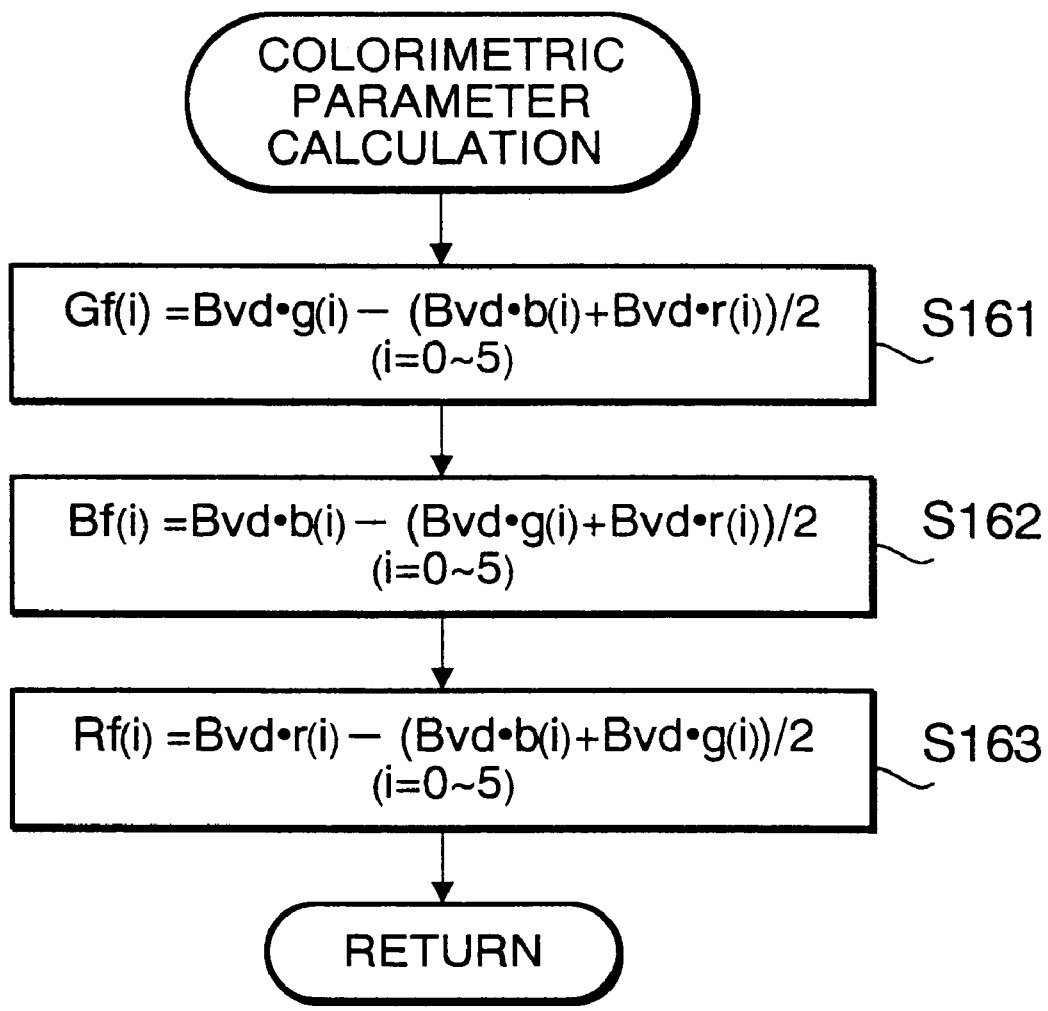

(EEPROM)

|  |  | THvalue | coefficient | CCcoefficient | CCadjustment |
|---|---|---|---|---|---|
| GREEN | g1 | 8 | 3/4 | 0 | 0 |
|  | g2 |  | 3/4 |  |  |
| BLUE | b1 | 8 | 3/4 | 2/16 | 2 |
|  | b2 |  | 3/4 |  |  |
| RED | r1 | 15 | 3/4 | 1/16 | 2 |
|  | r2 |  | 3/4 |  |  |
| MAGENTA | m1 | − 40 |  | 0 | 0 |
| YELLOW | y1 | − 9 |  | 1 | − 4 |
| CYAN | c1 | − 40 |  | 0 | 0 |

FIG.24

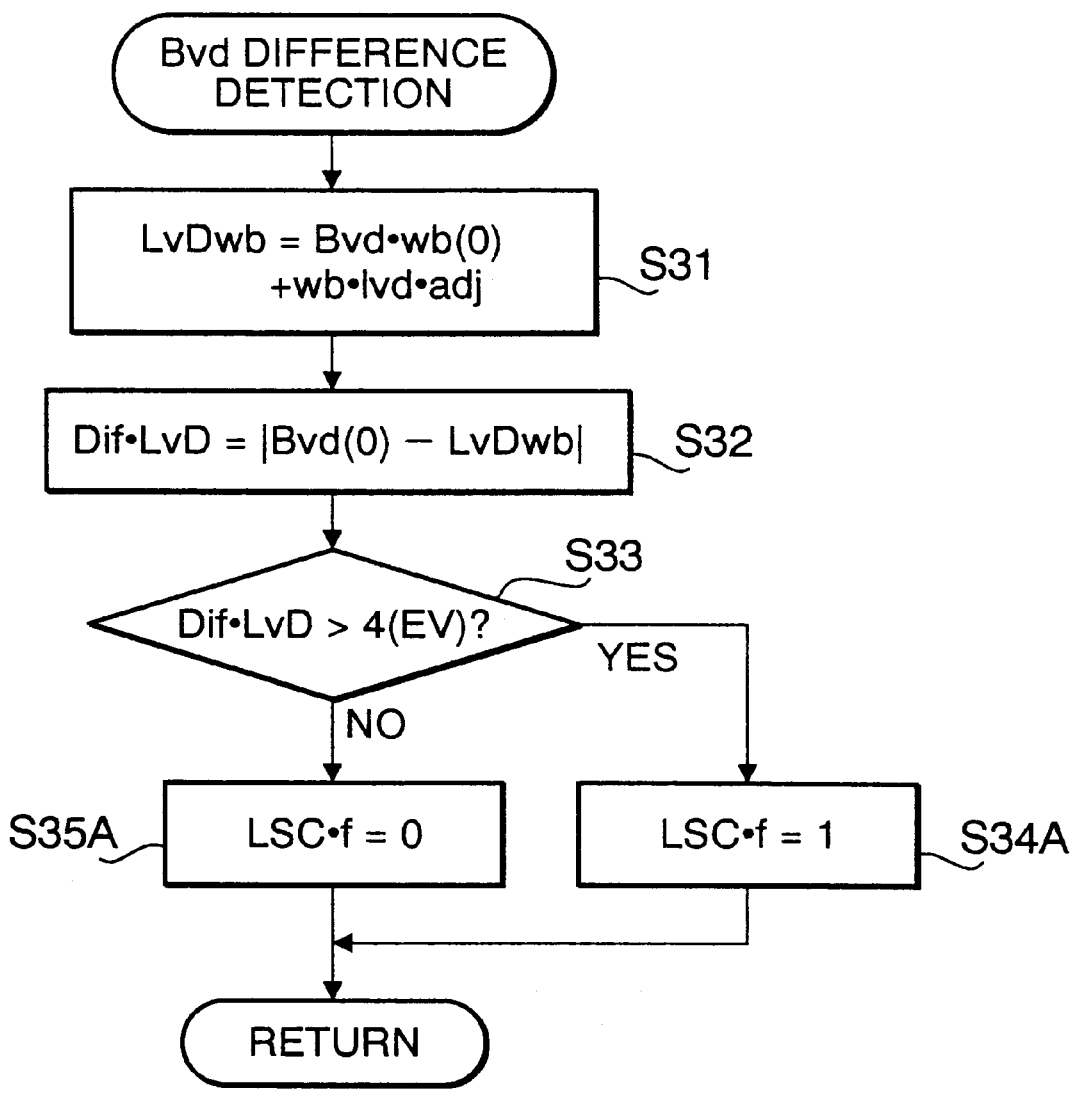

PHOTOMETRY DEVICE

BACKGROUND OF THE INVENTION

The present invention relates to a photometry device applicable to an SLR (Single Lens Reflex) camera, and more particularly to a photometry device with which exposure errors due to a difference of reflectivity of objects having different colors can be compensated.

Recently, reflection type photometry devices have been employed in most of cameras. The reflection type photometry device receives the light, which is reflected by an object and passed through an observing optical system of a camera, using a light receiving element, determines the brightness of the object based on the output of the measured value, and then calculates the exposure value of the camera based on the measured brightness. However, this type of the photometry device cannot detect the color of the object because of its structure. Accordingly, in such a device, the reflectivity of an object is generally assumed to be 18% and the exposure parameter is determined on this assumption. Therefore, regarding a whitish object whose reflectivity is greater than 18%, the determined brightness is greater than the actual brightness. If the camera controls an exposure operation based on the determined exposure value, the object is under exposed. A dark object whose reflectivity is less than 18% is measured to have a lower brightness. Therefore, such an object is over exposed. The difference of the reflectivity of the object may also occur depending on the color of the object. For example, when the color of an object is yellow, the reflectivity may be up to 70%. In such a case, if the standard reflectivity is assumed to be 18%, the exposure value is approximately 2 Ev lower than necessary. If the object color is blue, the reflectivity is approximately 9%. In this case, the object is over exposed by approximately 1 Ev greater than necessary.

Therefore, in the conventional photometry device, the photographer is required to guess the reflectivity of the object. Then, based on the reflectivity determined by the photographer, the exposure is controlled such that, if the object is a whitish or yellowish one having a relatively high reflectivity, it is to be overexposed, and if the object is a blackish or bluish one having a relatively low reflectivity, it is to be underexposed. With this operation, the above-described defects may be solved. However, accurately guessing the reflectivity of the object and controlling the exposure can only be done by experienced and skilled photographers. It is impossible to require all the photographers to do such an operation. Further, it is not preferable that a manual operation of the photographer is required for exposure. Further, if such a manual operation is required, cameras become unsuitable for automatic photographing which is the recent trend.

It may be possible to measure the color of the object, and perform exposure compensation based on the reflectivity corresponding to the measured color. If such a control is performed, an appropriate exposure value seems to be obtained automatically regardless of the color of the object. To perform such operation, a plurality of sensors for colorimetry may be provided inside the camera for selectively measuring different portions of the object. That is, light passed through a photographing lens of the camera is received by the plurality of sensors.

When such a structure is adopted, however, the spectral reflection characteristics of the object and the spectral radiant characteristic of an external light source are overlapped when the colorimetry is performed. Therefore, due to the spectral radiant characteristics of the external light source illuminating the object, it becomes difficult to measure the object color accurately. Then, the compensation amount of the exposure value includes errors, and the appropriate exposure may not be achieved.

SUMMARY OF THE INVENTION

It is therefore an object of the invention to provide an improved photometry device with which appropriate exposure values can be obtained regardless of a difference of reflectivity of the objects without being affected by the spectral radiant characteristics of a light source illuminating the object.

For the above object, according to an aspect of the invention, there is provided a photometry device for a camera, which is provided with a normal light sensor that performs a photometry operation with respect to an object, an exposure amount determining system that determines an exposure amount of an object in accordance with an output of the normal light sensor, a plurality of colorimetric sensors having spectral sensitivity characteristics different from each other, the plurality of colorimetric sensors performing a colorimetric operation with respect to an image of the object through a lens of the camera, an external light sensor that measures external light illuminating the object at spectral sensitivity characteristics corresponding to each of the plurality of colorimetric sensors, a light source color compensation amount calculation system that calculates a light source color compensation amount based on light source data, a colorimetric compensation amount calculation system that determines a color of the object based on the metered values output by the colorimetric sensors and compensated using the light source color compensation amount, and that calculates a colorimetric compensation amount based on the judged color, and a colorimetric compensation system that compensates for the exposure amount based on the colorimetric compensation amount. In such a photometry device, a predetermined fixed value is used as the light source data, and, if a difference between the exposure value obtained from the output of the external light sensor and the exposure value obtained based on the output of the normal light photometry sensor is greater than a predetermined reference value, the colorimetric compensation amount is forcibly set to zero.

Alternatively, if a difference between the exposure value obtained from the output of the external light sensor and the exposure value obtained based on the output of the normal light photometry sensor is greater than the predetermined reference value, operations of the colorimetric compensation amount calculation system and the colorimetric compensation system are not performed.

Further alternatively, the colorimetric compensation amount is compensated based on a coefficient obtained from a difference between the exposure value obtained from the output of the external light sensor and the exposure value obtained based on the output of the normal light photometry sensor.

In each case, the photometry device may further be provided with a storage device, and light source data corresponding to an output of the external light sensor may be stored in the storage device. In this case, the fixed value can be calculated from the light source data stored in the storage device.

According to another aspect of the invention, there is provided a photometry device for a camera, which is provided with a normal light sensor that performs a photometry operation with respect to an object, an exposure amount determining system that determines an exposure amount of an object in accordance with an output of the normal light sensor, a plurality of colorimetric sensors having spectral sensitivity characteristics different from each other, the plurality of colorimetric sensors performing a colorimetric operation with respect to an image of the object through a lens of the camera, an external light sensor that measures external light illuminating the object at spectral sensitivity characteristics corresponding to each of the plurality of colorimetric sensors, a light source color compensation amount calculation system that calculates a light source color compensation amount based on light source data;

a colorimetric compensation amount calculation system that determines a color of the object based on the metered values output by the colorimetric sensors and compensated using the light source color compensation amount, and calculates a colorimetric compensation amount based on the judged color, and a colorimetric compensation system that compensates for the exposure amount based on the colorimetric compensation amount. In such a device, a metered value of the external light sensor is used as the light source data, and if a difference between the exposure value obtained from the output of the external light sensor and the exposure value obtained based on the output of the normal light photometry sensor is greater than a predetermined reference value, the colorimetric compensation amount is forcibly set to zero.

Alternatively, a metered value of the external light sensor is used as the light source data, and if a difference between the exposure value obtained from the output of the external light sensor and the exposure value obtained based on the output of the normal light photometry sensor is greater than a predetermined reference value, operations of the colorimetric compensation amount calculation system and the colorimetric compensation system are not performed.

Further alternatively, a metered value of the external light sensor may be used as the light source data, and the colorimetric compensation amount is compensated based on a coefficient obtained from a difference between the exposure value obtained from the output of the external light sensor and the exposure value obtained based on the output of the normal light photometry sensor.

According to a further aspect of the invention, there is provided a photometry device for a camera, which is provided with a normal light sensor that performs a photometry operation with respect to an object, an exposure amount determining system that determines an exposure amount of an object in accordance with an output of the normal light sensor, a plurality of colorimetric sensors having spectral sensitivity characteristics different from each other, the plurality of colorimetric sensors performing a colorimetric operation with respect to an image of the object through a lens of the camera, an external light sensor that measures external light illuminating the object at spectral sensitivity characteristics corresponding to each of the plurality of colorimetric sensors, a light source color compensation amount calculation system that calculates a light source color compensation amount based on light source data, a colorimetric compensation amount calculation system that determines a color of the object based on the metered values output by the colorimetric sensors and compensated using the light source color compensation amount, and calculates a colorimetric compensation amount based on the judged color, and a colorimetric compensation system that compensates for the exposure amount based on the colorimetric compensation amount.

In such a device, one of the metered value of the external light sensor and a predetermined fixed value is selected as the light source data in accordance with a difference between the exposure value obtained from the output of the external light sensor and the exposure value obtained based on the output of the normal light photometry sensor.

Alternatively, a value within a range between the metered value of the external light sensor and a predetermined fixed value is determined as the light source data in accordance with a difference between the exposure value obtained from the output of the external light sensor and the exposure value obtained based on the output of the normal light photometry sensor.

Optionally, the photometry device may be provided with a storage device, in which light source data corresponding to an output of the external light sensor is stored, and the fixed value is calculated from the light source data stored in the storage device.

In the above described photometry devices, each of the normal light photometry sensor and the plurality of colorimetric sensors may have a plurality of photometry areas. In such a case, the colorimetric compensation amount calculating system determines a color for each of the plurality of photometry areas and further determines a colorimetric compensation amount for each of the plurality of photometry areas based on the determined color. Further, the colorimetric compensation amount calculating system may determine a colorimetric compensation amount for the entire object based on the colorimetric compensation amounts for the plurality of photometry areas.

Still optionally, in the above described photometry devices, each of the normal light photometry sensor and the plurality of colorimetric sensors may include a plurality of photometry areas. In this case, the colorimetric compensation amount calculating system may determine a color for each of the plurality of photometry areas and further determine a colorimetric compensation amount for each of the plurality of photometry areas based on the determined color. Further, the colorimetric compensation amount calculating system may compensate for the photometry value for each of the plurality of photometry areas based on the colorimetric compensation amount, and determine an exposure amount for the entire object based on the colorimetric compensation amounts for the plurality of photometry areas.

Further optionally, in the photometry devices described above, the normal light photometry device and the plurality of colorimetric sensors meter light reflected by the object and passed through the photographing optical system of the camera, and the external light sensor meters light reflected by the object but not passed through the photographing optical system of the camera.

In this case, the normal light sensor may include a normal light photometry sensor, the spectral sensitivity characteristic of which has a peak sensitivity at a wavelength within a range from 500 nm through 600 nm, and the plurality of colorimetric sensors may include a blue light photometry sensor for metering blue light component, a green light photometry sensor for metering green light component, and a red light photometry sensor for metering red light component. Further, the external light sensor includes a photometry sensor having photometry areas for metering blue, green and red light components, respectively.

The plurality of colorimetric sensors and the normal light sensors may optionally include photometric elements having the same photometric characteristics.

Further, the normal light photometry sensor may function as the green light sensor, and wherein output of the green light sensor is used as the output of the normal light photometry sensor.

According to a further aspect of the invention, there is provided a photometry device, which includes a normal light sensor that performs a photometry operation with respect to an object, an exposure amount determining system that determines an exposure amount of an object in accordance with an output of the normal light sensor, a plurality of colorimetric sensors having spectral sensitivity characteristics different from each other, the plurality of colorimetric sensors performing a colorimetric operation with respect to an image of the object through a lens of the camera, an external light sensor that measures external light illuminating the object at spectral sensitivity characteristics corresponding to each of the plurality of colorimetric sensors, a light source color compensation amount calculation system that calculates a light source color compensation amount based on light source data; and a colorimetric compensation system that compensates for the exposure amount, procedures for compensating for the exposure amount being varied depending on a difference between the exposure value obtained from the output of the external light sensor and the exposure value obtained based on the output of the normal light photometry sensor.

Optionally, the colorimetric compensation system does not substantially compensate for the exposure value if the difference between the exposure value obtained from the output of the external light sensor and the exposure value obtained based on the output of the normal light photometry sensor is greater than a predetermined threshold value.

Still optionally, the colorimetric compensation system may determine a coefficient used for calculation of colorimetric compensation amount in accordance with the difference between the exposure value obtained from the output of the external light sensor and the exposure value obtained based on the output of the normal light photometry sensor is greater than a predetermined threshold value.

Further optionally, each of the normal light photometry sensor and the plurality of colorimetric sensors has a plurality of photometry areas, the colorimetric compensation amount calculating system determining a color for each of the plurality of photometry areas and further determining a colorimetric compensation amount for each of the plurality of photometry areas based on the determined color, the colorimetric compensation amount calculating system further compensating for the photometry value for each of the plurality of photometry areas based on the colorimetric compensation amount, and determining an exposure amount for the entire object based on the colorimetric compensation amounts for the plurality of photometry areas.

Still optionally, the photometry device may further include a light source color compensation amount calculation system that calculates a light source color compensation amount based on light source data, and a colorimetric compensation amount calculation system that determines a color of the object based on the metered values output by the colorimetric sensors and compensated using the light source color compensation amount, and calculates a colorimetric compensation amount based on the judged color.

BRIEF DESCRIPTION OF THE ACCOMPANYING DRAWINGS

FIG. 1 shows a perspective view of a camera employing a photometry device according to the invention;

FIG. 2 schematically shows main components of the camera shown in FIG. 1;

Figure 4A:
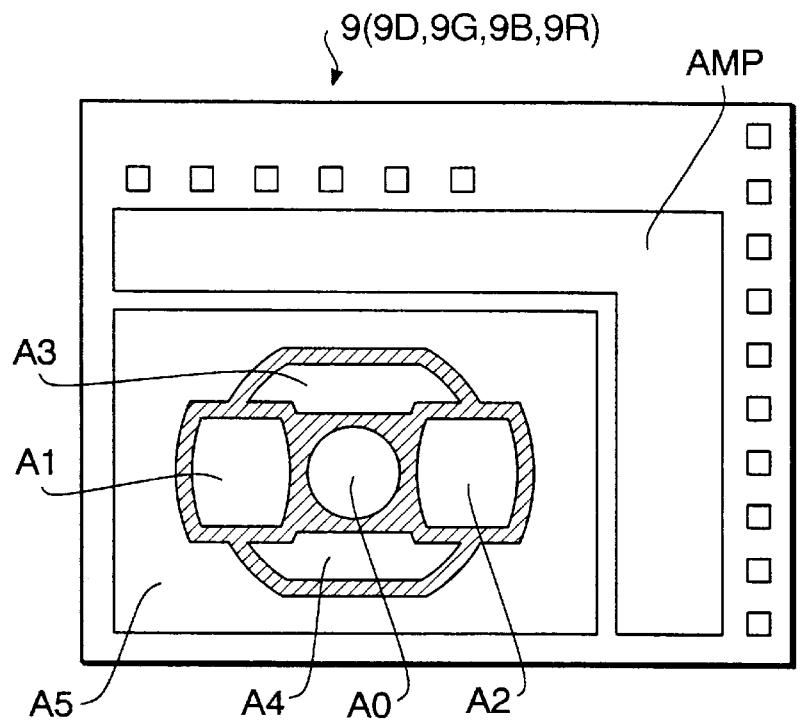
Figure 4B:
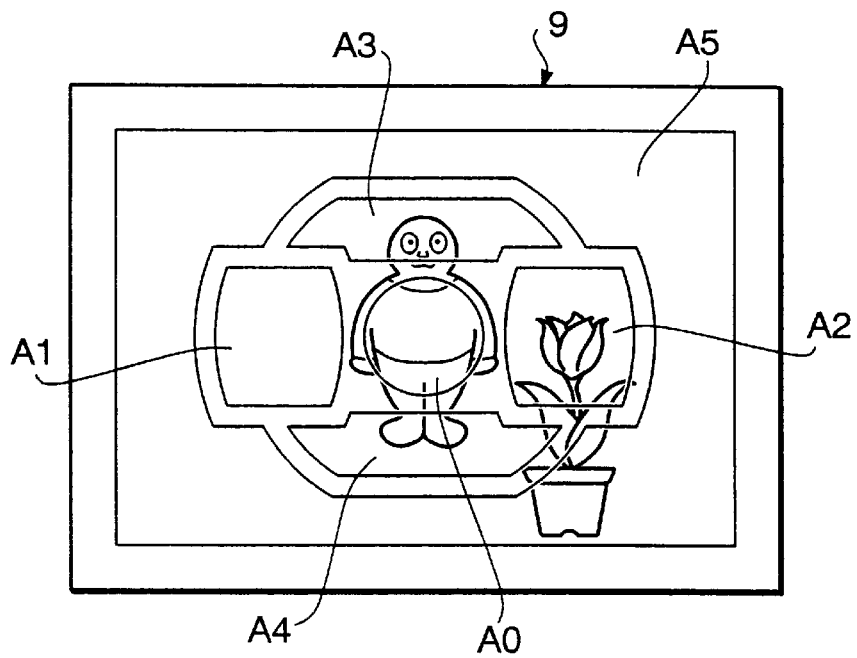
Figure 10:
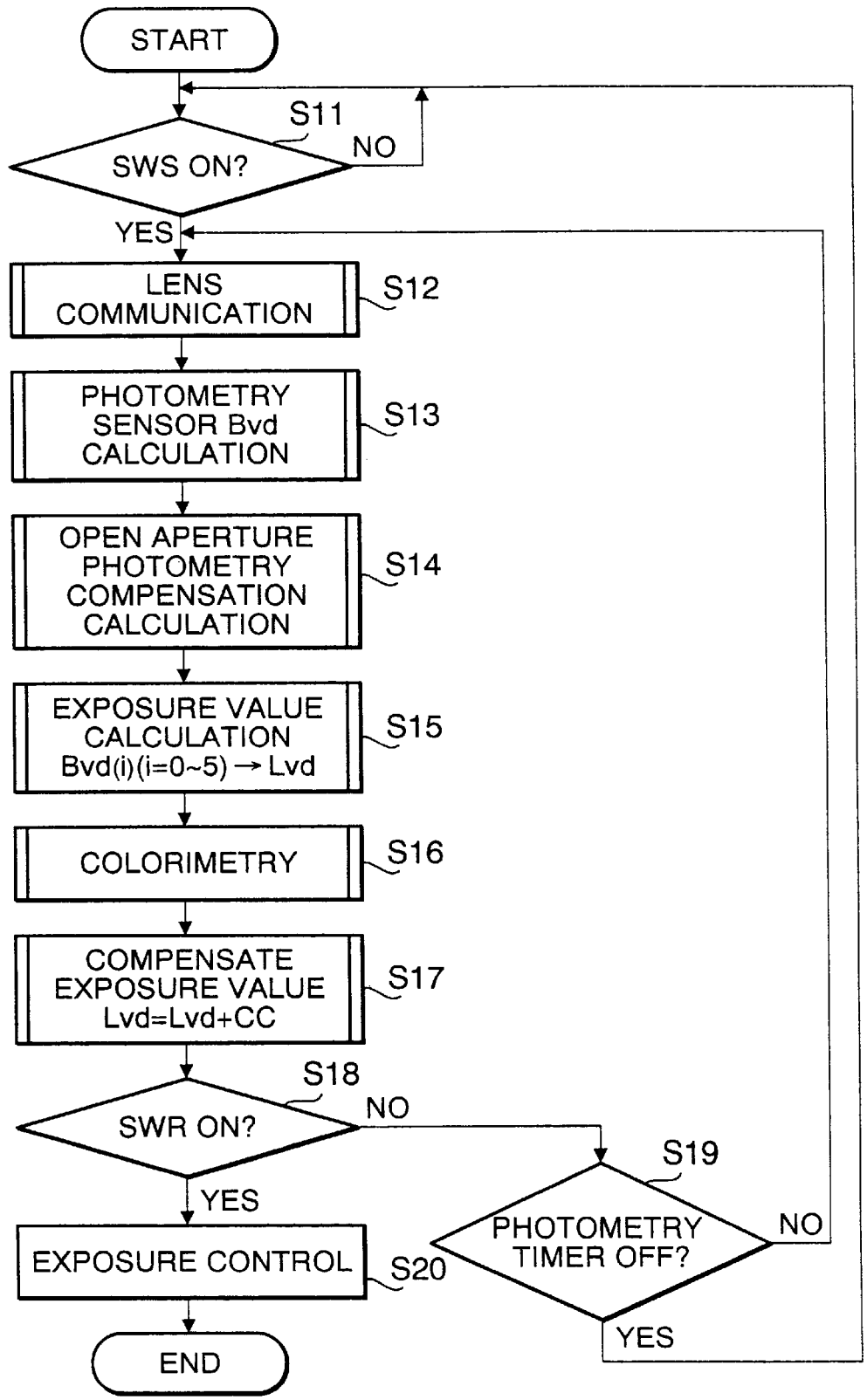
Figure 13:
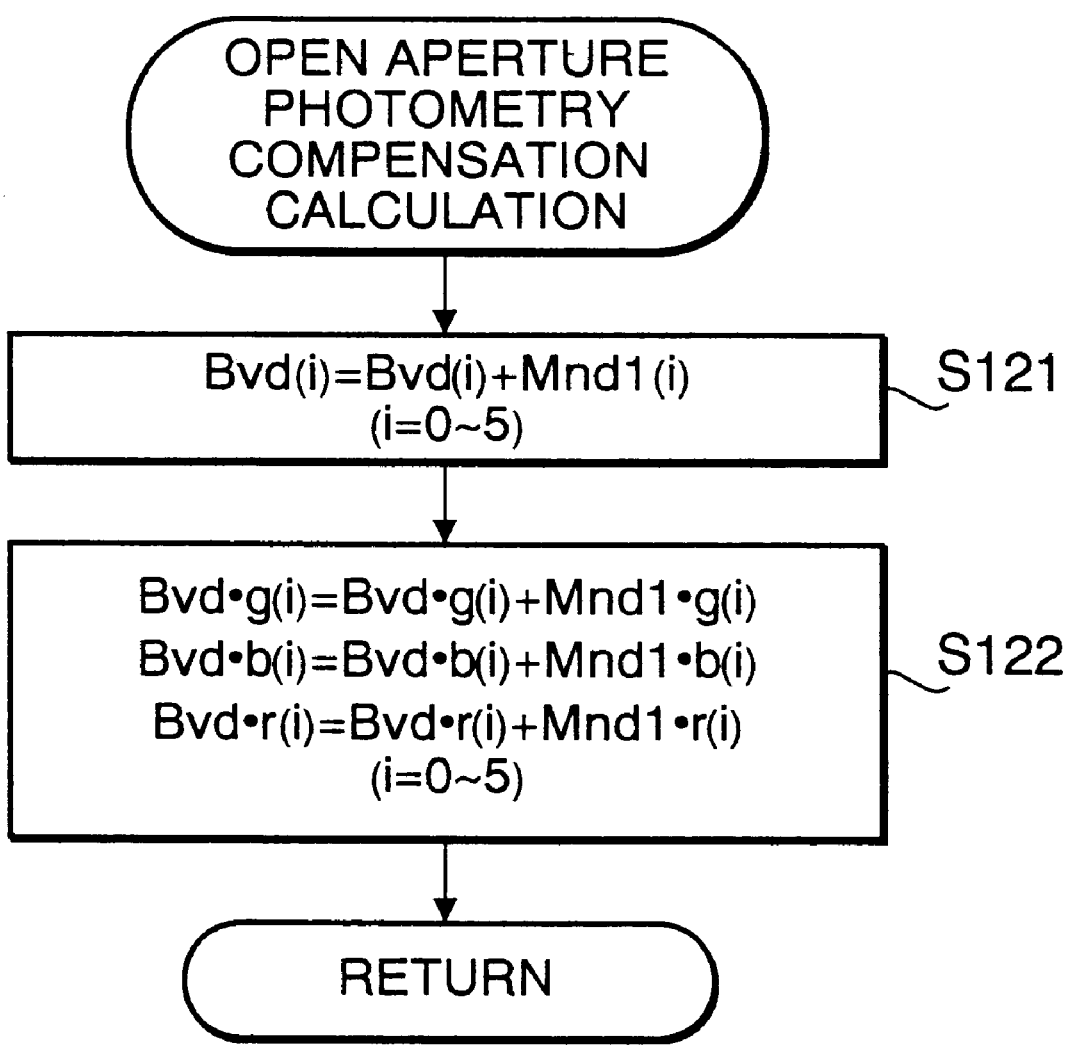
Figure 14:
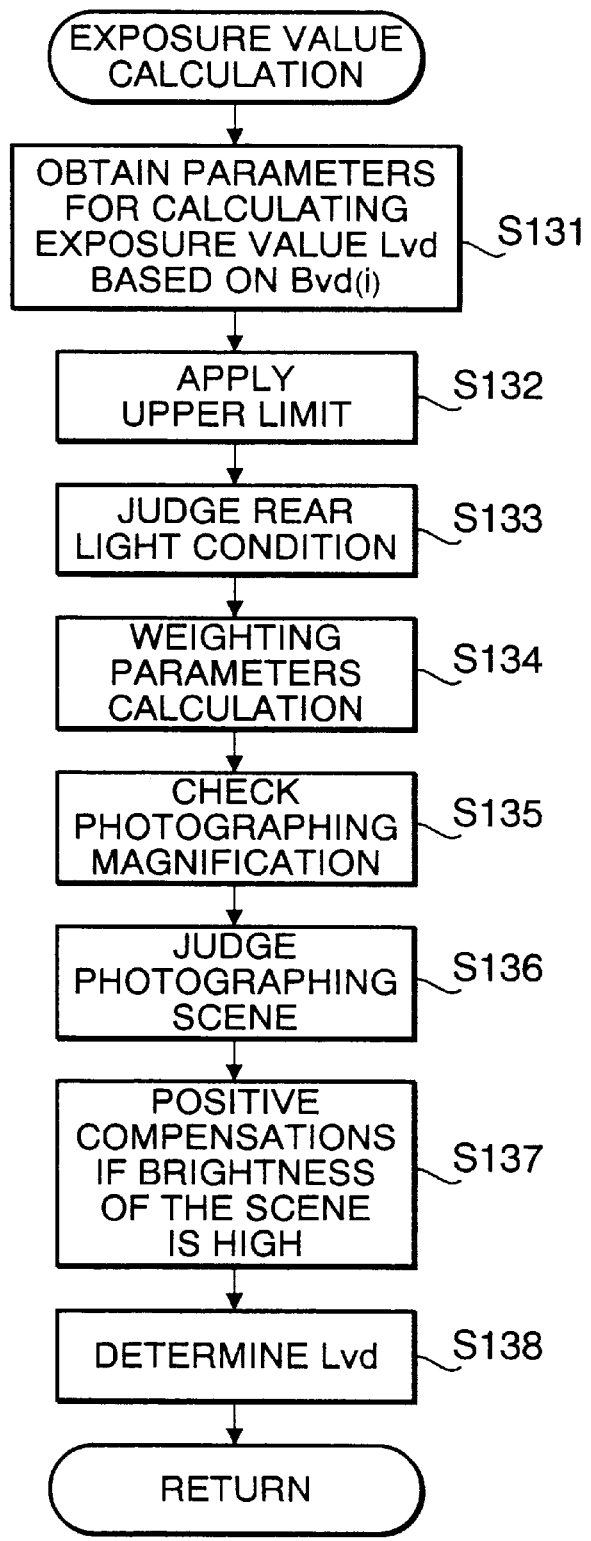
Figure 15A:
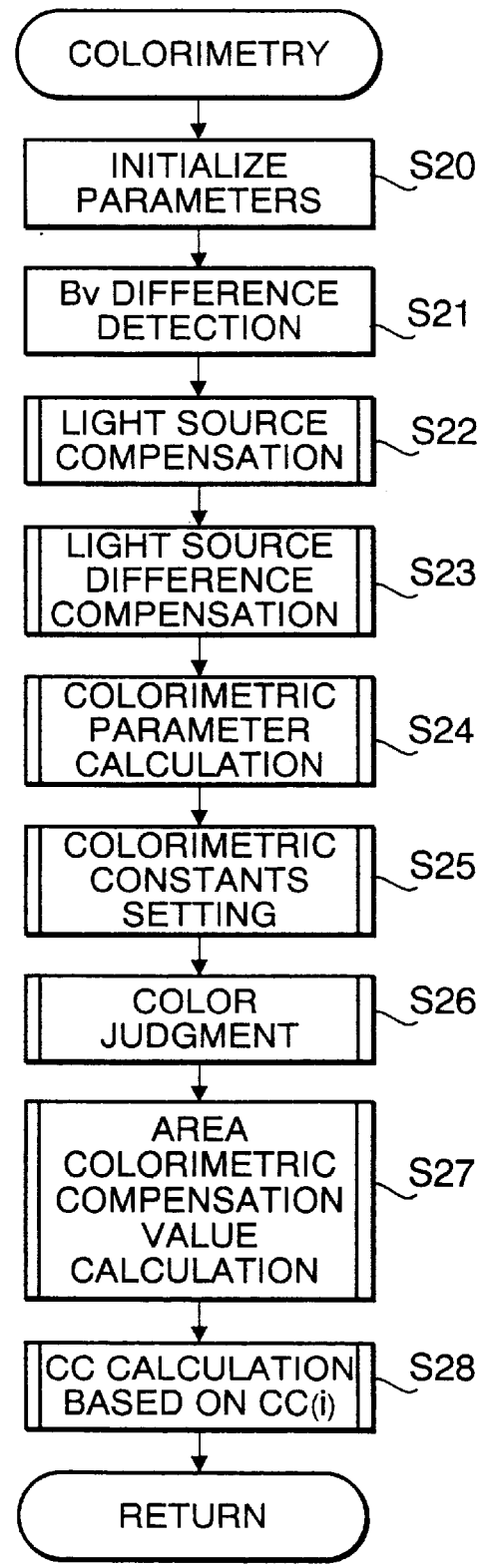
Figure 15B:
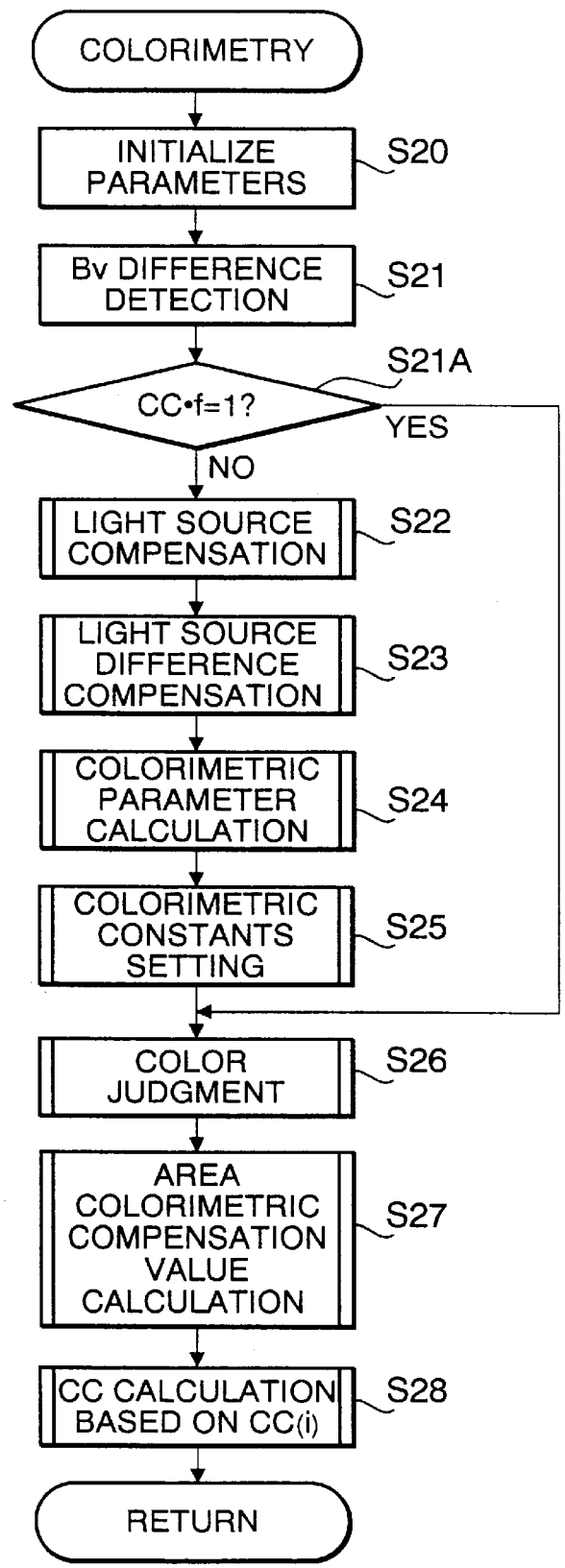
Figure 15C:
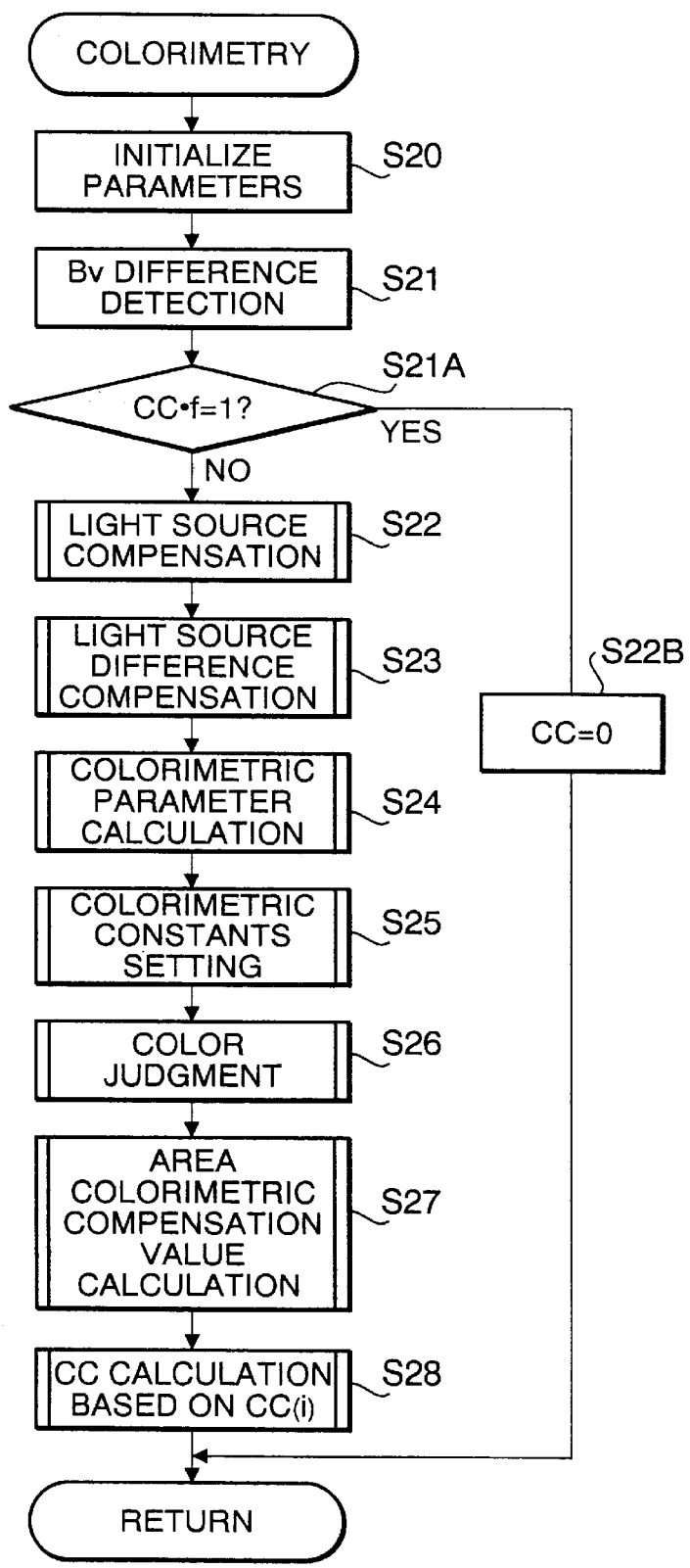
Figure 16A:
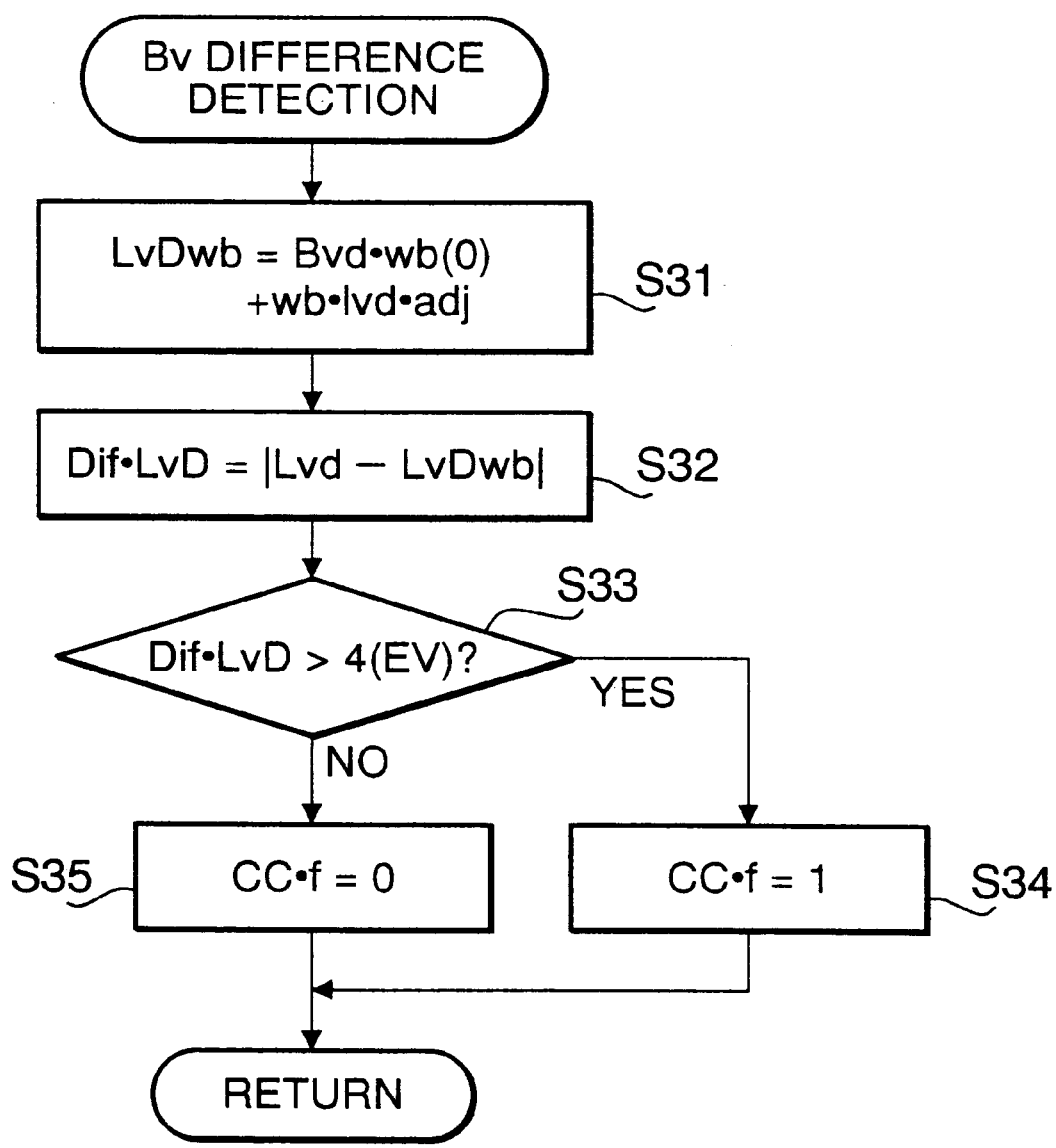
Figure 16B:
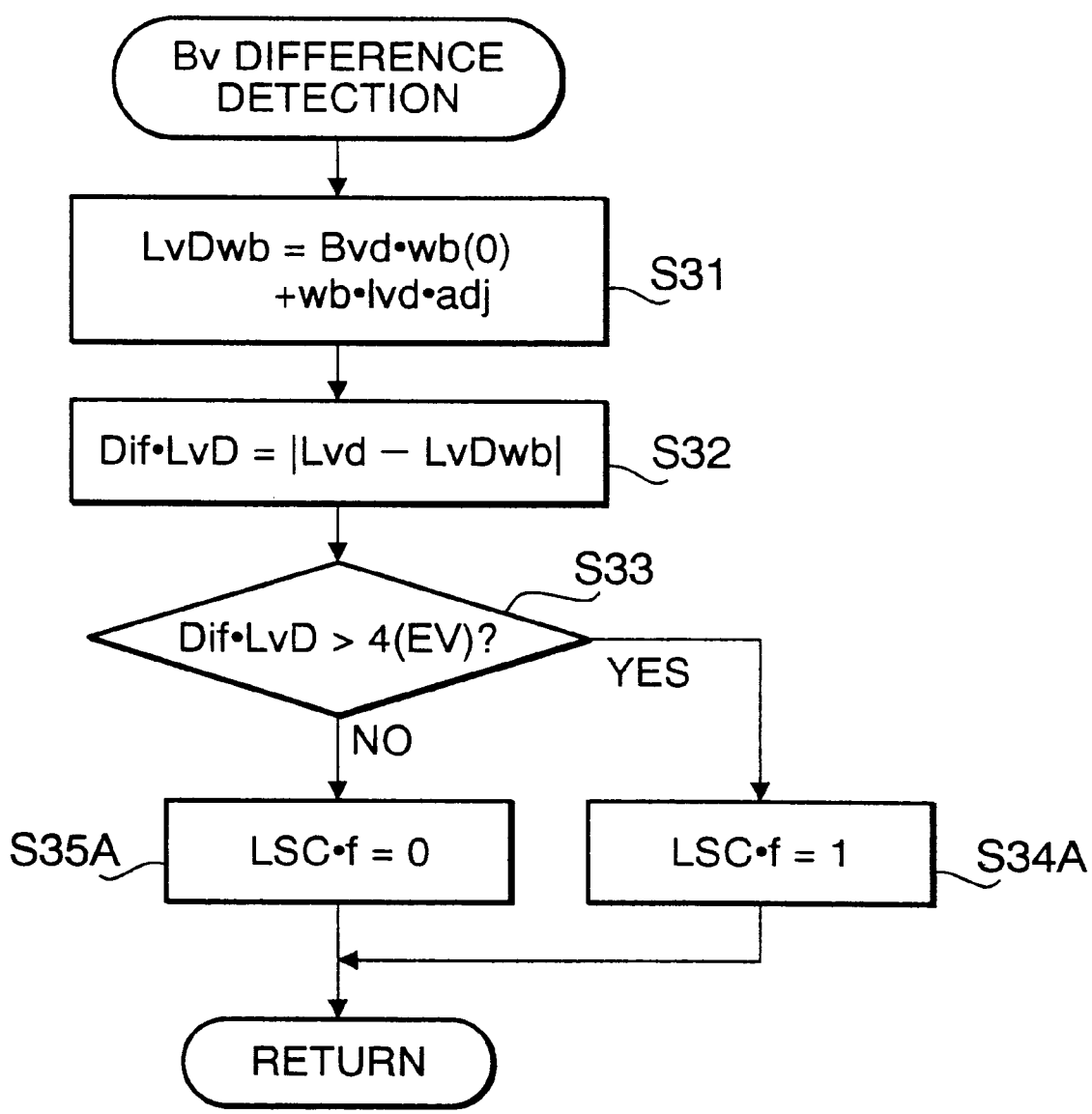
Figure 16C:
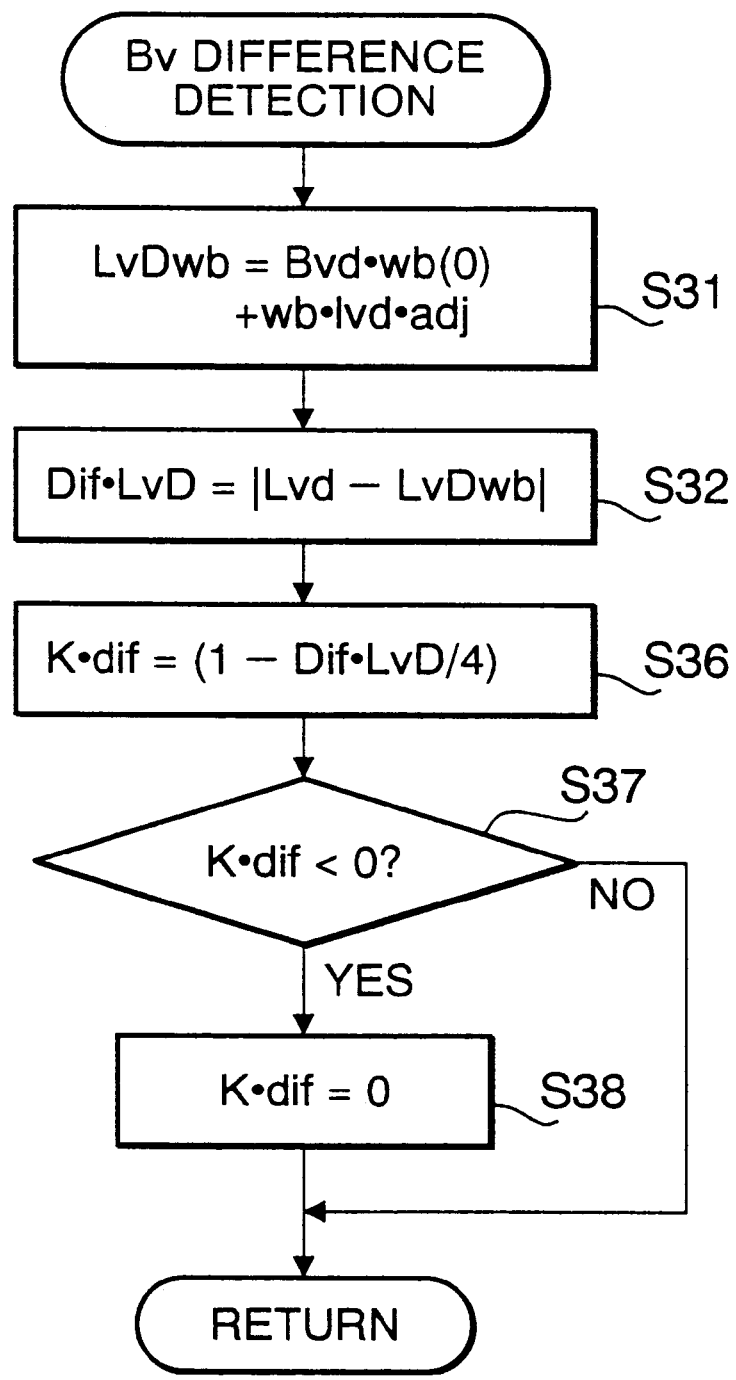
Figure 20:
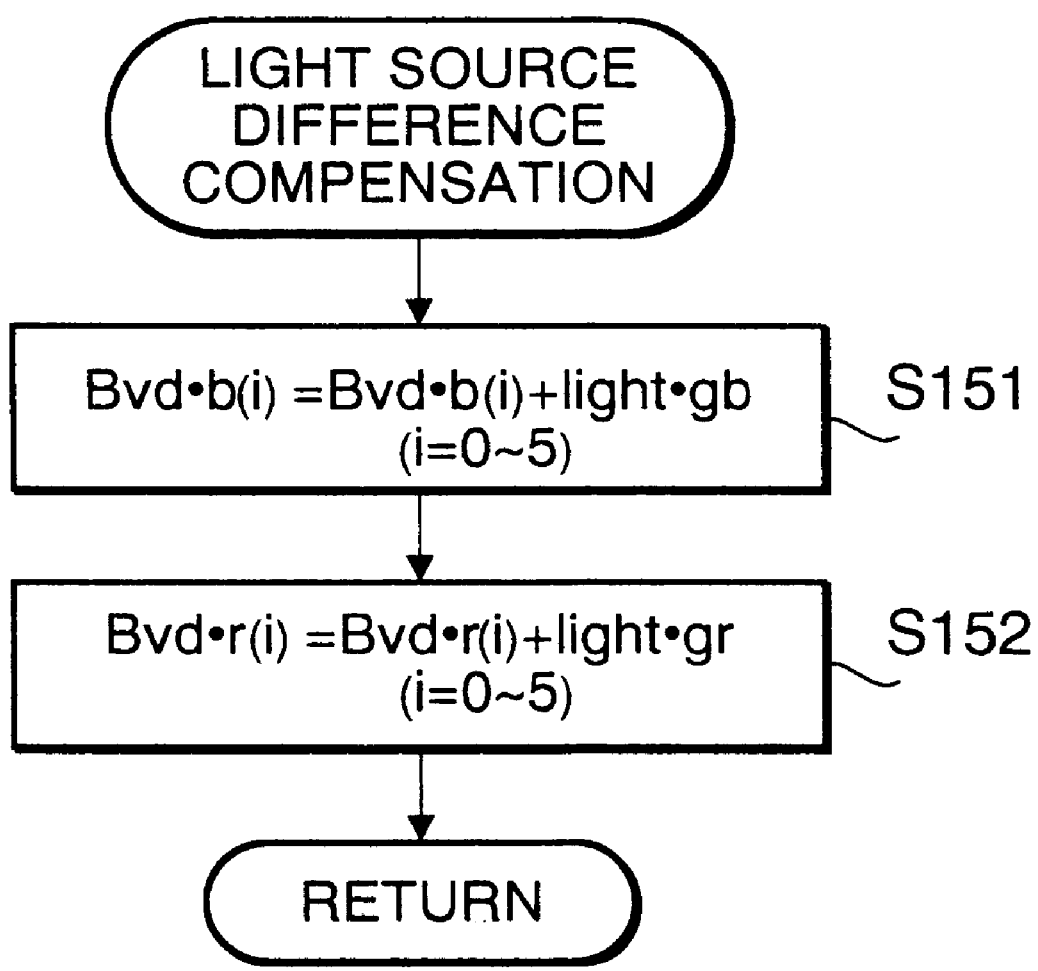
Figure 23:
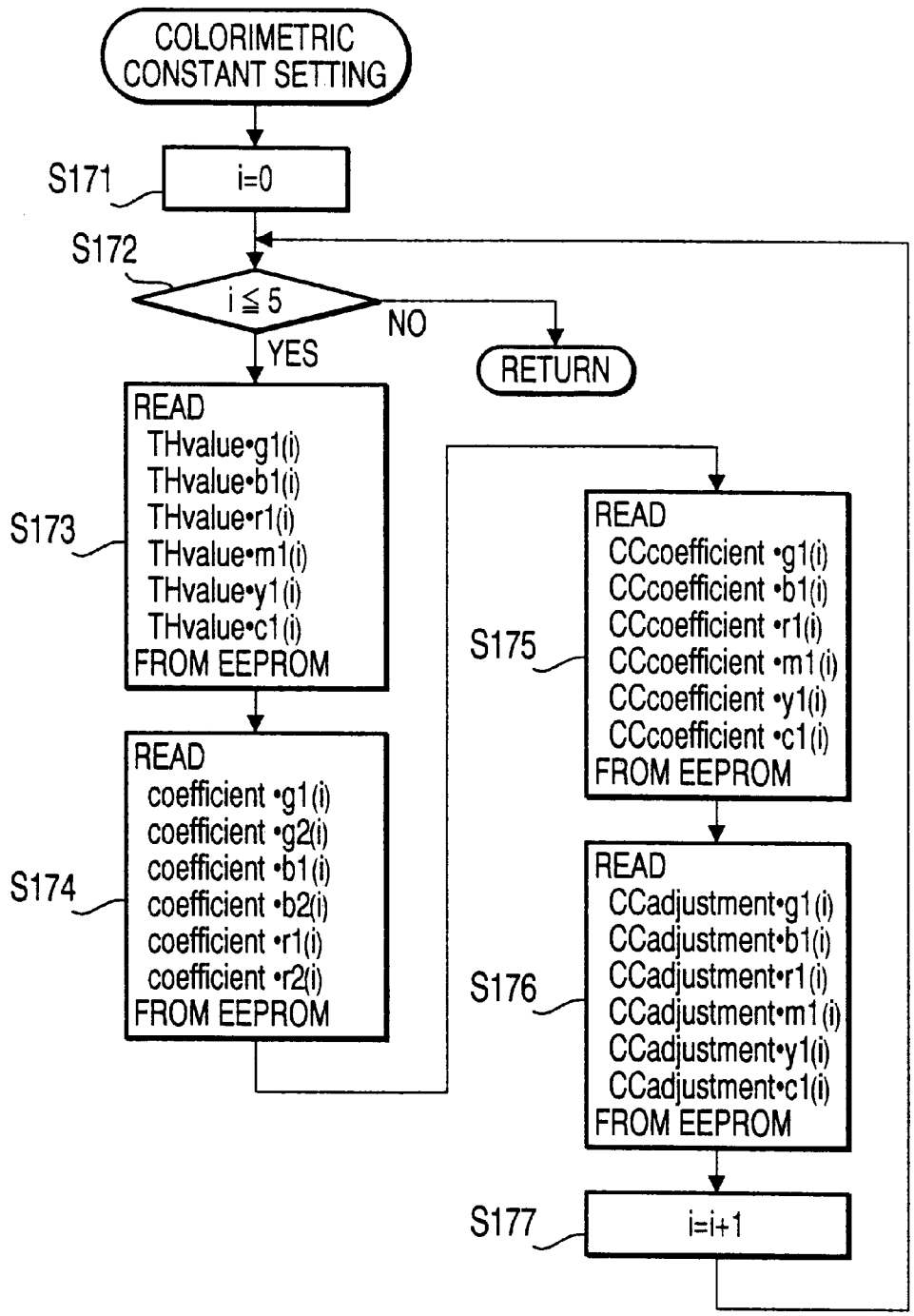
Figure 25:
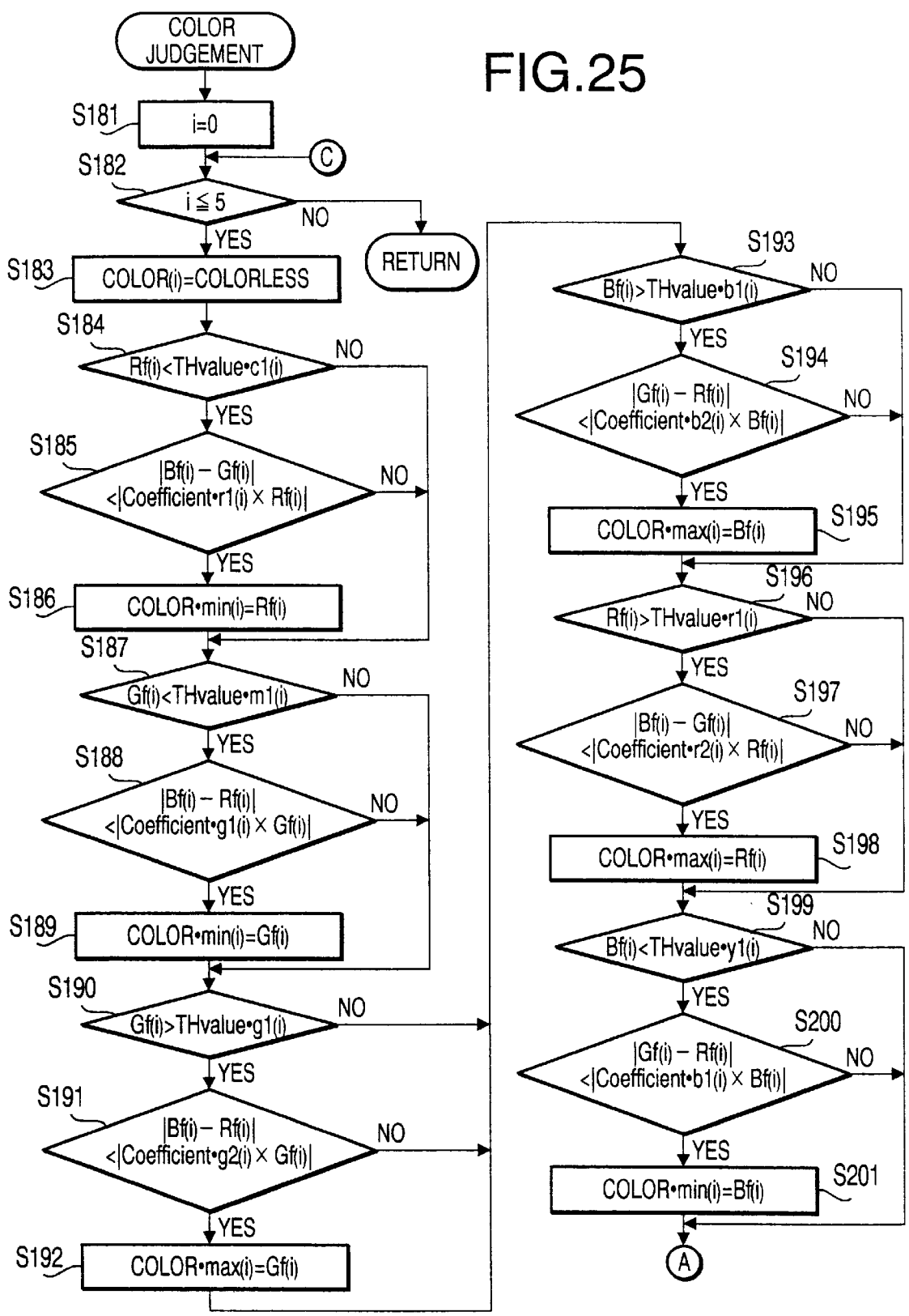
Figure 26:
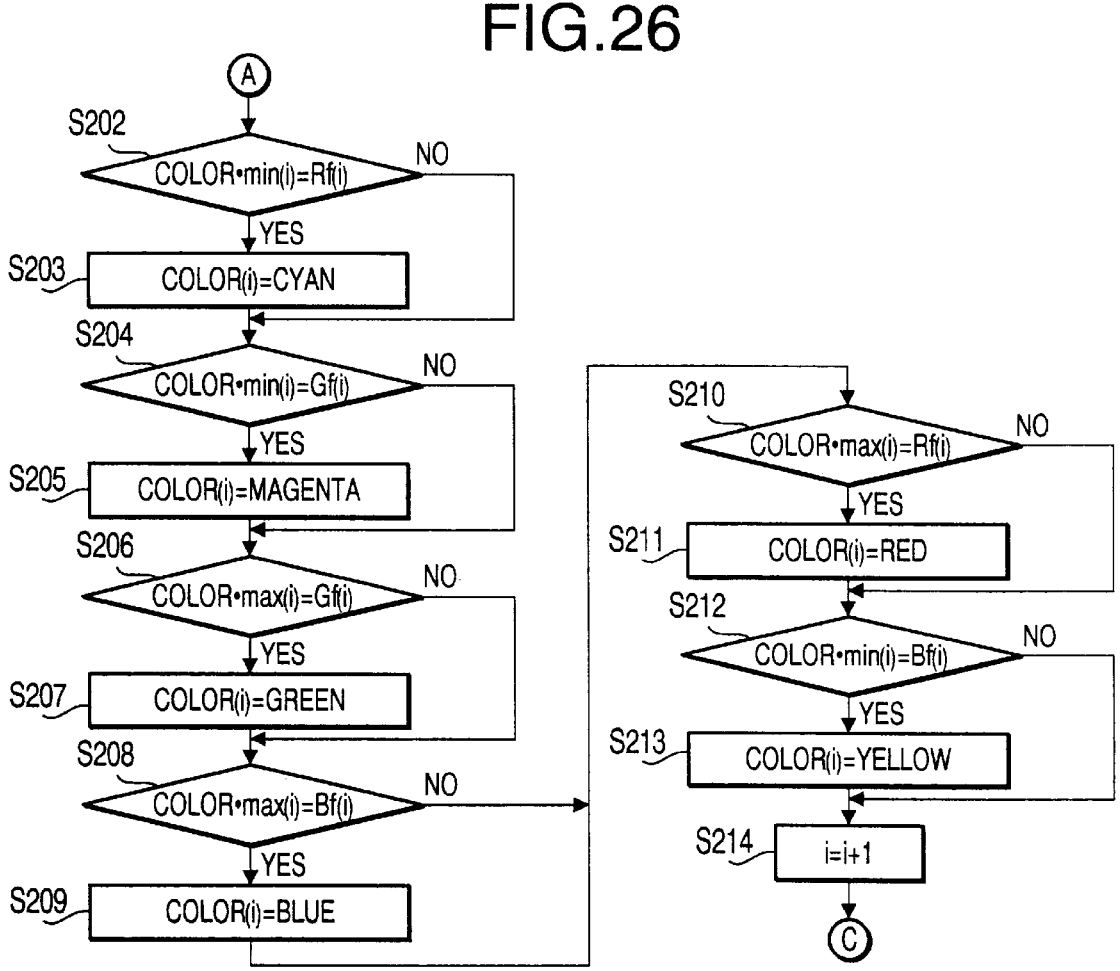
Figure 27:
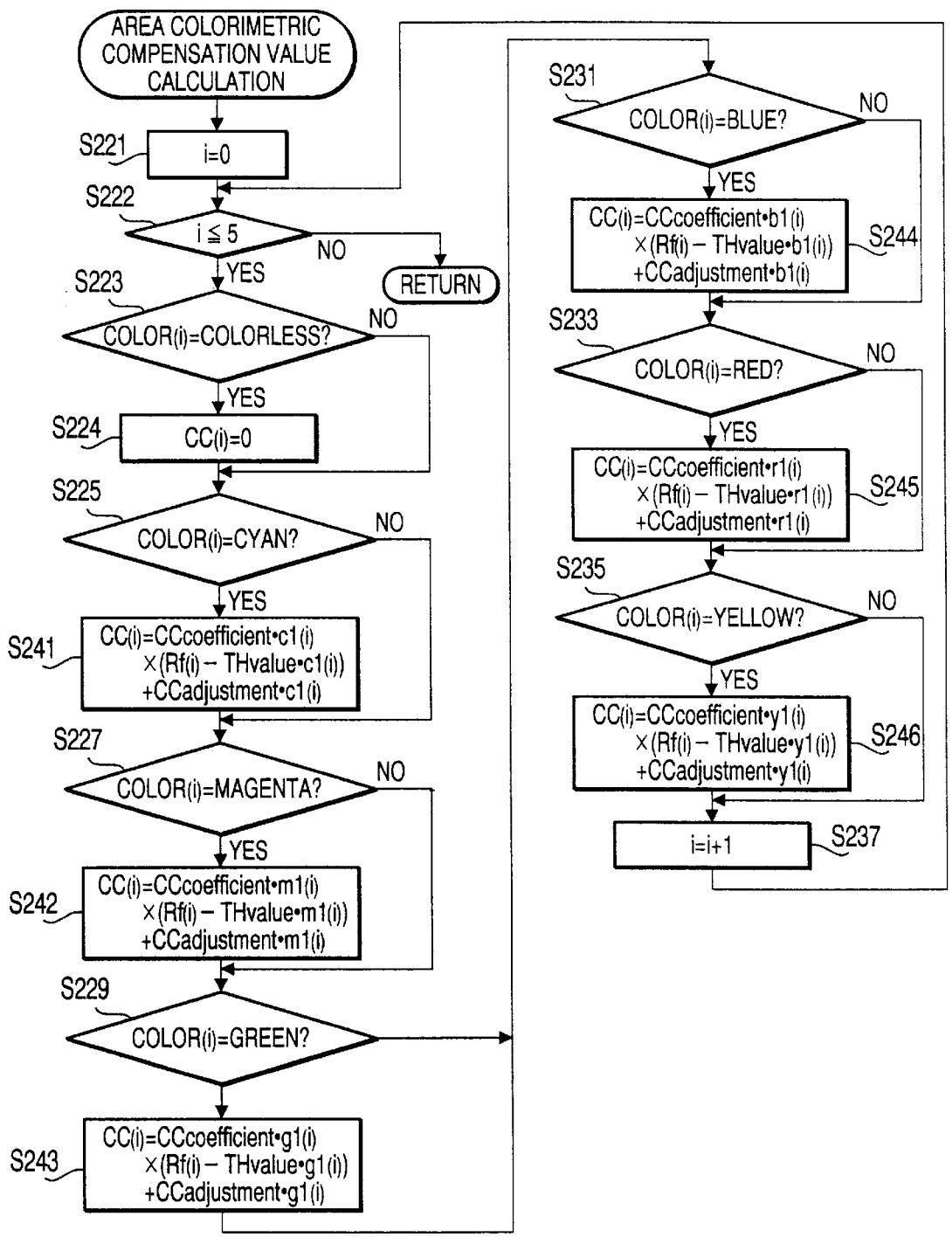
Figure 28:
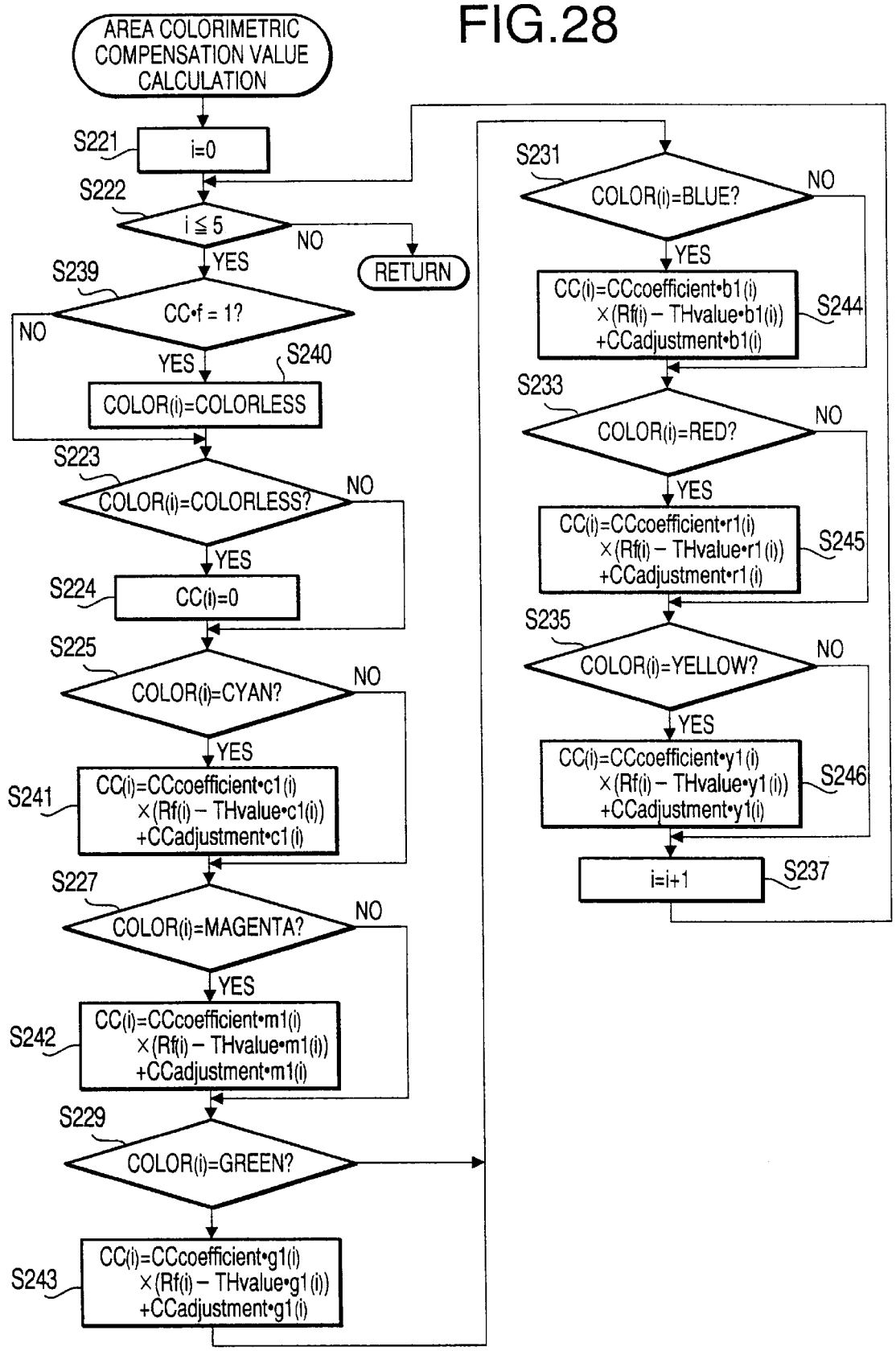
Figure 29:
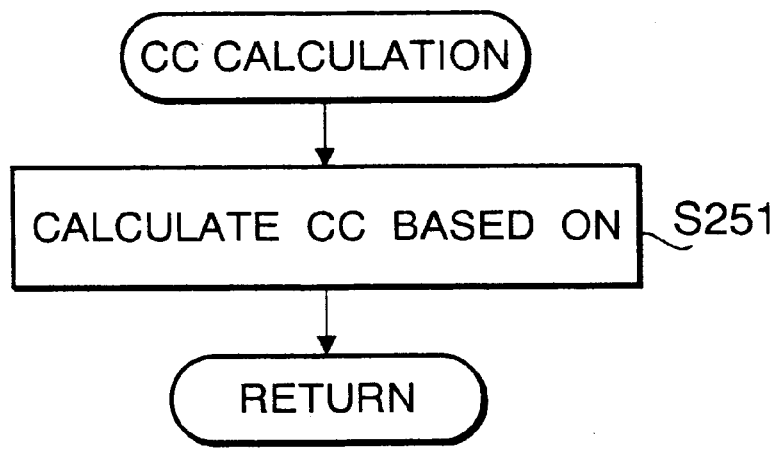
Figure 30:
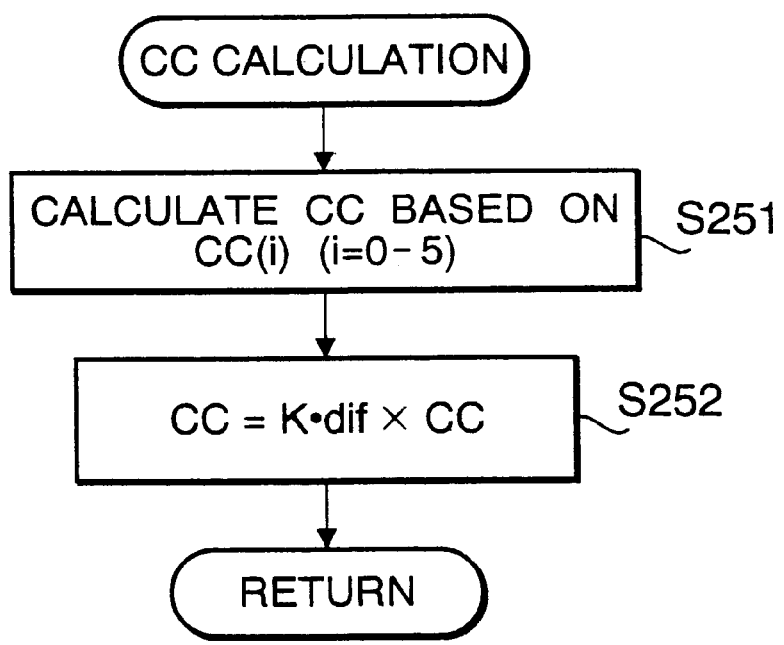
Figure 31:
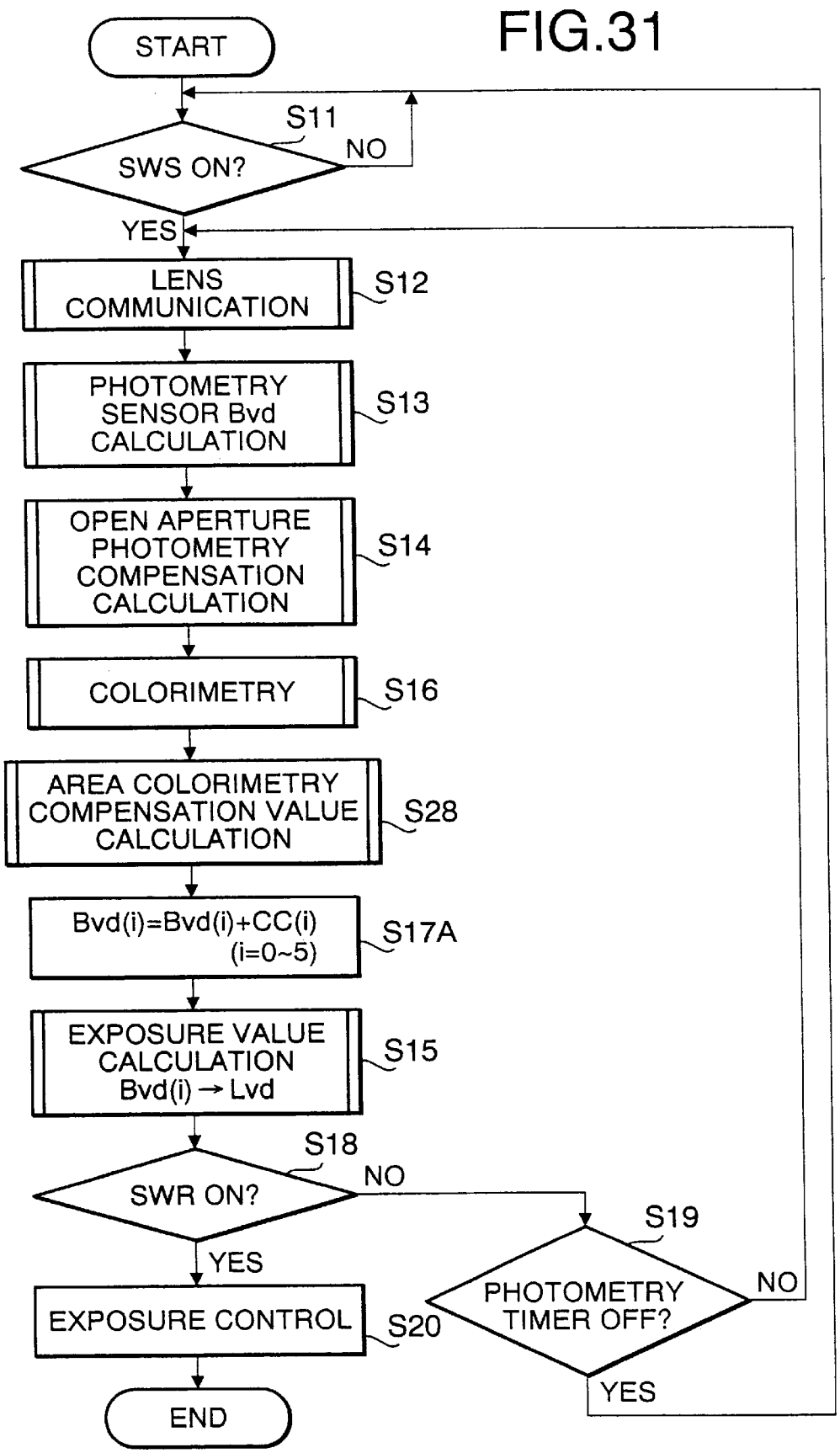

FIG. 4A schematically shows a structure of each of the photometry sensors;

FIG. 4B shows a relationship between the photometry areas of each photometry sensor;

FIGS. 5A–5D show a structure of a photometry sensor for a light source, and photometry and colorimetry sensors;

FIG. 6 shows spectral sensitivity characteristics of the green, blue and red light sensors;

FIG. 7 shows a block diagram of main portions of the camera;

FIG. 8 is a chart that shows eight different photometry modes of the camera;

FIG. 9 is a chart that shows a relationship between the eight photometry modes and procedures to be performed;

FIG. 10 is a flowchart illustrating a main procedure of a photometry operation according to an embodiment;

FIG. 11 is a flowchart illustrating the "lens communication procedure";

FIG. 12 shows a flowchart illustrating the "photometry sensor Bvd calculation procedure";

FIG. 13 is a flowchart illustrating the "open aperture photometry compensation calculation procedure";

FIG. 14 is a flowchart illustrating an "exposure value calculation procedure";

FIGS. 15A–15C are flowcharts illustrating "colorimetry procedures" for different photometry modes;

FIGS. 16A–16C are flowcharts illustrating "Bv difference detection procedures" for different photometry modes;

FIGS. 17A–17B, 18A–18B and 19 show flowcharts illustrating the "light source compensation procedures" for different photometry modes;

FIG. 20 is a flowchart illustrating the "light source difference compensation procedure";

FIGS. 21A–21F show exemplary spectral sensitivity characteristics of photometry sensors 9B, 9G and 9R;

FIG. 22 is a flowchart illustrating the "colorimetric parameter calculation procedure";

FIG. 23 is a flowchart illustrating the "colorimetric constant setting procedure", FIG. 24 shows an example of constants read from the EEPROM;

FIGS. 25 and 26 show a flowchart illustrating the "color judgment procedure";

FIGS. 27 and 28 show examples of the "area colorimetric compensation value calculation procedures" for different photometry modes;

FIGS. 29 and 30 show flowcharts illustrating a "CC calculating procedures", which is called at S28 of the main procedure, for different photometry modes;

FIG. 31 shows a main procedure according to a second embodiment; and

Figure 32A:
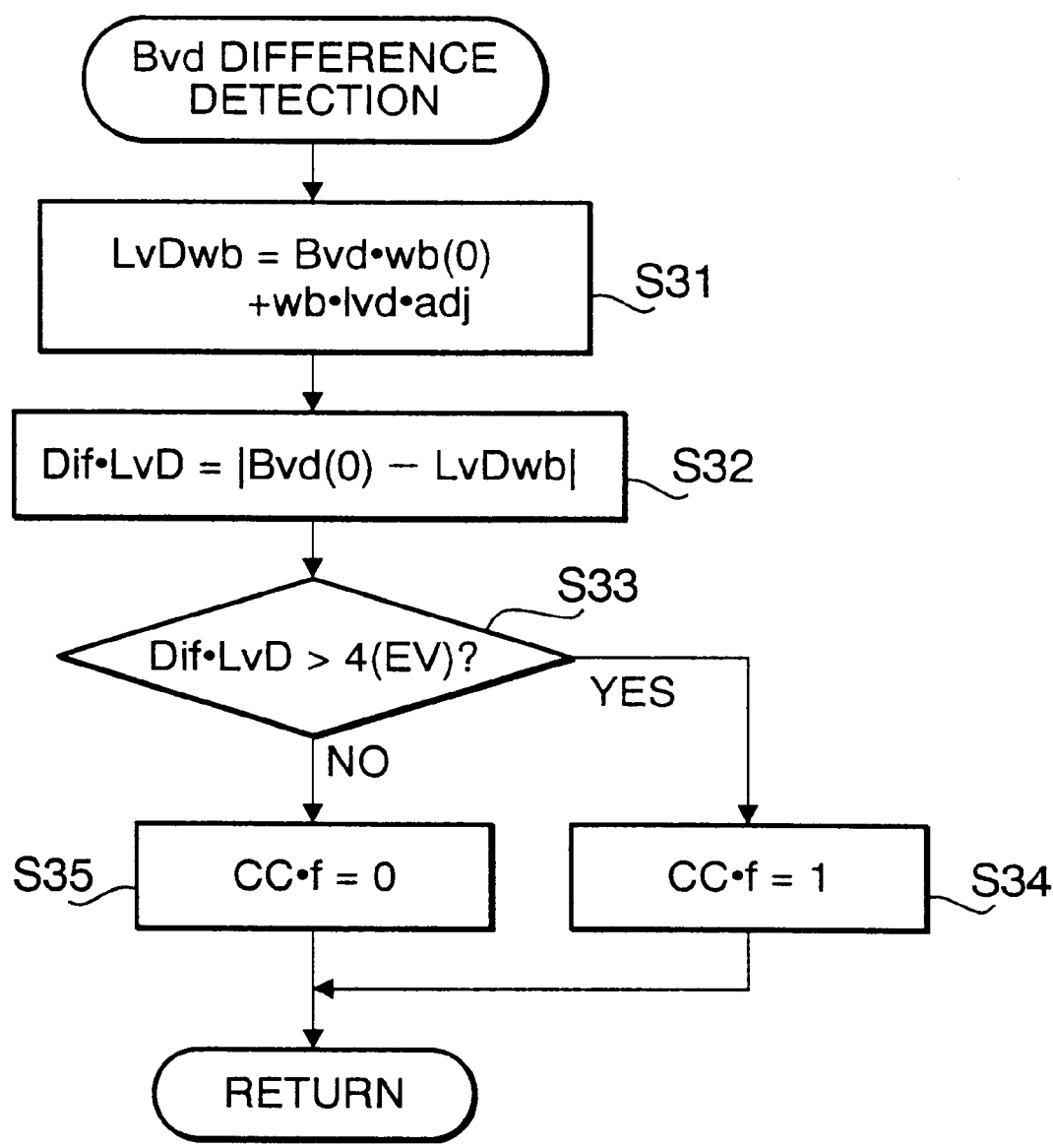
Figure 32C:
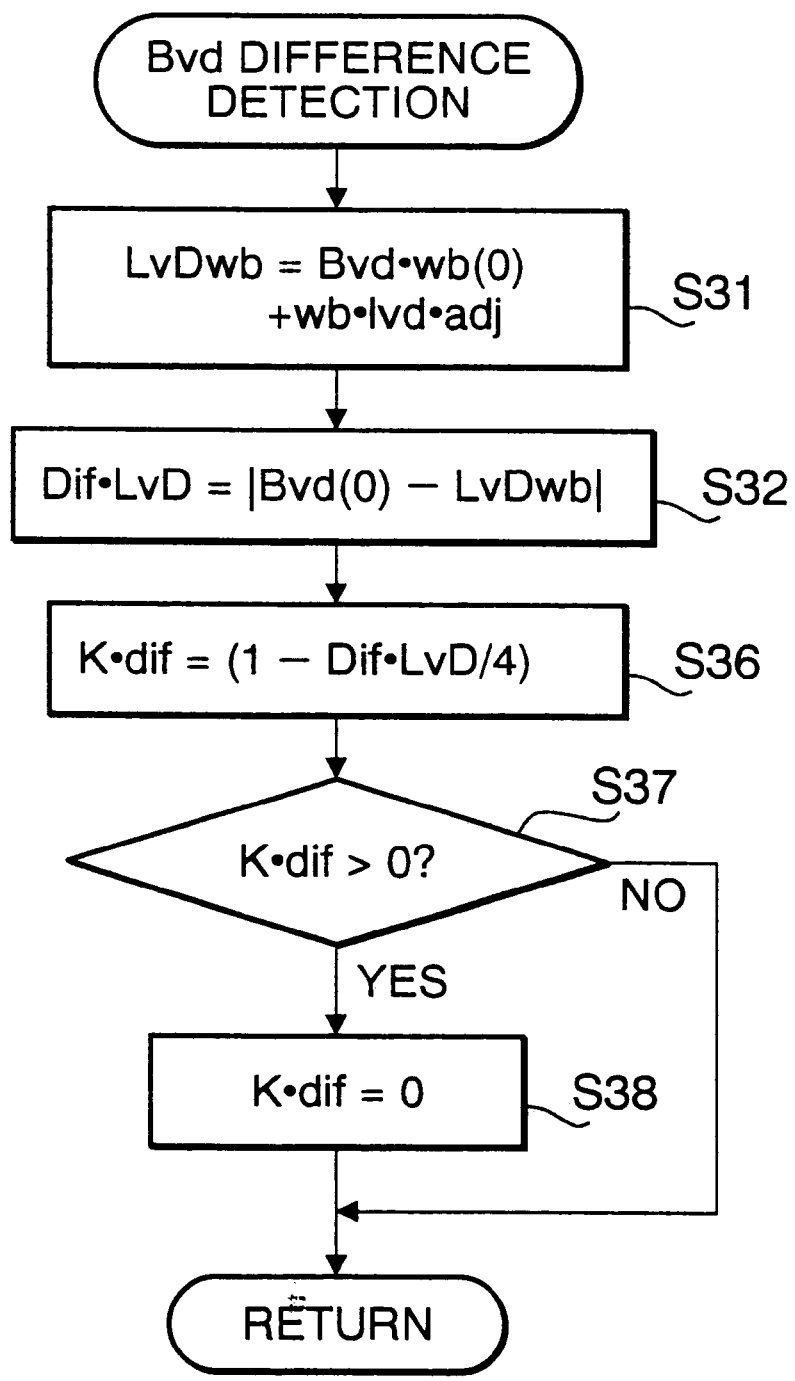

FIGS. 32A–32C show flowcharts illustrating "Bv difference detection procedures" to be employed in the second embodiment.

DESCRIPTION OF THE EMBODIMENTS

Hereinafter, referring to the accompanying drawings, an embodiment according to the present invention will be described.

Figure 1:
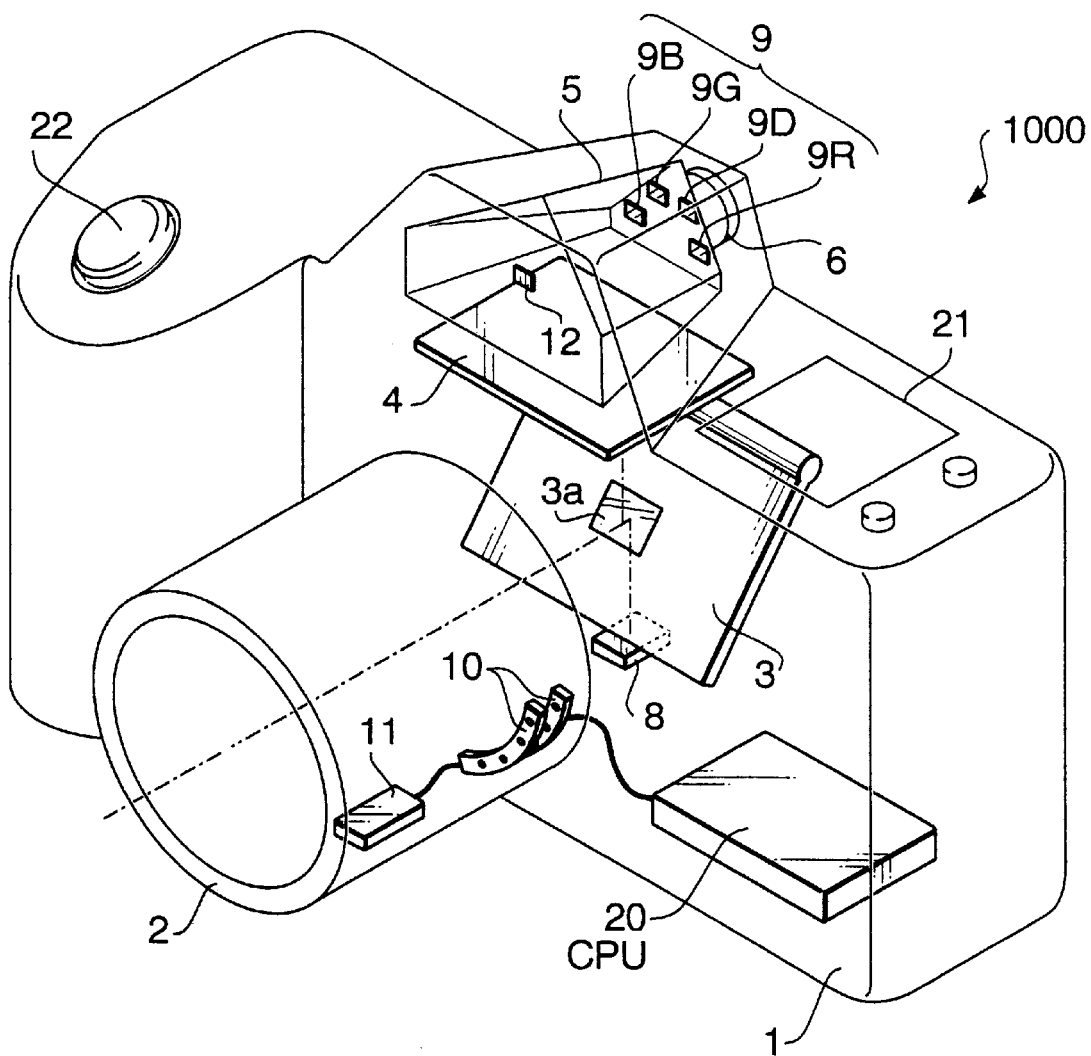
Figure 2:
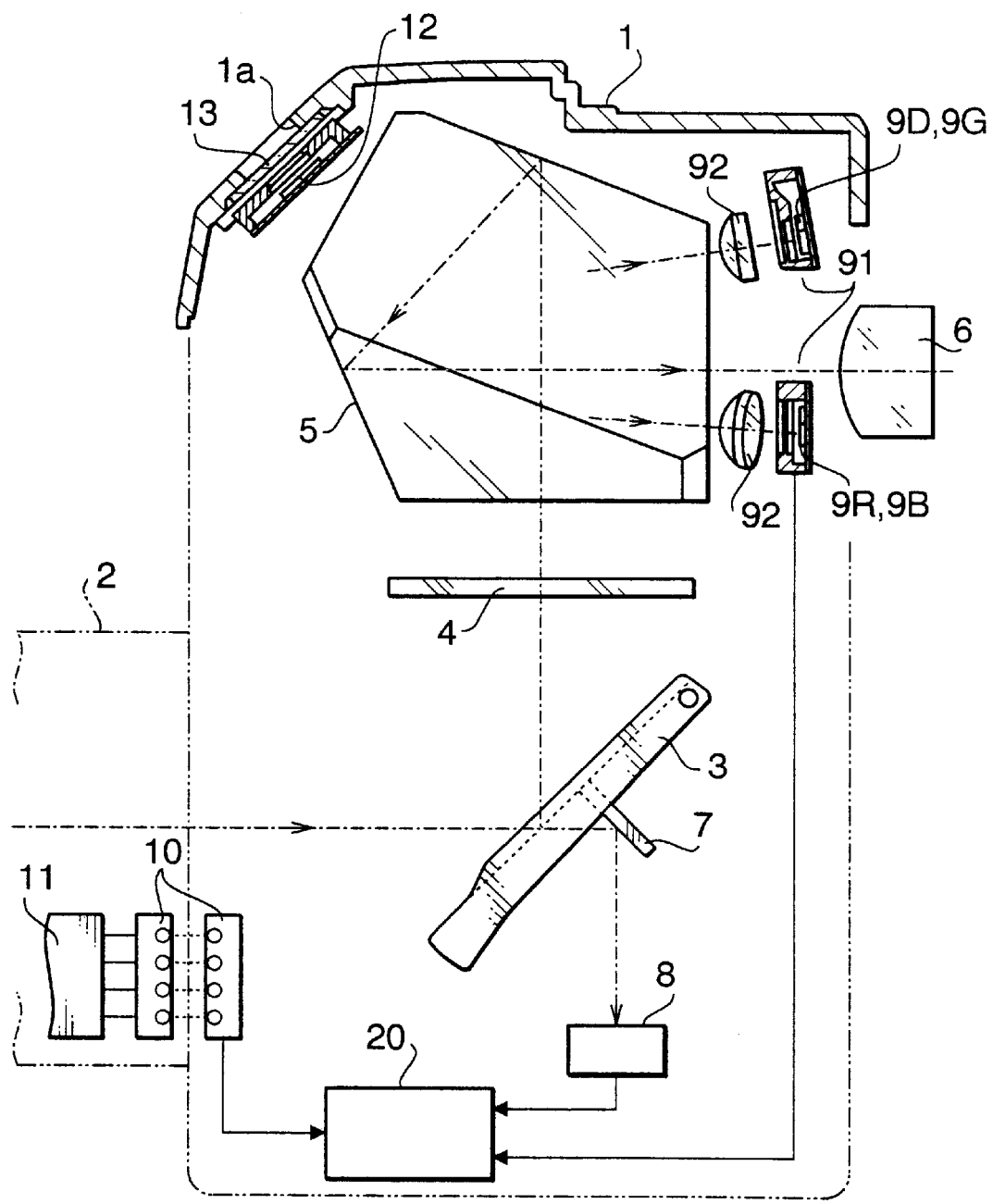

FIG. 1 shows a perspective view of a camera 1000 employing a photometry device according to the invention, and FIG. 2 schematically shows main components of the camera 1000.

The camera 1000 has a camera body 1, to which a photographing lens 2 is detachably coupled. The camera body 1 accommodates a quick return mirror 3, a focusing glass 4, a pentagonal prism 5 (or a pentagonal mirror), and an eyepiece optical system 6. A part of the quick return mirror 3 is formed to be a half mirror 3a (see FIG. 1), and behind the half mirror 3a, an auxiliary mirror 7 is provided. Light passed through the half mirror 3a is reflected by the auxiliary mirror 7, and is directed toward a distance measuring device 8. The distance measuring device 8 is used for an AF (Automatic focusing) control. On the rear side of the pentagonal prism 5, four photometry sensors 9 (9D, 9R, 9G and 9B) are provided (see FIGS. 1 and 2), each of which functions as a photometry element and receives part of light passed through the photographing lens 2. Based on the outputs of the photometry sensors 9, a photometry operation for determining exposure parameters is executed. On an upper front portion of the camera body 1, a window 1a is formed, and a photometry sensor (external light sensor) 12 for receiving light passed through the window 1a is provided, with a milky-white diffusing plate 13 being located therebetween. The external light entered through the window 1a is diffused by the diffusing plate 13 and measured by the photometry sensor 12. The photographing lens 2 and the camera body 1 are electrically connected through electrical contacts 10. Thus, a lens ROM 11 built in the photographing lens 2 is electrically connected to a control circuit 20 accommodated in the camera body 1. On an outer surface of the camera body 1, an LCD (liquid crystal display) 21, and various buttons such as a release button 22 are provided. Furthermore, inside the camera body 1, various mechanisms such as a film winding mechanism are provided. However, such mechanisms are conventionally known, and description thereof will be omitted for the sake of simplicity.

Figure 3A:
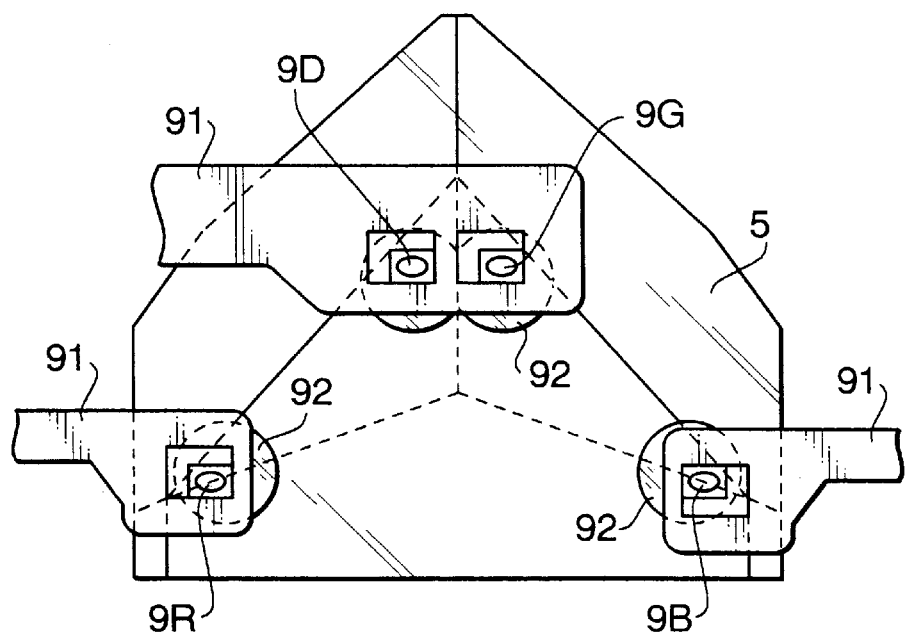
FIG. 3A shows an arrangement of photometry sensors.

FIG. 3A shows a rear view of the pentagonal prism 5. As shown in FIG. 3A, the four photometry sensors 9 includes sensors 9D and 9G provided at an upper central portion on the eyepiece side of the pentagonal prism 5, and sensors 9B and 9R are provided at lower side portions on the eyepiece side of the pentagonal prism 5. The photometry sensors 9D, 9G, 9B and 9R are mounted on an FPC (flexible printed circuit board) 91 and fixedly positioned at the above-described respective positions by the FPC 91. In front of (i.e., on the pentagonal prism side of) each of the photometry sensors 9D, 9G, 9B and 9R, a collective lens 92 is provided to form an object image on each of the sensors 9D, 9G, 9B and 9R (see FIG. 2).

FIG. 4A schematically shows a structure of each of the sensors 9D, 9G, 9B and 9R. As shown in FIG. 3A, each sensor 9 (9D, 9G, 9B or 9R) is constructed as a planar structure photometry IC chip that is configured such that a light receiving section and an amplifier AMP are integrally formed. The light receiving section includes six photometry areas, i.e., a central area A0, a left area A1, a right area A2, an upper area A3, a lower area A4, and a peripheral area A5. FIG. 4B shows a relationship between the photometry areas A0–A5 and portions of an object. The photometry areas A0–A5 of each sensor receives the light from respective portions of an object as indicated in FIG. 4B. The photometry sensor 9G is provided with a green filter GF on its light receiving surface (see FIG. 5B), and receives a green component of light, the photometry sensor 9B is provided with a blue filter BF on its light receiving surface (see FIG. 5C), and receives a blue component of light, and the photometry sensor 9R is provided with a red filter RF on its light receiving surface (see FIG. 5D), and receives a red component of light. In this embodiment, the three sensors 9G, 9B and 9R are used as colorimetry elements. Spectral sensitivity characteristics of the sensors 9G, 9B and 9R respectively provided with the green, blue and red filters GF, BF and RF are indicated in FIG. 6. The sensors 9G, 9B and 9R have peaks in sensitivity at approximately 530 nm, 420 nm, and 630 nm, respectively. The remaining sensor 9D is not provided with a color filter. It should be noted, however, that the spectral sensitivity characteristic of the sensor 9D has its peak within a wavelength range of 500–600 nm, which is close to the visual sensitivity characteristic. The sensor 9D is used as a normal light detecting sensor.

Figure 5A:
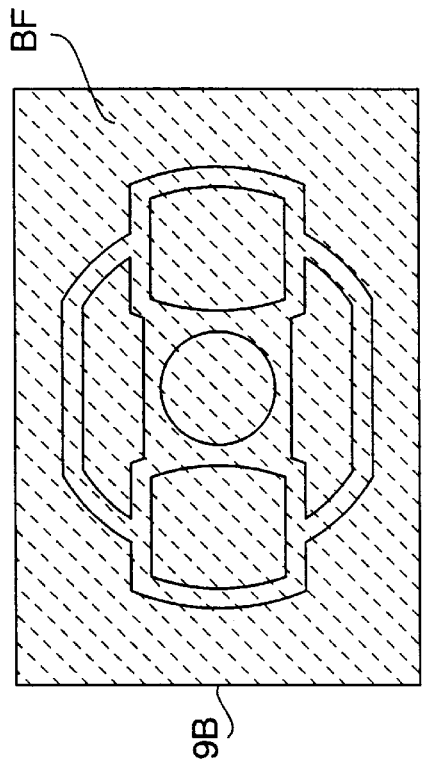
Figure 5D:
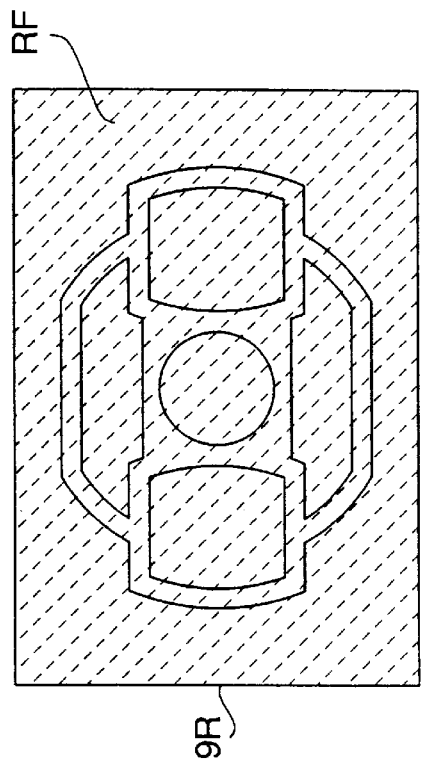
Figure 5B:
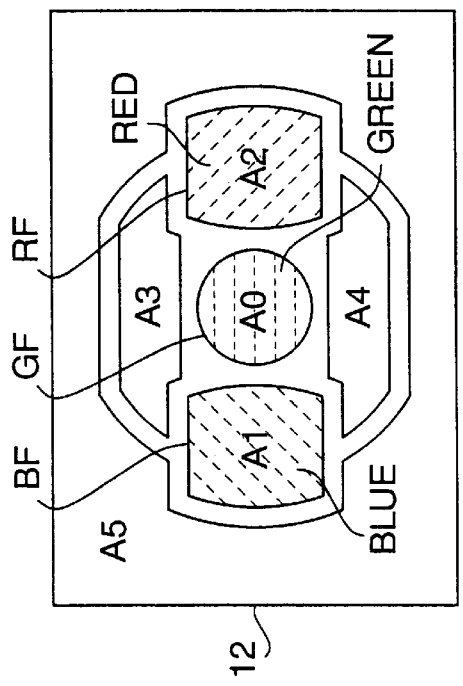
Figure 5C:
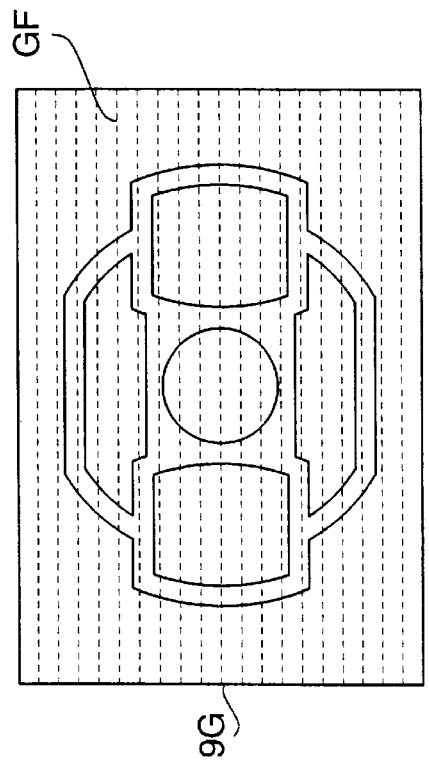

As shown in FIG. 5A, the photometry sensor 12 is formed of the same IC chip as the sensors 9. Among the photometry areas A0–A5 of the photometry sensor 12, however, only the areas A0, A1 and A2 are used. Further, a green filter GF is provided in front of the area A0, a blue filter BF is provided in front of the area A1, and a red filter RF is provided in front of the area A2. The filters GF, BF and RF provided to the photometry sensor 12 have the same spectral transmissivity characteristics as the filters provided to the photometry sensors 9G, 9B and 9R, respectively. With this configuration, the areas A0, A1 and A2 of the photometry sensor 12 receive green, blue and red components of the external light illuminating the object, respectively. Since all the photometry sensors are formed of the same IC chip, the spectral sensitivity, output characteristics and the like are substantially the same. Further, since the same IC chip is used, manufacturing cost can be reduced. Further, since the same filters are used for the areas A0–A2 of the photometry sensor 12 and the photometry sensors 9G, 9B and 9R, respectively, the spectral sensitivity characteristics of these sensors are substantially identical, respectively.

FIG. 7 shows a block diagram of main portions of the camera 1000. The four sensors 9D, 9G, 9B and 9R output values indicative of quantity of received light (components) to the controller 20, respectively. From the photometry sensor 12, photometry values for green, blue and red components of the external light are transmitted to the controller 20. Further, the output (i.e., a distance value) of the distance measuring device 8 is input to the controller 20, which controls the AF device 25 to perform the automatic focusing operation. 671 Furthermore, the controller 20 is connected with a photometry switch SWS and a shutter-release switch SWR. The photometry switch SWS is ON when the release button 22 is half depressed. The shutter-release switch SWR is ON when the shutter button is fully depressed. When the shutter button 22 is depressed halfway and the photometry switch SWS is turned ON, the controller 20 performs a photometry calculation in accordance with a predetermined algorithm, and calculates an exposure value. Then, the controller 20 controls the exposure control device 23 in accordance with the calculated exposure value to perform a photographing operation. Further, the controller 20 drives a display driver 24 to display the calculated exposure value on the LCD panel 21. It should be noted that the controller 20 includes an EEPROM 26 storing various values necessary for the photometry calculation (which will be described in detail later), and a RAM 27 for temporarily storing various pieces of data.

An operation of the photometry device will be described hereinafter.

The camera 1000 has eight photometry modes, which are indicated in FIG. 8. According to the embodiment, when a Bv difference, which is defined as a difference between an exposure value obtained from a photometry output of the photometry sensor 12 and an exposure value obtained from a photometry output of the sensor 9D, is greater than a predetermined threshold value, it is judged that the sensor 12 may likely not meter the external light illuminating the object. FIG. 8 indicates the eight photometry modes to be selectively performed in such a case. The photometry mode may be selected using a dedicated switch or a combination of operation buttons provided to the camera 1000. Such a configuration for selecting one of a plurality of operation modes can easily be achieved by a person skilled in the art in various ways.

It should be noted that if the Bv difference is not greater than the predetermined threshold value, a predetermined fixed value stored in the EEPROM 26 or the output of the photometry sensor 12 is used as the light source data for color compensation, and then based on the outputs of the sensors 9R, 9G and 9B, colorimetric compensation is applied to obtain an appropriate exposure value.

The eight photometry modes will be explained hereinafter.

(1) Mode 1: If the Bv difference, i.e., the difference between the exposure values is greater than the predetermined fixed value, a color judged in the colorimetry procedure is forcibly set to "colorless" and no substantial colorimetric compensation is performed. As mentioned above, if the Bv difference is not greater than the predetermined value, the light source compensation data preliminarily stored in the EEPROM 26 is used for the colorimetric compensation.

(2) Mode 2: If the Bv difference between the exposure values is greater than the predetermined value, the colorimetric compensation is not performed. If the Bv difference is not greater than the predetermined fixed value, the light source compensation data preliminarily stored in the EEPROM 26 is used for the colorimetry procedure.

(3) Mode 3: The fixed value stored in the EEPROM 26 is used as the light source data for light source color compensation to calculate a light source compensation value. Further, based on the Bv difference between the exposure values, a multiplying coefficient is determined. Then, the colorimetric compensation value obtained in the colorimetry procedure is multiplied by the multiplying coefficient to determine the final colorimetric compensation value.

(4) Mode 4: If the Bv difference is greater than the predetermined value, a color judged in the colorimetry procedure is forcibly set to "colorless" and no substantial colorimetric compensation is performed. If the difference is not greater than the predetermined value, the light source compensation data obtained by the sensor 12 is used for the colorimetry procedure.

(5) Mode 5: If the Bv difference is greater than the predetermined value, the colorimetric compensation is not performed. If the Bv difference is not greater than the predetermined value, the light source compensation data obtained by the photometry sensor 12 is used for the colorimetry procedure.

(6) Mode 6: The light source compensation data calculated based on the output of the photometry sensor 12 is used as the light source data for light source color compensation. Further, based on the difference between the exposure values, a multiplying coefficient is determined. Then, the colorimetric compensation value obtained in the colorimetry procedure is multiplied by the multiplying coefficient to determine the final colorimetric compensation value.

(7) Mode 7: It is selected whether the output of the sensor or the predetermined fixed value stored in the EEPROM 26 is used for calculating the light source compensation value. Then the calculated light source compensation value is used for light source color compensation. The colorimetric compensation is performed in either case.

(8) Mode 8: Based on the Bv difference, a multiplying coefficient is determined. Then, the light source compensation value is determined using the multiplying coefficient so that the light source compensation value has a value within a range between a light source compensation value calculated based on the output of the sensor 12 and a light source compensation value calculated based on the fixed value stored in the EEPROM 26. Then, the colorimetric compensation is executed.

FIG. 9 shows a relationship between the photometry Modes 1–8 and procedures to be performed. In this table, the procedures are identified by figure numbers. Circles in the table indicate the procedures performed in respective photometry modes.

A procedure shown in FIG. 10 is a main procedure that is executed regardless of which photometry mode is selected. FIGS. 11–14 show procedures called in the main procedure, and are commonly used regardless of which photometry mode is selected.

As described above, FIG. 10 is a flowchart illustrating the main procedure of a photometry operation. When the release button 22 is half depressed and the photometry switch SWS is ON (S11:YES), a "lens communication procedure" is performed (S12) so that the controller 20 receives data intrinsic to the photographing lens 2 currently mounted onto the camera body 1. Specifically, the data intrinsic to the photographing lens 2 includes an open f-number (full aperture), a focal length of the photographing lens 2 and the like, which may affect the photometry calculation. The data is transmitted from a lens ROM 11 of the photographing lens 2 to the controller 20 through the electrical contacts 10. Then, a "photometry sensor output Bvd calculation procedure" is executed (S13). In this procedure, the photometry sensors 9 (9D, 9G, 9B and 9R) output analog photometry values which are obtained by receiving light through the photographing lens 2, the quick return mirror 3, and the pentagonal prism 5. Then, the analog values are converted into digital brightness values Bvd which can be used in the operation executed by the controller 20. Then, based on the brightness value Bvd obtained at S13 and the lens data intrinsic to the photographing lens 2 retrieved at S12, an "open aperture photometry compensation calculation procedure" is executed (S14) to compensate for errors depending on individual photographing lenses.

At S15, an "exposure value calculation procedure" is executed. In this procedure, based on the brightness value Bvd, which is obtained in accordance with the output of the photometry sensor 9D for normal light, an exposure value Lvd is calculated. In this procedure, parameters for calculating the exposure value Lvd in accordance with photographing conditions, e.g., a rear light condition, a magnification and/or scene of photographing, are obtained. Then, based on the parameters, the exposure value Lvd is calculated.

At S16, based on the brightness value Bvd obtained by each of the sensors 9R, 9B and 9G for the RGB (Red, Green and Blue) color components and the brightness values obtained by the photometry sensor 12, a "colorimetry procedure" is executed. Specifically, based on the brightness values output by the photometry sensor 12, compensation values for compensating errors of the output values of the sensors 9R, 9B and 9G due to the color of the external light are determined. Then, based on the compensation values, the brightness values Bvd obtained by the photometry sensors 9R, 9G and 9B are compensated. Then, based on the compensated brightness values Bvd, the color of the object is determined, and a colorimetric compensation value CC is calculated based on the determined color of the object. In S17, an "exposure value colorimetric compensation procedure" is executed, where the exposure value Lvd obtained at S15 is compensated based on the colorimetric compensation value CC.

At S18, if the shutter-release switch SWR is ON (S18: YES), the exposure control device 23 controls the exposure operation at S20 in accordance with the exposure value Lvd obtained at S17 to execute a photographing operation. If the shutter-release switch SWR is OFF, controls goes to S19, where it is detected whether a photometry timer is OFF.

If the photometry timer is ON (i.e., if a predetermined period has not elapsed) (S19:NO), control proceeds to S12, and the foregoing procedures are repeated. If the photometry timer is OFF (i.e., if the predetermined period has elapsed) (S19:YES), control proceeds to S1.

FIG. 11 is a flowchart illustrating the "lens communication procedure", which is called at S12 of the main procedure shown in FIG. 10.

In the lens communication procedure, the controller 20 accesses the lens ROM 11 through the electrical contacts 10, and reads the data intrinsic to the photographing lens 2 stored in the lens ROM 11 (S101). The data is, stored in the RAM 27 of the controller 20, and control returns. Items included in the data intrinsic to the photographing lens 2 include, for example, a lens type, lens data, the shortest focusable distance, a focusable range, a focal length of the photographing lens, an exit pupil position, an open f-number, an aperture efficiency and the like. In this embodiment, the controller 20 reads at least the focal length, the exit pupil position, the open f-number and the aperture efficiency, and stores the data in the RAM 27.

FIG. 12 shows a flowchart illustrating the "photometry sensor Bvd calculation procedure", which is called at S13 in the main procedure shown in FIG. 10.

In this procedure, data Bvad(i) (where, i=0, 1, . . . , 5) which represents A/D converted output voltages (analog data) of the photometry areas Ai (i=0, 1, . . . , 5) shown in FIG. 4A of the photometry sensor 9D for normal light are obtained. Further, data Bvad·g(i), Bvad·b(i) and Bvad·r(i) which represent A/D converted values of the output voltages of the photometry areas Ai (i=0, 1, 2, . . . 5) of each of the sensors 9G, 9B and 9R for color components are obtained. Then, the A/D converted values Bvad(i) of the sensor 9D output are adjusted to brightness values Bvd(i) (S111). The A/D converted values Bvad·g(i), Bvad·b(i) and Bvad*19 r(i)* (i=0, 1, 2, . . . 5) are also adjusted to the brightness values Bvd·g(i), Bvd·b(i) and Bvd·r(i), respectively (S112). Further, the A/D converted values Bvad·wb(i) (where i=0, 1 and 2), which represent the outputs from the areas A0–A2 of the photometry sensor 12, respectively, are adjusted to the brightness values Bvd·wb(i), respectively (S113). It should be noted that the A/D conversion is a well-known procedure, and therefore, description thereof is not given herein.

FIG. 13 is a flowchart illustrating the "open aperture photometry compensation calculation procedure" which is called at S14 of the main procedure shown in FIG. 10.

At S121, an open aperture photometry compensation value Mndl(i) is calculated based on the focal length, the exit pupil position, the open f-number and the aperture efficiency stored in the RAM 27. Compensation values mv1, mv2, mv3 and mv4 for compensating for shift amounts with respect to the reference photometry values due to the individual differences of the optical characteristics of the cameras, and the focal length, the exit pupil position, the open aperture and the aperture efficiency, are determined. Then, the sum of the compensation values mv1+mv2+mv3+mv4 is obtained, which is referred to as the open aperture compensation value Mndl(i). Following the above procedure, the open aperture compensation values Mndl·g(i), Mndl·b(i), and Mndl·r(i) are calculated. Then the open aperture compensation value Mndl(i) is added to the brightness value Bvd(i), and then the sum is determined as a new brightness value Bvd(i). Thus, the following calculation is executed at S121:

$$Bvd(i)=Bvd(i)+Mndl(i).$$

Similar to the above, with respect to the brightness values Bvd·g(i), Bvd·b(i) and Bvd·r(i) obtained by the photometry sensors 9G, 9B and 9R, open aperture photometry compensation values Mndl·g(i), Mndl·b(i) and Mndl·r(i) are added to obtain newly defined brightness values (S122). That is:

$$Bvd·g(i)=Bvd·g(i)+Mndl·g(i).$$

$$Bvd·b(i)=Bvd·b(i)+Mndl·b(i).$$

$$Bvd·r(i)=Bvd·r(i)+Mndl·r(i).$$

As a result, each brightness value is free from the affect of the individual differences of photographing lenses 2 when coupled to the camera body 1.

FIG. 14 is a flowchart illustrating an "exposure value calculating procedure", which is called at S15 of the main procedure.

In the "exposure value calculating procedure", the brightness values Bvd(i) are compensated in accordance with a photographing condition to obtain an appropriate exposure value Lvd. Specifically, in the "exposure value calculating procedure", the brightness values Bvd(i) (where i=0–5) corresponding to the photometry areas A0–A5 are compared with each other, or the brightness of the object as a whole is detected, and a condition of the object to be photographed (e.g., photographing with rear light, photographing at dusk, or photographing at night) is determined. Then, based on the determined condition, the brightness values Bvd(i) are weighted, or one of the brightness values Bvd(i) is selected and then the exposure value Lvd suitable to the photographing condition is determined. Then, based on the brightness values Bvd(i), parameters for calculating the exposure value Lvd are calculated at S131. Then, the upper brightness limit of a parameter is calculated (S132), a compensation value for the rear light is calculated (S133), weighting parameters are calculated (S134), a photographing magnification M is checked (S135), a photographing scene is judged (S136), a positive compensation value for a high brightness photographing scene is calculated (S137), and the exposure value Lvd is calculated based on the calculated parameters and the brightness values Bvd(i) (S138).

At S16 of the main procedure shown in FIG. 10, a "colorimetry procedure" is called. In the "colorimetry procedure", the color of the object is detected, and a colorimetric compensation value CC is calculated in accordance with the detected color of the object. According to the embodiment, depending on the selected photometry mode, a different procedure is employed as the colorimetry procedure, as indicated in FIG. 9. Specifically, according to the embodiment, three procedures are selected depending on the photometry mode. That is, if the photometry mode 3, 6, 7 or 8 is selected, the colorimetry procedure shown in FIG. 15A is executed; if the photometry mode 1 or 4 is selected, the colorimetry procedure shown in FIG. 15B is executed; and if the photometry mode 2 or 5 is selected, the colorimetry procedure shown in FIG. 15C is executed.

FIG. 15A is a flowchart illustrating the "colorimetry procedure" called at S16 of the main procedure when the selected photometry mode is 3, 6, 7 or 8.

At S20, colorimetric parameters are initialized (i.e., set to initial values). At S21, the Bv difference, i.e., the difference between an exposure value obtained based on the output of the photometry sensor 9D and an exposure value obtained based on the output of the photometry sensor 12 (i.e., the metering value of the external light source) is calculated. Depending on the spectral characteristics, i.e., the color temperature or the like of a light source illuminating the object, the colorimetric value varies. At S22, a "light source compensation procedure" is executed to obtain compensation values for the effects of the color temperature of the light source. At S23, a "light source difference compensation procedure" is executed using the compensation values obtained at S22. At S24, a "colorimetric parameter calculation procedure" for obtaining colorimetric parameters, which will be used for execution of a "colorimetric judgment procedure", is executed. At S25, a "colorimetric constant setting procedure" is executed to set constants used for color measurement. At S26, a "color judgment procedure" for judging a color based on the parameters and constants obtained in the preceding steps is executed. At S27, an "area colorimetric compensation value calculating procedure" is executed for calculating colorimetric compensation values CC (i) for the photometry areas A0–A5 in accordance with the judged color. At S28, a CC calculating procedure for calculating a colorimetric compensation value CC for an entire object in accordance with the colorimetric compensation values CC(i) for the respective photometry areas is executed.

FIG. 15B is a flowchart illustrating the "colorimetry procedure" called at S16 of the main procedure when the photometry mode is 1 or 4 is selected.

The procedure shown in FIG. 15B is similar to that shown in FIG. 15A except that a decision step S21A is inserted between steps S21 and S22.

At S21A, a colorimetric compensation inhibition flag CC·f, which represents a result of comparison of the exposure difference value with a predetermined value, is checked. The flag CC·f is set to zero when the Bv difference value is not greater than the predetermined value; and the flag CC·f is set to one when the Bv difference value is greater than the predetermined value.

If the flag CC·f is not equal to one (S21A:NO), control proceeds to S22, and therefore, in this case, the following procedure is similar to that described above with reference to FIG. 15A.

If the flag CC·f is equal to one (S21A:YES), control proceeds to S26, that is, steps S22–S25 are skipped. In this case, the colorimetry result is forcibly set to no-color at S26. Therefore, as a result, the colorimetric compensation value CC calculated in S27 and S28 is set to zero. Therefore, the colorimetric compensation is not substantially performed.

FIG. 15C is a flowchart illustrating the "colorimetry procedure" called at S16 of the main procedure when the photometry mode is 2 or 5 is selected. The procedure shown in FIG. 15C is similar to that shown in FIG. 15A except that a decision step S21A is inserted between steps S21 and S22.

At S21A, a colorimetric compensation inhibition flag CC·f, which represents a result of comparison of the Bv difference value with a predetermined value, is checked. The flag CC·f is set to zero when the Bv difference value is not greater than the predetermined value; and the flag CC·f is set to one when the BV difference value is greater than the predetermined value.

If the flag CC·f is not equal to one (S21A:NO), control proceeds to S22, and therefore, in this case, the following procedure is similar to that described above with reference to FIG. 15A.

If the flag CC·f is equal to one (S21A:YES), control proceeds to S22B where the colorimetric compensation value CC is forcibly set to zero without performing the colorimetric procedure, and steps S22–S28 are skipped.

FIGS. 16A shows a Bv difference detection procedure for the photometry modes 1, 2, 4 and 5; FIG. 16B shows a Bv difference detection procedure for the photometry mode 7: and FIG. 16C shows a Bv difference detection procedure for the photometry modes 3, 6 and 8.

In the Bv difference detection procedure shown in FIG. 16A, the colorimetric compensation value CC is substantially set to zero. At S31, among the outputs of the photometry sensor 12, the green brightness value Bvd·wb(0) in the photometry area A0 is retrieved. Since the green area of the photometry area A0 has the similar spectral characteristics as the normal light photometry sensor 9D, by comparing the outputs of the both sensors, the Bv difference can be obtained. In S31, a compensation value wb·lvd·adj is retrieved from the EEPROM 26, and the output Bvd·wb(0) is compensated using the compensation value wb·lvd·adj to calculate the exposure value LvDwb in accordance with the following formula.

$$LvDwb = Bvd \cdot wb(0) + wb \cdot lvd \cdot adj$$

where, wb·lvd·adj is a compensation value used to compensate for the output of the photometry sensor 12 such that the exposure value Lvd obtained based on the output of the normal light sensor 9D, which meters an object through the photographing lens 2, is equal to the metered value of the area A of the photometry sensor 12 when the sun light or a light source having the same spectral radiation characteristics illuminates an object whose reflectivity is substantially 18%.

Then, at S32, an absolute value of a difference Dif·Lvd between the exposure value Lvd based on the metered value Bvd output by the normal photometry sensor 9D (i.e., the value obtained at S15 of FIG. 10) and the exposure value LvDwb obtained at S31 is calculated as follows.

$$Dif \cdot Lvd = |Lvd \cdot LvDwb|$$

Then, the calculated difference value Dif·Lvd is compared with a predetermined value 4 corresponding to 4 Ev (S33). If the difference value Dif·Lvd is greater than 4 (S33:YES), the colorimetry flag CC·f is set to one (S34), while if the difference value Dif·Lvd is not greater than 4 (S33:NO), the colorimetry flag CC·f is set to zero (S35).

FIG. 16B shows a Bv difference detection procedure for the photometry mode 7.

In the Bv difference detection procedure shown in FIG. 16B, the colorimetric compensation value CC is selectively set to one of the photometry data of the photometry sensor 12 or the fixed value stored in the EEPROM 26.

Similarly to the procedure shown in FIG. 16A, the exposure value LvDwb is calculated (S31), and the difference value Dif·LvD is calculated at S32.

Then, the calculated difference value Dif·Lvd is compared with a predetermined value 4 corresponding to 4 Ev (S33).

If the difference value Dif·LvD is greater than 4 (S33:YES), the light source compensation selecting flag LSC·f is set to one (S34A) so that the light source compensation is executed using the fixed value stored in the EEPROM 26, while if the difference value Dif·LvD is not greater than 4 (S33:NO), the light source compensation flag LSC·f is set to zero (S35A) so that the light source compensation is executed using the photometry data of the light source detection sensor 12.

FIG. 16C shows a Bv difference detection procedure for the photometry modes 3, 6 and 8.

In the Bv difference detection procedure shown in FIG. 16C, the multiplying factor K·dif is calculated. 119 Similarly to the procedure shown in FIG. 16A, the exposure value LvDwb is calculated (S31), and the difference value Dif·LvD is calculated at S32.

Then, based on the calculated difference value Dif·Lvd, a Bv difference compensation factor K·dif is calculated in accordance with a formula below.

$$K \cdot dif = 1 - Dif \cdot LvD/4.$$

According to this formula, the Bv difference value is weighted by ¼ and then the weighted value is subtracted from a reference coefficient "one". Thus, the effect of the Bv difference is represented by the Bv difference compensation factor K·dif.

If the calculated factor K·dif is negative (i.e., smaller than zero) (S37:YES), the factor K·dif is forcibly set to zero (S38).

FIGS. 17A, 17B, 18A, 18B and 19 show flowcharts illustrating the "light source compensation procedures" one of which is called at S22 of FIG. 15A, 15B or 15C.

In the embodiment, when the initial Bvd value, which has been set at S20, of the photometry sensors 9 is determined, a predetermined light source (light source A) for adjustment is used. When a photographing is to be executed, the Bvd should be compensated in accordance with the actually used light source, for example, the sun light. In the procedure shown in FIGS. 17A–17B and 18A–18B, relative compensation values of B (blue) and R (red) components with respect to the value for the green component are obtained.

Figure 17A:
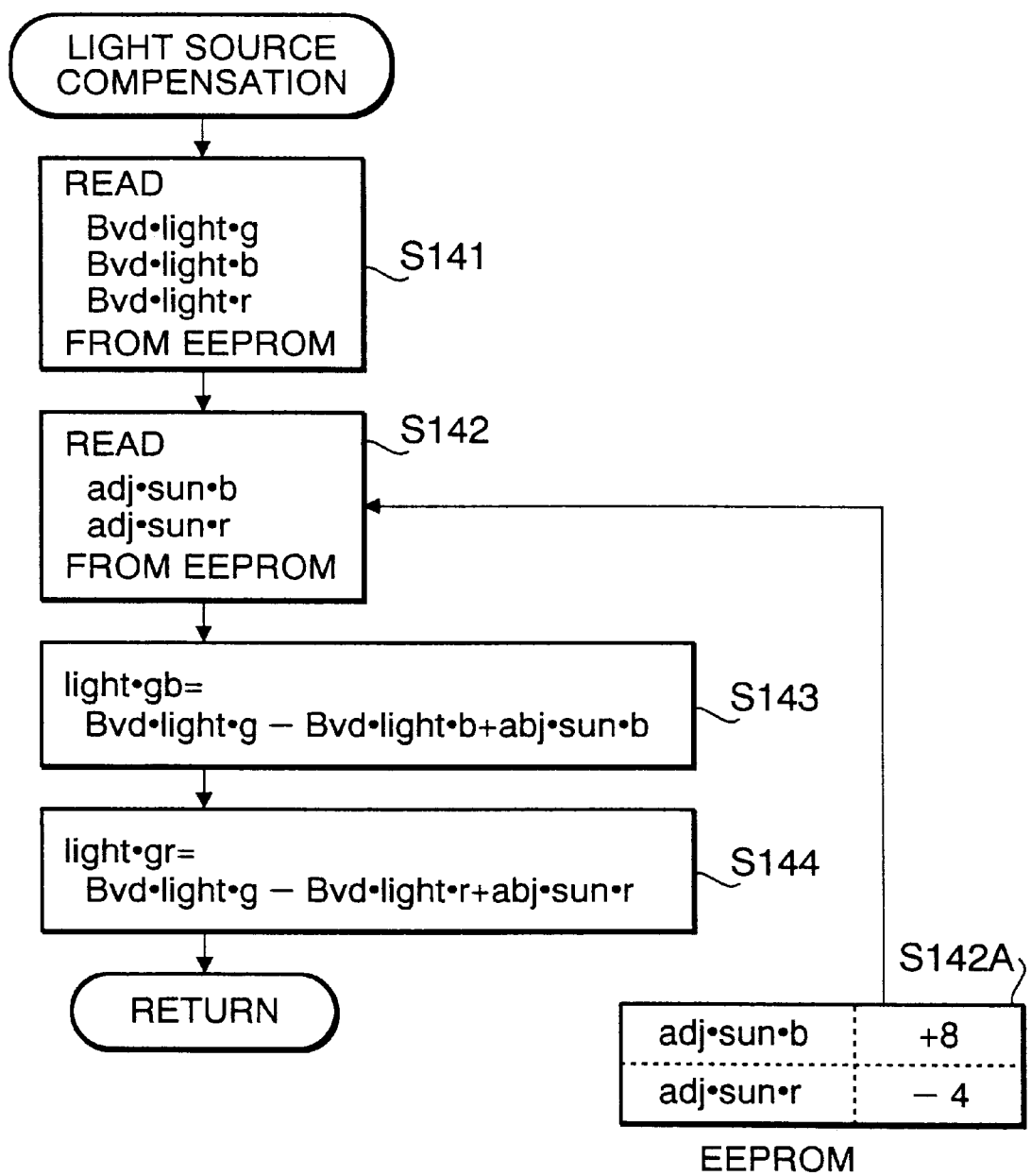

FIG. 17A shows the light source compensation procedure corresponding to the photometry mode 1, 2 and 3, wherein a fixed value is used as the light source data.

Specifically, for the color components G, B and R, the brightness data Bvd·light·g, Bvd·light·b, and Bvd·light·r are read from the EEPROM 26 (S141). Then, a light source adjustment value adj·sun·b for the photometry sensor 9B and a light source adjustment value adj·sun·r for the photometry sensor 9R with respect to the value for G component are read from the EEPROM 26 (S142, S142A). In the embodiment, the light source adjustment values are as follows.

adj·sun·b=+8 adj·sun·r=−4

It should be noted that, if the adjustment of the sensors 9 is executed using the sun light instead of the predetermined light source A, the light source adjustment values are all zero.

Then, based on the brightness data and the light source adjustment values, a light source compensation value light·gb for the photometry sensor 9B is obtained as follows (S143).

light·gb=Bvd·light·g−Bvd·light·b+adj·sun·b

Similarly, a light source compensation value light·gr for the photometry sensor 9R is obtained as follows (S144).

light·gr=Bvd·light·g−Bvd·light·r+adj·sun·r

Figure 17B:
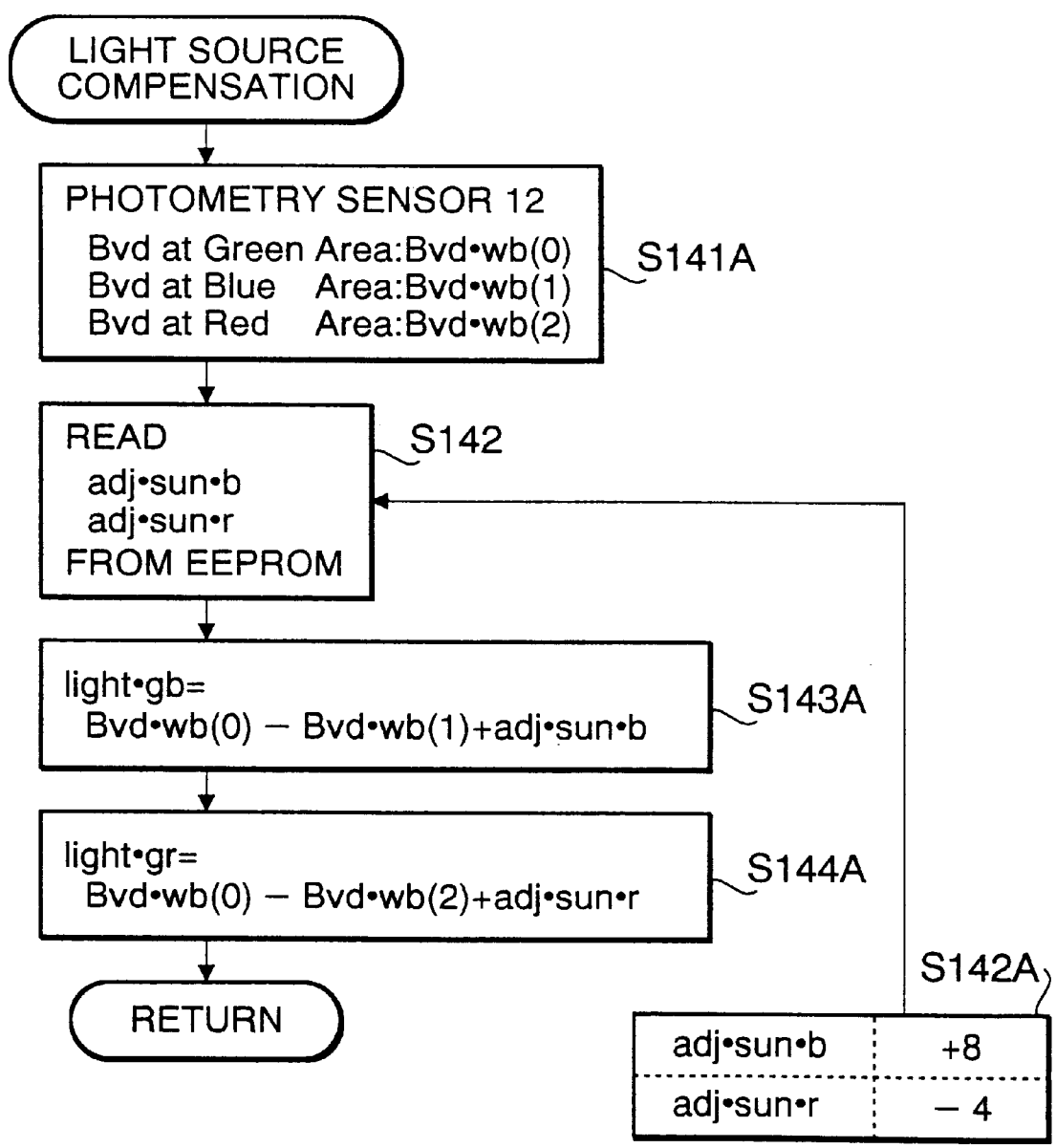

FIG. 17B shows the light source compensation procedure corresponding to the photometry mode 4, 5 and 6, wherein a metered value of the photometry sensor 12 is used as the light source data.

Specifically, for the color components G, B and R, the brightness data Bvd·wb(0), Bvd·wb(1), and Bvd·wb(2), which are obtained at the areas A0, A1 and A2 of the photometry sensor 12 (FIG. 10 S13), are retrieved (S141A). Then, a light source adjustment value adj·sun·b for the photometry sensor 9B and a light source adjustment value adj·sun·r for the photometry sensor 9R with respect to the value for G component are read from the EEPROM 26 (S142, S142A). Similarly to the case shown in FIG. 17A, the light source adjustment values are as follows.

adj·sun·b=+8 adj·sun·r=−4

It should be noted that, if the adjustment of the sensors 9 is executed using the sun light instead of the predetermined light source A, the light source adjustment values are all zero.

Then, based on the brightness data and the light source adjustment values, a light source compensation value light·gb for the photometry sensor 9B is obtained as follows (S143A).

light·gb=Bvd·wb(0)−Bvd·wb(1)+adj·sun·b

Similarly, a light source compensation value light·gr for the photometry sensor 9R is obtained as follows (S144A).

light·gr=Bvd·wb(0)−Bvd·wb(2)+adj·sun·r

Figure 18A:
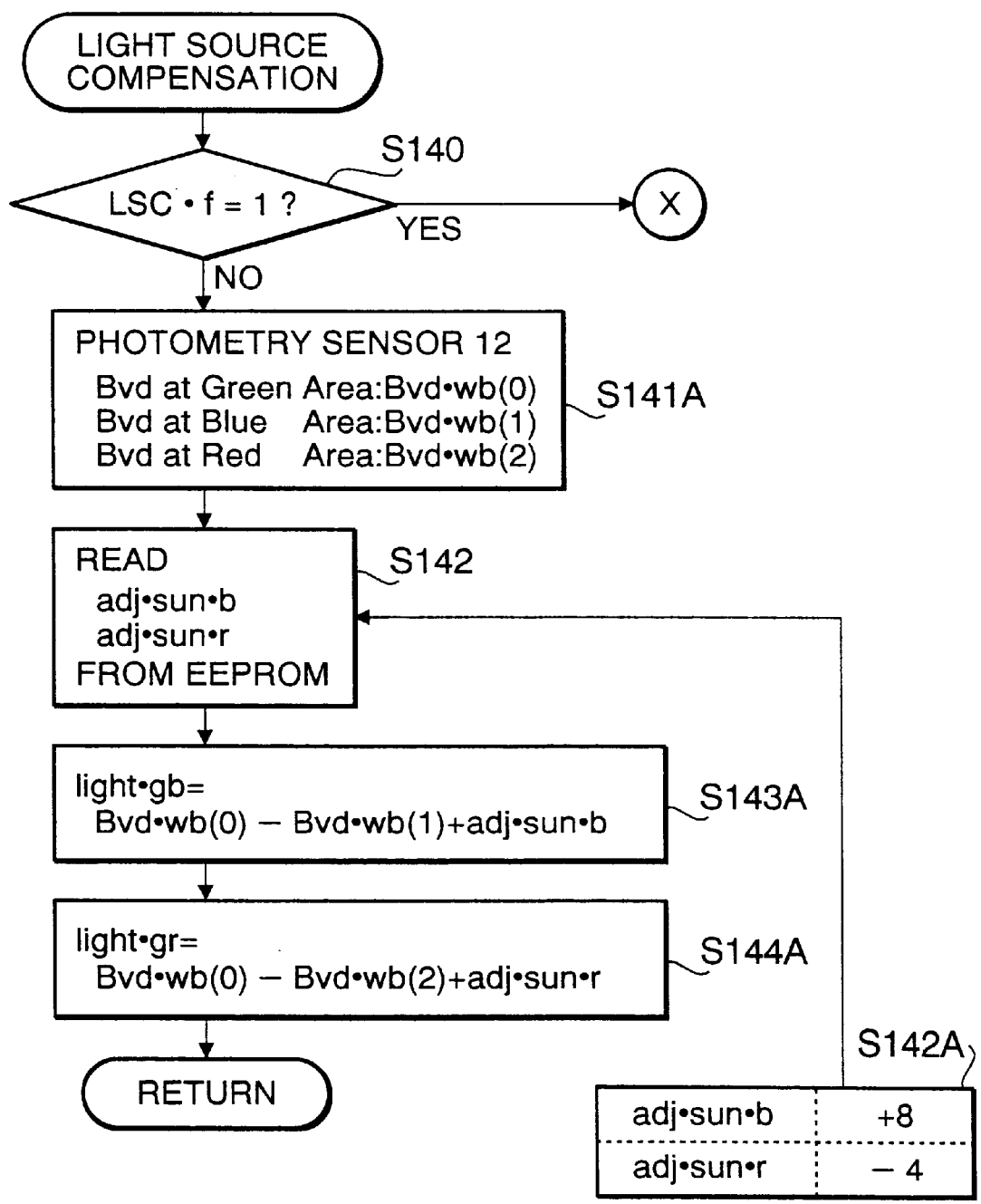
Figure 18B:
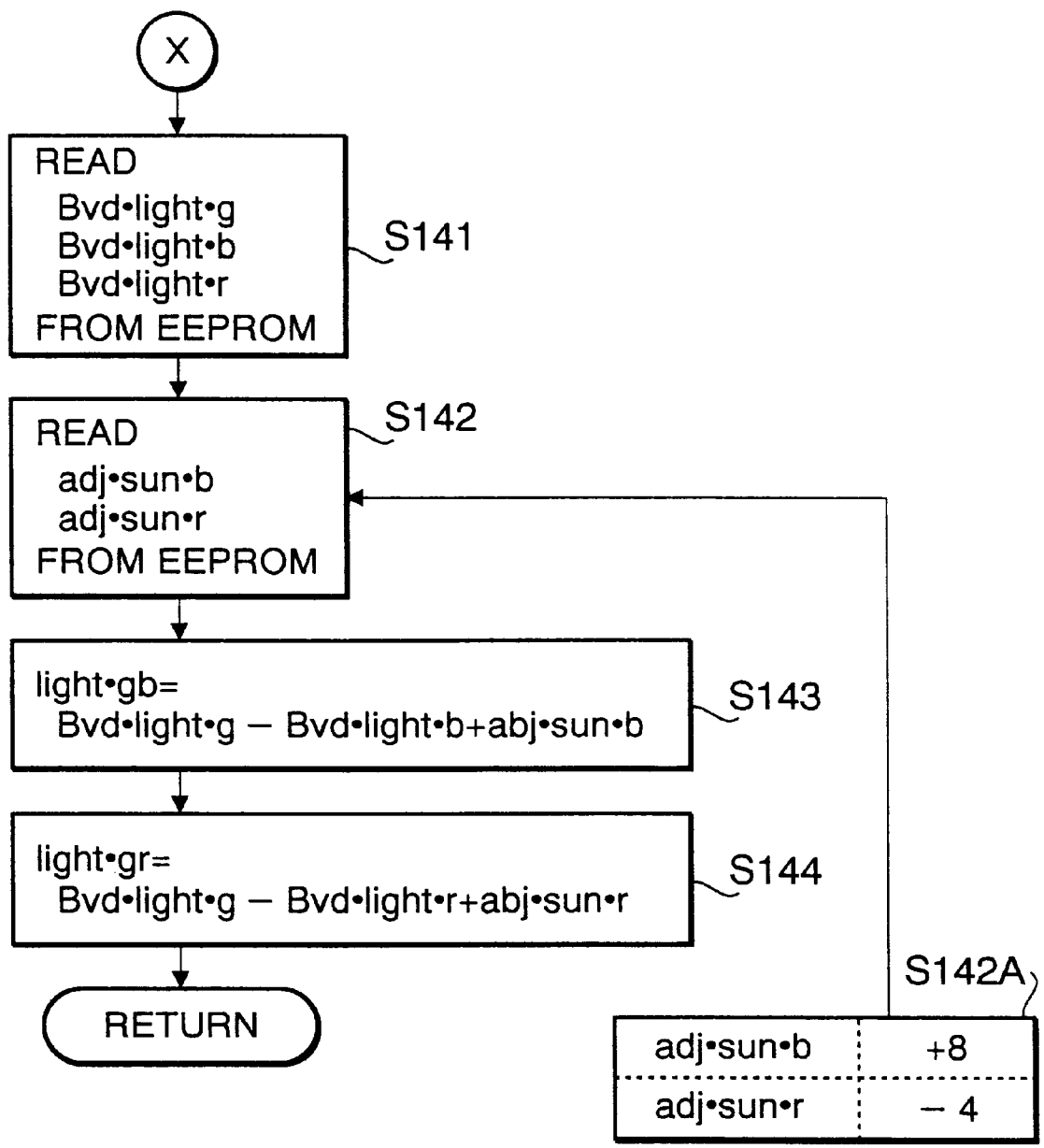

FIGS. 18A and 18B show a flowchart illustrating the light source compensation procedure corresponding to the photometry mode 7, wherein a fixed value stored in the EEPROM 26 or the metered value of the photometry sensor 12 is selectively used as the light source data.

As shown in FIG. 18A, at S140, the light source compensation selecting flag LSC·f, which is set in the Bv difference detection procedure, is judged.

If the flag LSC·f is equal to zero (S140:NO), the Bv difference is equal to or less than 4 EV. In this case, it is judged that the photometry sensor 12 meters the external light source illuminating the object, and the light source compensation value is calculated based on the metered value of the photometry sensor 12 (FIG. 18A: S141A onwards). It should be noted that the procedure from S141A through S144A is similar to that shown in FIG. 17B, and therefore, description thereof will not be repeated.

If the flag LSC·f is equal to one (S140:YES), the Bv difference is greater than 4 EV. In this case, it is judged that the photometry sensor does not meter the external light source for illuminating the object, and the light source compensation value is calculated based on the fixed value (FIG. 18B: S141 onwards). It should be noted that the procedure from S141 through S144 is similar to that shown in FIG. 17A, and therefore, description thereof will not repeated.

Figure 19:
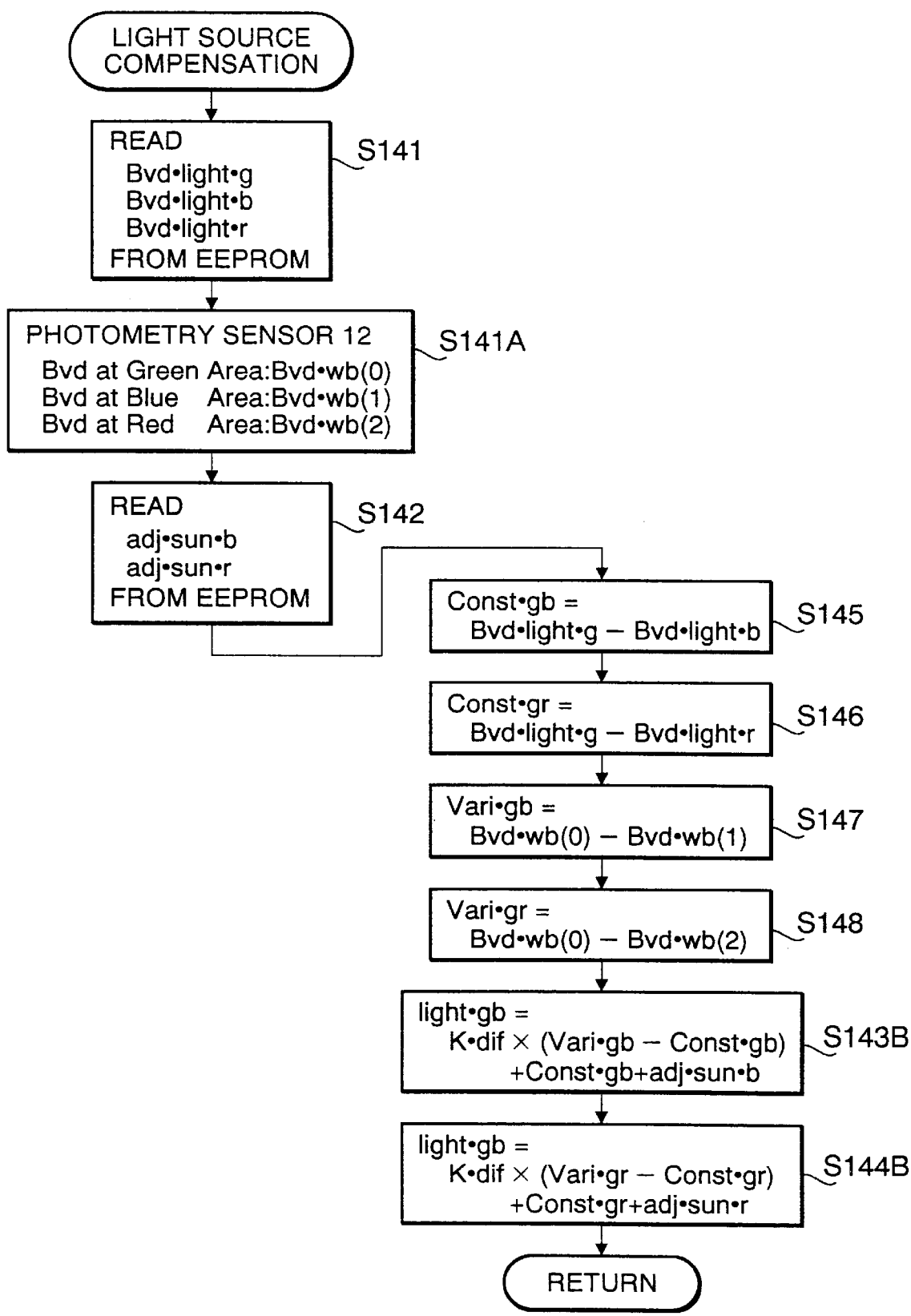

FIG. 19 show a flowchart illustrating the light source compensation procedure corresponding to the photometry mode 8, wherein the light source data is calculated, using the coefficient K·dif, so that the light source compensation value is set to a value within a range between the fixed value stored in the EEPROM 26 and the metered value of the photometry sensor 12.

Firstly, as in the procedure shown in FIG. 17A, for the color components G, B and R, the brightness data Bvd light·g, Bvd·light·b, and Bvd·light·r are read from the EEPROM 26 (S141). Next, as in the procedure shown in FIG. 17B, for the color components G, B, and R, the brightness data Bvd·wb(0), Bvd·wb(1), and Bvd·wb(2), which are obtained at the areas A0, A1 and A2 of the photometry sensor 12 (FIG. 10, S13), are retrieved (S141A). Then, a light source adjustment value adj·sun·b for the photometry sensor 9B and a light source adjustment value adj·sun·r for the photometry sensor 9R with respect to the value for G component are read from the EEPROM 26 (S142). The light source adjustment values are as follows.

$$adj·sun·b=+8$$

$$adj·sun·r=-4$$

It should be noted that, if the adjustment of the sensors 9 is executed using the sun light instead of the predetermined light source A, the light source adjustment values are all zero.

Next, based on the light source data obtained at S141, fixed relative light source data Const·gb and Const·gr of the light source data of the B and R photometry sensors with respect the G photometry sensor are calculated as follows (S145, S146).

$$Const·gb=Bvd·light·g-Bvd·light·b$$

$$Const·gr=Bvd·light·g-Bvd·light·r$$

Similarly, based on the light source data obtained at S141A, relative variation data Vari·gb and Vari·gr representing variation of the outputs of the B photometry sensor and R photometry sensor with respect to the light source data output by the G photometry sensor are calculated in accordance with the following formulae (S147 and S148).

$$Vari·gb=Bvd·wb(0)-Bvd·wb(1)$$

$$Vari·gr=Bvd·wb(0)-Bvd·wb(2)$$

Then, by applying weighting, using the Bv difference compensation coefficient K·dif, to the fixed relative light source data Const·gb and the variable relative light source data Vari·gb of the B photometry sensor, a light source compensation value light·gb for the B photometry sensor is calculated. In this embodiment, the fixed relative light source data Const·gb is subtracted from the variable relative source data Vari·gb, and then, the Bv difference compensation coefficient K·dif is multiplied to apply weighting. Then, the fixed relative light source data Const·gb and the B photometry sensor light source adjustment value adj·sun·b retrieved at S142 are added (S143B) as indicated below.

$$light·gb=K·dif×(Vari·gb-Const·gb)+Const·gb+adj·sun·b$$

Similarly, by applying weighting, using the Bv difference compensation coefficient K·dif, to the fixed relative light source data Const·gr and the variable relative light source data Vari·gr of the R photometry sensor, a light source compensation value light·gr for the R photometry sensor is calculated. Similarly to the above, the fixed relative light source data Const·gr is subtracted from the variable relative source data Vari·gr, and then, the Bv difference compensation coefficient K·dif is multiplied to apply weighting. Then, the fixed relative light source data Const·gr and the R photometry sensor light source adjustment value adj·sun·r retrieved at S142 are added (S144B) as indicated below.

$$light·gr=K·dif×(Vari·gr-Const·gr)+Const·gr+adj·sun·r$$

As above, based on the light source compensation values for B and R components obtained at S142, procedures shown in FIGS. 20, 22, 23, 25 and 26 are executed. It should be noted that these procedures are always performed regardless of which photometry mode is selected.

FIG. 20 is a flowchart illustrating the "light source difference compensation procedure", which is called at S23 in FIG. 15A, 15B or 15C. In this procedure, based on the light source compensation values for light·gb and light·gr, the light source compensation is applied to the brightness values Bvd·b(i) and Bvd·r(i) (i=0–5) obtained at areas A0–A5 of the photometry sensors 9B and 9R, respectively.

At S151, for each photometry area of the photometry sensor 9B, the following calculation is executed.

$$Bvd·b(i)=Bvd·b(i)+light·gb.$$

At S152, for each photometry area of the photometry sensor 9R, the following calculation is executed.

$$Bvd·r(i)=Bvd·r(i)+light·gr.$$

With the above compensation, the photometry sensors 9G, 9B and 9R has the same photometric characteristics for the external light source such as the sunlight. If there is no effects of the external light source, the outputs of the photometry sensors 9G, 9B and 9R are standardized with respect to a predetermined reference light source.

The light source difference compensation will be described in further detail.

Figure 21A:
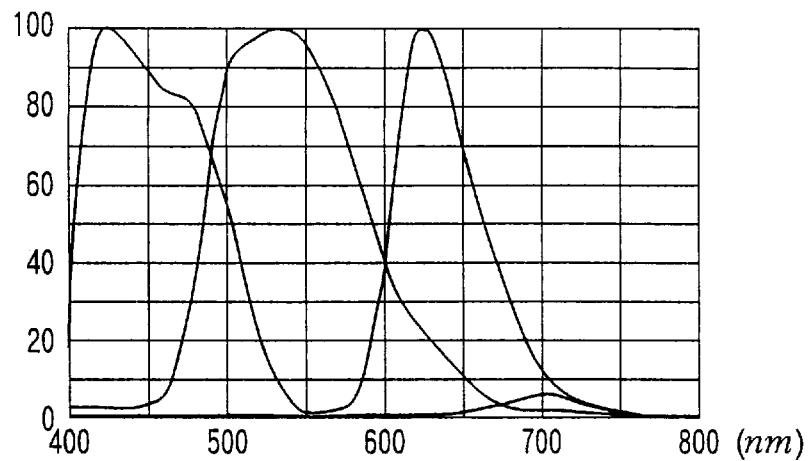
Figure 21B:
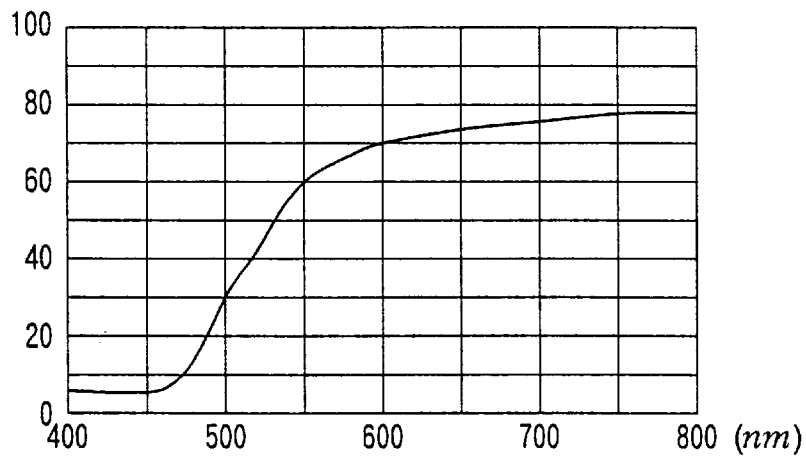
Figure 21C:
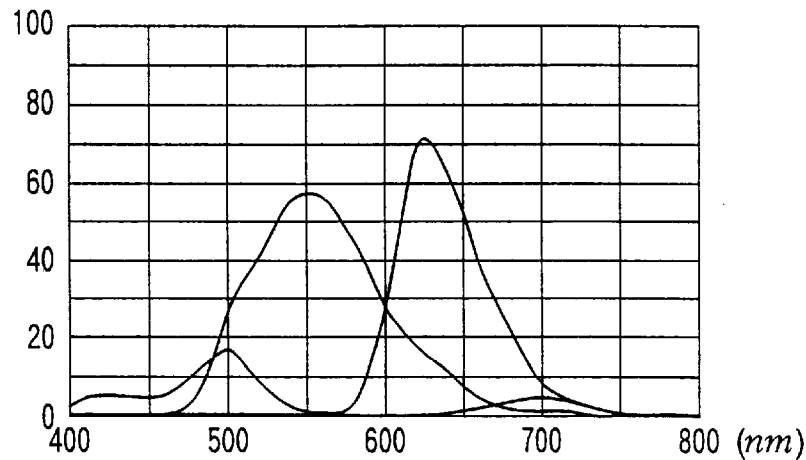

FIG. 21A shows an example of spectral sensitivity characteristics of the photometry sensors 9B, 9g and 9R. In the drawing, the characteristics are normalized, i.e., the peak of each characteristic is represented by 100. Given that the object color is yellow, then the spectral reflectivity may be represented by a curve indicated in FIG. 21B. If such an object is measured using the sensors 9B, 9G and 9R, the outputs are represented by curves shown in FIG. 21C. In FIG. 21C, since the output of the sensor 21B is low, the color Is determined to be yellow in the colorimetry procedure.

Figure 21D:
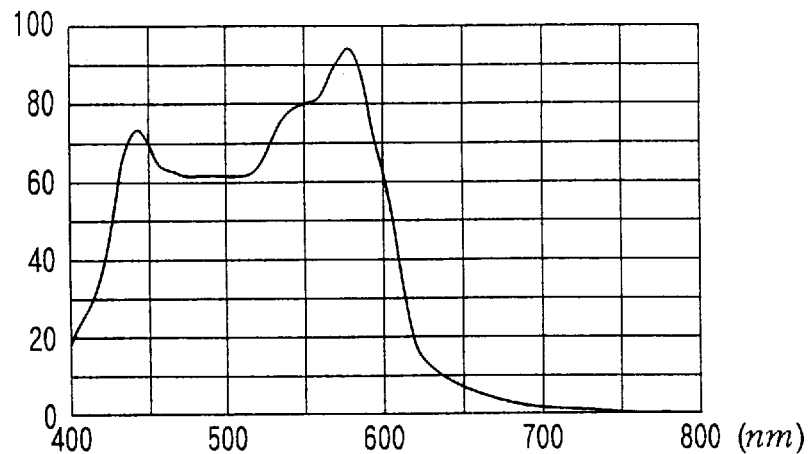

Next, it is assumed that a fluorescent lamp is used as a light source. FIG. 21D shows an example of the spectral radiant characteristic of the fluorescent lamp. If the fluorescent lamp is used for illuminating the same object, the outputs of the sensors 9B, 9G and 9R are represented by curves shown in FIG. 21E. In this example, only the output of the sensor 9G has a larger value than the other, the color of the object will be determined to be green in the colorimetry procedure, although the actual object color is yellow.

Figure 21E:
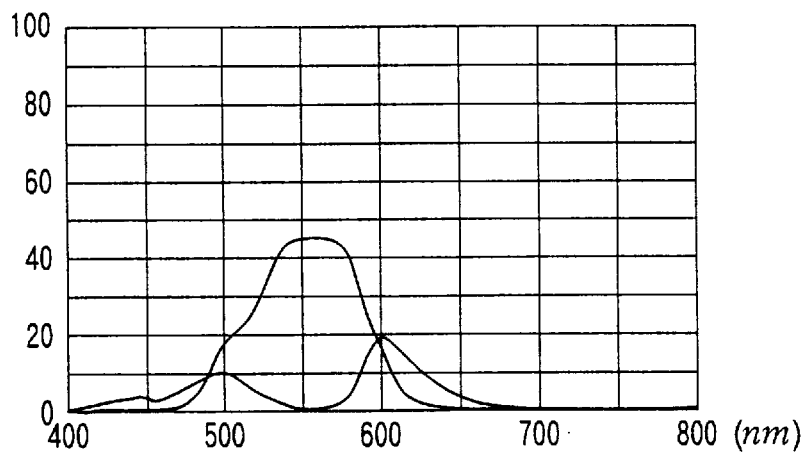
Figure 21F:
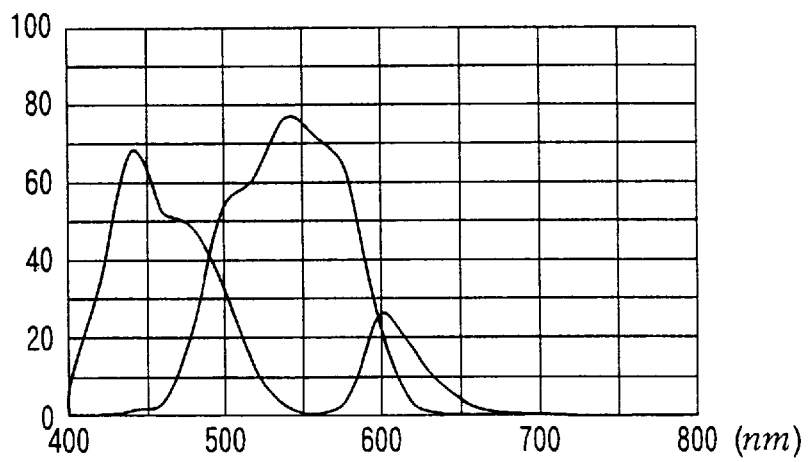

If the light source is measured using the sensor 12 which exhibits the spectral sensitivity characteristics similar to those shown in FIG. 21A, the outputs of the sensor 12 are represented by curves shown in FIG. 21F. If the outputs of the sensors 9B, 9G and 9R shown in FIG. 21E are compensated using the outputs of the sensor 12 shown in FIG. 21F, the compensated outputs will have the curves similar to those shown in. FIG. 21C That is, the affect of the color of the light source can be removed, and the colorimetry can be performed accurately.

FIG. 22 is a flowchart illustrating the colorimetric parameter calculation procedures which is called at S24 of FIG. 15A, 15B or 15C. In this procedure, colorimetric parameters used in the colorimetric judging are calculated. As the colorimetric parameters, parameters Gf(i) for G component, parameters Bf(i) for B component, and parameters Rf(i) for R component are calculated (S161, S162 and S163) according to the following formulae.

$Gf(i)=Bvd \cdot g(i)-\{Bvd \cdot b(i)+Bvd \cdot r(i)\}/2;$ $Bf(i)=Bvd \cdot b(i)-\{Bvd \cdot g(i)+Bvd \cdot r(i)\}/2;$ and $Rf(i)=Bvd \cdot r(i)-\{Bvd \cdot b(i)+Bvd \cdot g(i)\}/2.$ FIG. 23 is a flowchart illustrating the colorimetric constant setting procedure, in which the colorimetric constants are read from the EEPROM 26. The colorimetric constants include:

threshold values for color judgment: THvalue·*1(i);

coefficients for color judgment: coefficient·#1(i) and coefficient·#2(i);

coefficients for calculating colorimetric compensation values: CCcoefficient·*1(i);

adjustment values for calculating the colorimetric compensation values: CCadjestment·*1(i).

In the above indication, a symbol * represents g (green), b (blue), r (red), m (magenta), y (yellow) or c (cyan), and a symbol # represents g (green), b (blue) or r (red). In this procedure, for all the photometry areas A0–A5 of the sensors 9, the colorimetric constants are set, respectively. Therefore, at S171, i is set to zero (0), and then, if i≦5 (S172:YES), the constants are read from the EEPROM (S173, S174, S175 and S176). Then, at S177, i is incremented by one, and control returns to S172. Thus, for i=0 through 5, steps S173–S176 are repeated. The constants read from the EEPROM 26 are stored in the RAM 27 of the controller 20. FIG. 24 shows an example of the constants read from the EEPROM 26.

FIGS. 25 and 26 show a flowchart illustrating the "color judgment procedure". The procedure judges the color for each of the photometry areas A0–A5 of the photometry sensors 9G, 9B and 9R, and determines the color of the object for each photometry area A0–A5.

At S181, i is set to 0. Then, if i≦5 (S182:YES), the following steps are repeated. In the following description, Color(i) represents color parameters, Color·max(i) and Color·min(i) represent color judgment parameters, respectively.

At S183, the color parameter Color(i), is set to colorless. Then, at S184, Rf(i) and THvalue·c1(i) are compared.

If Rf(i)<THvalue·c1(i) (S184:YES). |Bf(i)−Gf(i)| and |coefficient·r1(i)×Rf(i)| are compared (S185).

If |Bf(i)−Gf(i)|<|coefficient·r1(i)×Rf(i)| (S185:YES). Color·min(i) is set to Rf(i) (S186).

If Rf(i)≧THvalue·c1(i) (S184:NO) or |Bf(i)−Gf(i)|≧|coefficient·r1(i)×Rf(i)| (S185:NO), step S186 is skipped.

At S187, Gf(i) is compared with THvalue·m1(i).

If Gf(i)<THvalue·m1(i) (S187:YES), |Bf(i)−Rf(i)| and |coefficient·g1(i)×Gf(i)| are compared (S188).

If |Bf(i)−Rf(i)|<|coefficient·g1(i)×Gf(i)| (S188:YES), Color·min(i) is set to Gf(i) (S189).

If Gf(i)≧THvalue·m1(i) (S187:NO) or |Bf(i)−Rf(i)|≧|coefficient·g1(i)×Gf(i)| (S188:NO), step S189 is skipped.

At S190, Gf(i) is compared with THvalue·g1(i).

If Gf(i)>THvalue·g1(i) (S190:YES), |Bf(i)−Rf(i)| and |coefficient·g2(i)×Gf(i)| are compared (S191).

If |Bf(i)−Rf(i)|<|coefficient·g2(i)×Gf(i)| (S191:YES), Color·max(i) is set to Gf(i) (S192).

If Gf(i)≦THvalue·g1(i) (S190:NO) or |Bf(i)−Rf(i)|≧|coefficient·g2(i)×Gf(i)| (S191:NO), step S192 is skipped.

At S193, Bf(i) is compared with THvalue·b1(i).

If Bf(i)>THvalue·b1(i) (S193:YES), |Gf(i)−Rf(i)| and |coefficient·b2(i)×Bf(i)| are compared (S194).

If |Gf(i)−Rf(i)|<|coefficient·b2(i)×Bf(i)| (S194:YES), Color·max(i) is set to Bf(i) (S195). If Bf(i)≦THvalue·b1(i) (S193:NO) or |Gf(i)−Rf(i)|≧|coefficient·b2(i)×Bf(i)| (S194:NO), step S195 is skipped.

At S196, Rf(i) is compared with THvalue·r1(i).

If Rf(i)>THvalue·r1(i) (S196:YES), |Bf(i)−Gf(i)| and |coefficient·r2(i)×Rf(i)| are compared (S197).

If |Bf(i)−Gf(i)|<|coefficient·r2(i)×Rf(i)| (S197:YES), Color·max(i) is set to Rf(i) (S198). If Rf(i)≦THvalue·r1(i) (S196:NO) or |Bf(i)−Gf(i)|≧|coefficient·r2(i)×Rf(i)| (S197:NO), step S198 is skipped.

At S199, Bf(i) is compared with THvalue·y1(i).

If Bf(i)<THvalue·y1(i) (S199:YES), |Gf(i)−Rf(i)| and |coefficient·b1(i)×Bf(i)| are compared (S200).

If |Gf(i)−Rf(i)|<|coefficient·b1(i)×Bf(i)| (S200:YES), Color·min(i) is set to Bf(i) (S201). If Bf(i)≧THvalue·y1(i) (S199:NO) or |Gf(i)−Rf(i)|≧|coefficient·b1(i)×Bf(i)| (S200:NO), step S201 is skipped.

During the above steps, for each of the photometry areas A0–A5, color·max(i) and color·min(i) are obtained.

At S202, color·min(i) and Rf(i) are compared. If color·min(i) is equal to Rf(i) (S202:YES), color(i) is set to cyan (S203). If color·min(i) is not equal to Rf(i), color·min (i) and Gf(i) are compared at S204. If color·min(i) is equal to Gf(i) (S204:YES), color(i) is set to magenta (S205). If color·min(i) is not equal to Gf(i), color·max(i) and Gf(i) are compared at S206. If color·max(i) is equal to Gf(i) (S206:YES), color(i) is set to green (S207). If color·max(i) is not equal to Gf(i) (S206:NO), then color·max(i) and Bf(i) are compared at S208. If color·max(i) is equal to Bf(i), color(i) is set to blue (S209). If color·max(i) is not equal to Bf(i) (S208:NO), then color·max(i) is compared with Rf(i) at S210. If color·max(i) is equal to Rf(i) (S210:YES), then color(i) is set to red (S211). If color·max(i) is not equal to Rf(i) (S210:NO), then color·min(i) is compared with Bf(i) at S212. If color·min(i) is equal to Bf(i) (S212:YES), color(i) is set to yellow (S213), and control proceeds to S214. If color·min(i) is not equal to Bf(i) (S212:NO), step S213 is skipped, and control proceeds to S214, where i is incremented by one. Then, control proceeds to S182. As a result of the above-described procedure, yellow has the highest priority, and in the foregoing steps, the color finally selected in accordance with the conditions is determined as the color of the photometry area.

After the color judgment is performed as described above, the "area colorimetric compensation value calculation procedure" as shown in FIG. 27 is called at S27 of the flowchart shown in FIG. 15A or 15C when the photometry mode is 2, 3, 5, 6, 7 or 8.

In this procedure, the colorimetric compensation values CC(i) corresponding to the difference of the color among the photometry areas are calculated.

At S221, i is set to an initial value of zero. At S222, it is judged whether i is equal to or smaller than five. If i is 0, 1, 2, 3, 4 or 5, (S222:YES), it is judged whether color(i) is colorless (S223). If color(i) is colorless (S223:YES), CC(i) is set to zero (S224). If color(i) is not colorless (S223:NO), step S224 is skipped. At S225, it is judged whether color(i) is cyan. If color(i) is cyan (S225:YES), the colorimetric compensation value CC(i) is calculated as follows at S241.

$CC(i)=CCcoefficient \cdot c1(i) \times \{Rf(i)-THvalue \cdot c1(i)\}+CCadjustment \cdot c1(i).$ If color(i) is not cyan (S225:NO), then step S241 is skipped.

At S227, it is judged whether color(i) is magenta. If color(i) is magenta (S227:YES), the colorimetric compensation value CC(i) is calculated as follows at step S242.

$$CC(i)=CCcoefficient\cdot m1(i)\times\{Gf(i)-THvalue\cdot m1(i)\}+CCadjustment\cdot m1(i).$$

If color(i) is not magenta (S227:NO), then step S242 is skipped

At S229, it is judged whether color(i) is green. If color(i) is green (S229:YES), the colorimetric compensation value CC(i) is calculated as follows at step S243.

$$CC(i)=CCcoefficient\cdot g1(i)\times\{Gf(i)-THvalue\cdot g1(i)\}+CCadjustment\cdot g1(i).$$

If color(i) is not green (S229:NO), then step S243 is skipped.

At S231, it is judged whether color(i) is blue. If color(i) is blue (S231:YES), the colorimetric compensation value CC(i) is calculated as follows at step S244.

$$CC(i)=CCcoefficient\cdot b1(i)\times\{Bf(i)-THvalue\cdot b1(i)\}+CCadjustment\cdot b1(i).$$

If color(i) is not blue (S231:NO), then step S244 is skipped.

At S233, it is judged whether color(i) is red. If color(i) is red (S233:YES), the colorimetric compensation value CC(i) is calculated as follows at step S245.

$$CC(i)=CCcoefficient\cdot r1(i)\times\{Rf(i)-THvalue\cdot r1(i)\}+CCadjustment\cdot r1(i).$$

If color(i) is not red (S233:NO), then step S245 is skipped.

At S235, it is judged whether color(i) is yellow. If color(i) is yellow (S235:YES), the colorimetric compensation value CC(i) is calculated as follows at step S246.

$$CC(i)=CCcoefficient\cdot y1(i)\times\{Bf(i)-THvalue\cdot y1(i)\}+CCadjustment\cdot y1(i)$$

If color(i) is not yellow (S235:NO), then step S246 is skipped. Then, at S237, i is incremented by one, and control returns to S222.

If the photometry mode is 1 or 4, since the color is forcibly set to colorless, the area colorimetric compensation value calculation procedure S27 called in the flowchart shown in FIG. 15B is as shown in FIG. 28.

The procedure shown in FIG. 28 is basically similar to the procedure shown in FIG. 27 except that steps S239 and S240 are added between S222 and S223. If i has not greater than 5 (S222:YES), the value of the colorimetric compensation inhibition flag CC·f is judged. If the flag CC·f=1 (S239:YES), then color(i) is set to colorless (S240) so that the colorimetric compensation will not be performed at a later stage. If the flag CC·f=0 (S240:NO), then control skips S241, and the procedure from S223 is performed. Since the procedure from S223 through S237 are the same as that in FIG. 27, description thereof will not be repeated.

FIG. 29 is a flowchart illustrating a "CC calculating procedure", which is called at S28 of the colorimetry procedure in FIG. 15A, 15B, or 15C when the photometry mode is 1, 2, 4, 5, 7 or 8.

At S251, in accordance with the colorimetric compensation value CC(i) for each photometry area, a colorimetric compensation value CC·for all of the photometry areas by averaging, center-weighted averaging, or adopting of the maximum value.

When the averaging is performed, the compensation value CC is calculated as follows.

$$CC=\{CC(0)+CC(1)+CC(2)+CC(3)+CC(4)+CC(5)\}/6$$

The center-weighted averaging is a weighted averaging procedure, in which the central area is weighted, and the compensation value CC is calculated as follows.

$$CC=\{CC(0)\times 4+CC(5)+(CC(1)+CC(2)+CC(3)+CC(4))\times 3/4\}/8$$

When the maximum value is used as the compensation value CC, the compensation value CC is represented by the following formula.

$$CC=\max\{CC(0),\ CC(1),\ CC(2),\ CC(3),\ CC(4),\ CC(5)\}$$

If the photometry mode 3 or 6 is selected, the procedure is modified as shown in FIG. 30. Specifically, at S251, the compensation values CC is calculated base on the values CC(i) similarly to the case shown in FIG. 29. Then, at S252, the obtained compensation value CC is multiplied by the coefficient K·dif to obtain the final compensation value CC in accordance with the formula below.

$$CC=K\cdot dif\times CC$$

As above, in the colorimetry procedure, the colorimetric compensation value CC can be obtained. Using the compensation value CC, the exposure value Lvd is compensated, at S17 of FIG. 10, to obtain the final exposure value Lvd according to the following formula.

$$Lvd=Lvd+CC$$

Then, in accordance with the exposure value Lvd, the exposure control device controls the exposure operation of the camera. With this configuration, regardless of the color of the object, in other words, regardless of the reflectivity of the object, an appropriate exposure value can always be obtained. In particular, when the object color is determined to be yellow, the exposure compensation value is determined to increase the exposure value, and when the object color is determined to be blue or red, the exposure compensation value is determined to decrease the exposure value. With this configuration, errors in determining the exposure value when such objects are photographed, which has been desired to be solved, can be resolved.

Further, according to the above-described embodiment, even if the external light illuminating the object is not correctly metered by the camera, the colorimetric compensation can be performed correctly. Accordingly, an appropriate exposure value can be determined regardless of the reflectivity of the object.

Hereinafter, the eight photometry modes will be summarized.

(1) Mode 1

The light source compensation value calculation procedure is executed in accordance with the flowchart shown in FIG. 17A. Fixed values stored in the EEPROM 26 are used as the light source compensation values. The Bv difference detection procedure shown in FIG. 16A is performed. If the Bv difference is greater than a predetermined value, i.e., if it is judged that the photometry sensor 12 does not meter the external light source illuminating the object, the colorimetric compensation inhibition flag CC·f is set to one. Then, the colorimetry procedure shown in FIG. 15B is performed. If the colorimetric compensation inhibition flag CC·f is zero, a normal colorimetric compensation is performed, while if the flag CC·f is set to one, the object color is judged to be colorless in the area colorimetric compensation value calculation procedure shown in FIG. 28, and then the colorimetric compensation values CC(i) are calculated. Due to this configuration, the colorimetric compensation values CC(i) are zero, and therefore, the result of the CC calculation shown in FIG. 29 is zero. As a result, no substantial colorimetric compensation is performed.

(2) Mode 2

The light source compensation value calculation procedure is executed in accordance with the flowchart shown in FIG. 17A. Fixed values stored in the EEPROM 26 are used as the light source compensation values. The Bv difference detection procedure shown in FIG. 16A is performed. If the Bv difference is greater than a predetermined value, i.e., if it is judged that the photometry sensor 12 does not meter the external light source illuminating the object, the colorimetric compensation inhibition flag CC·f is set to one. Then, the colorimetry procedure shown in FIG. 15C is performed. If the colorimetric compensation inhibition flag CC·f is zero, a normal colorimetric compensation is performed, while if the flag CC·f is set to one, the colorimetric compensation value CC is set to zero, and the colorimetry procedure will not be performed.

(3) Mode 3

The light source compensation value calculation procedure is executed in accordance with the flowchart shown in FIG. 17A. Fixed values stored in the EEPROM 26 are used as the light source compensation values. The Bv difference detection procedure shown in FIG. 16C is performed, and based on the obtained Bv difference, the Bv difference compensation coefficient K·dif is calculated. Then, the colorimetry procedure shown in FIG. 15A is performed, and the colorimetric compensation value CC(i) are obtained in the procedure shown in FIG. 27. Further, in the CC calculation procedure shown in FIG. 30, the CC value is calculated, and then the compensation is made by multiplying colorimetric compensation value with the coefficient K·dif to obtain the compensation value CC corresponding to the external light source metered by the photometry sensor, and the colorimetry is performed using the thus obtained colorimetric compensation value CC.

(4) Mode 4

The light source compensation value calculation procedure is executed in accordance with the flowchart shown in FIG. 17B. Values calculated from the photometry values metered by the photometry sensor 12 are used as the light source compensation values. The Bv difference detection procedure shown in FIG. 16A is performed. If the Bv difference is greater than a predetermined value, i.e., if it is judged that the photometry sensor 12 does not meter the external light source illuminating the object, the colorimetric compensation inhibition flag CC·f is set to one. Then, the colorimetry procedure shown in FIG. 15B is performed. If the colorimetric compensation inhibition flag CC·f is zero, a normal colorimetric compensation is performed, while if the flag CC·f is set to one, the object color is judged to colorless in the area colorimetric compensation value calculation procedure shown in FIG. 28, and then the colorimetric compensation values CC(i) are calculated. Due to this configuration, the colorimetric compensation values CC(i) are zero, and therefore, the result of the CC calculation shown in FIG. 29 is zero. As a result, no substantial colorimetric compensation is performed.

(5) Mode 5

The light source compensation value calculation procedure is executed in accordance with the flowchart shown in FIG. 17B. Values calculated from the photometry outputs of the photometry sensor 12 are used as the light source compensation values. The Bv difference detection procedure shown in FIG. 16A is performed. If the Bv difference is greater than a predetermined value, i.e., if it is judged that the photometry sensor 12 does not meter the external light source illuminating the object, the colorimetric compensation inhibition flag CC·f is set to one. Then, the colorimetry procedure shown in FIG. 15C is performed. If the colorimetric compensation inhibition flag CC·f is zero, a normal colorimetric compensation is performed, while if the flag CC·f is set to one, the colorimetric compensation value CC is set to zero, and the colorimetry procedure will not be performed.

(6) Mode 6

The light source compensation value calculation procedure is executed in accordance with the flowchart shown in FIG. 17B. As the light source compensation values, values calculated from the photometry outputs of the photometry sensor 12 are used. The Bv difference detection procedure shown in FIG. 16C is performed, and based on the obtained Bv difference, the Bv difference compensation coefficient K·dif is calculated. Then, the colorimetry procedure shown in FIG. 15A is performed, and the colorimetric compensation value CC(i) are obtained in the procedure shown in FIG. 27. Further, in the CC calculation procedure shown in FIG. 30, the CC value is calculated, and then the compensation is made by multiplying colorimetric compensation value with the coefficient K·dif to obtain the compensation value CC corresponding to the external light source metered by the photometry sensor, and the colorimetry is performed using the thus obtained colorimetric compensation value CC.

(7) Mode 7

The Bv difference detection procedure shown in FIG. 16B is performed. If the Bv difference is greater than a predetermined value, i.e., if it is judged that the photometry sensor 12 does not meter the external light source illuminating the object, the light source compensation selection flag LSC·f is set to one. In the flowchart shown in FIGS. 18A and 18B, if the light source compensation selection flag LSC·f is zero, the light source compensation value calculated from the metered value of the photometry sensor 12 is used as the light compensation value to compensate for the light color of the photometry sensor that performs the colorimetry. If the flag LSC·f is one, the light source compensation value calculated based on the fixed value stored in the EEPROM 26 is selected. Then, the colorimetry procedure shown in FIG. 15A is executed. The colorimetric compensation values CC(i) are obtained in the procedure shown in FIG. 27. Then, the CC calculation procedure shown in FIG. 29 is executed and the colorimetric compensation is performed based on the thus obtained colorimetric compensation value CC.

(8) Mode 8

The Bv difference detection procedure shown in FIG. 16C is performed, and based on the obtained Bv difference, the Bv difference compensation coefficient K·dif is calculated. Then, in the flowchart shown in FIG. 19, the light source compensation value calculation procedure is performed. Based on the Bv difference compensation coefficient, a weighting calculation is applied to the light source compensation value calculated from the fixed value stored in the EEPROM 26 and the light source compensation value calculated from the metered value of the photometry sensor to obtain the light source compensation value having a value within a range between the fixed light compensation value and the variable (metered) value. Then, the colorimetry procedure shown in FIG. 15A is performed, and the colorimetric compensation value CC(i) are obtained in the procedure shown in FIG. 27. Further, in the CC calculation procedure shown in FIG. 30, the CC value is calculated, and then the compensation is made using the thus obtained colorimetric compensation value CC.

In the embodiment described above, as shown in FIG. 10, each of the photometry sensors. 9 (9D, 9R, 9G and 9B) is divided into six photometry areas A0–A5, and based on the metered value Bvd at each photometry area, an exposure value Lvd is calculated. Thereafter, the colorimetric compensation is performed with respect to the thus obtained exposure value Lvd using the colorimetric compensation value CC.

The invention is not limited to such a configuration, but, for example, the exposure value may be calculated after the metered value Bvd is colorimetric ally compensated.

FIG. 31 shows a modified configuration. As shown in FIG. 31, after the open aperture photometry compensation calculation at S14, the colorimetry procedure is performed (S16), and then, colorimetric compensation values CC(i) for each of the photometry areas A0–A5 are calculated (S28). Then, using the obtained colorimetric al compensation values CC(i), the photometry values Bvd(i) are colorimetric ally compensated to obtain compensated photometry values Bvd(i) (S17A) according to the following formula.

Bvd(i)=Bvd(i)+CC(i)

Then, based on the thus obtained compensated photometry values Bvd(i) for each photometry area, the final exposure value Lvd may be calculated (S15).

According to the above procedure, in each of the photometry modes 1–8, an appropriate exposure value which are colorimetric ally compensated can be obtained. In such a case, however, the procedures shown in FIGS. 16A–16C should be replaced with those shown in FIGS. 32A–32C, respectively.

Since each photometry sensor is configured to have a plurality of photometry areas, and the exposure values and the compensation values are determined in accordance with the measured values at the plurality of photometry areas, an appropriate exposure compensation value can be determined when the entire object has a predetermined color, or when the object includes a plurality of portions having different colors.

Furthermore, in the above-described embodiments, the photometry sensor 12 is provided to measure the external light which illuminates the object, and the outputs of the photometry sensors 9B and 9R are compensated in accordance with the outputs of the photometry sensor 12. Therefore, the outputs of the photometry sensors 9G, 9B and 9R can well reflect the spectral reflectivity characteristics of the object regardless of the spectral radiant characteristic of the external light source. Therefore, the colorimetry can be performed accurately, and the compensation amount for the exposure value can be determined accurately.

It should be emphasized that, in the above-described. embodiment, the photometry sensor 12, and the photometry sensors 9G, 9B and 9R utilize the same photo diodes, and the green, blue and red filters provided to the sensors 9G, 9B and 9R, and the filters provided to the areas A0–A2 of the photometry sensor 12 have the same spectral transmissivity characteristics. In other words, the photometry sensors 9G, 9B and 9R and the areas A0–A2 of the photometry sensor 12 have substantially the same spectral sensitivity characteristics. Therefore, the spectral differences between the outputs of the sensor 12 and the outputs of the sensors 9G, 9B and 9R can be substantially avoided, and the compensation related to the light source can be made at high accuracy. Accordingly, an appropriate exposure can be performed.

Figure 3B:
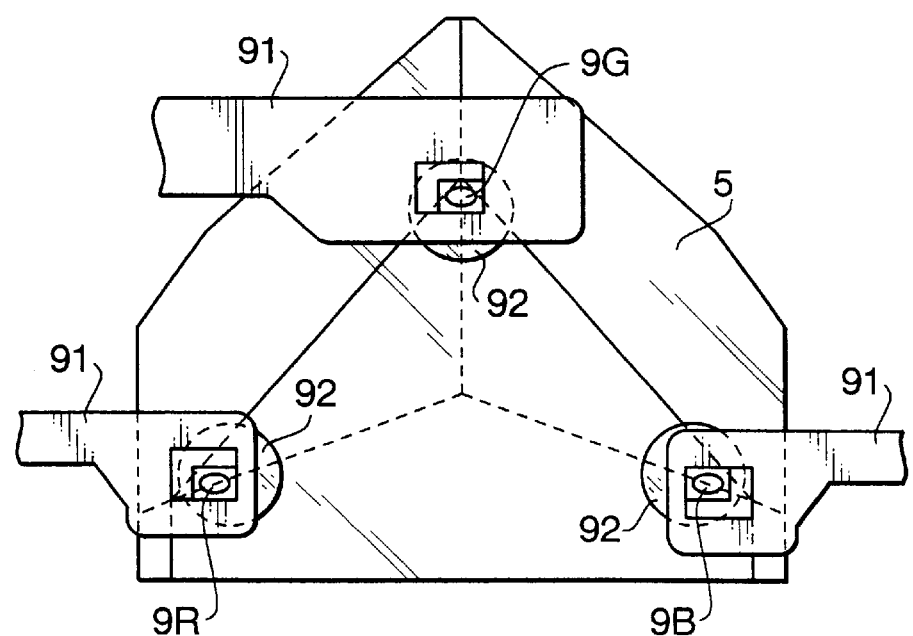
FIG. 3B shows an alternative arrangement of photometry sensors.

In the above-described embodiment, the sensor 9D for the normal light is provided in addition to the sensors 9B, 9G and 9R for B, G and R color components. The light receiving characteristics of the sensor G has a peak at the wavelength of 540 nm. This characteristic is close to that of the sensor 9D. Therefore, in another embodiment of the invention, the sensor 9G is used instead of the sensor 9D, and the sensor 9D is omitted, as shown in FIG. 3B. In such a case, in steps S11–S15 of the main procedure (FIG. 10), the output Bvad·g of the sensor 9G is used as Bvad, and the calculation is to be executed.

With such a structure, since the number of sensors is reduced, the manufacturing cost can be reduced. Further, a space necessary for arranging the sensors can be reduced, which enables downsizing of the camera body. In the case of FIG. 3B, since the sensor 9G is arranged at the upper central portion on the eyepiece optical system side of the pentagonal prism, photometry can be done accurately.

Still further, in the above-described embodiments, the eight photometry modes 1–8 are provided, and one of which is selected. Alternatively, a photometry device may be configured to one or some of the eight photometry modes.

The present disclosure relates to the subject matter contained in Japanese Patent Application No. 2000-204566, filed on Jul. 6, 2000, which is expressly incorporated herein by reference in its entirety.

What is claimed is:

1. A photometry device for a camera, comprising:
   a normal light sensor that performs a photometry operation with respect to an object;
   an exposure amount determining system that determines an exposure amount of an object in accordance with an output of said normal light sensor;
   a plurality of colorimetric sensors having spectral sensitivity characteristics different from each other, said plurality of colorimetric sensors performing a colorimetric operation with respect to an image of the object through a lens of said camera;
   an external light sensor that measures external light illuminating the object at spectral sensitivity characteristics corresponding to each of said plurality of colorimetric sensors;
   a light source color compensation amount calculation system that calculates a light source color compensation amount based on light source data;
   a colorimetric compensation amount calculation system that determines a color of the object based on metered values output by said colorimetric sensors and compensated using the light source color compensation amount, and calculates a colorimetric compensation amount based on the judged color;
   a colorimetric compensation system that compensates for the exposure amount based on the colorimetric compensation amount,
   wherein a predetermined fixed value is used as the light source data, and
   wherein, if a difference between the exposure value obtained from the output of the external light sensor and the exposure value obtained based on the output of said normal light photometry sensor is greater than a predetermined reference value, the colorimetric compensation amount is forcibly set to zero.

2. The photometry device according to claim 1, further comprising a storage device, light source data corresponding to an output of said external light sensor stored in said storage device, said fixed value being calculated from the light source data stored in said storage device.

3. The photometry device according to claim 1, wherein each of said normal light photometry sensor and said plurality of colorimetric sensors has a plurality of photometry areas, said colorimetric compensation amount calculating system determining a color for each of said plurality of photometry areas and further determining a colorimetric compensation amount for each of said plurality of photometry areas based on the determined color, said colorimetric compensation amount calculating system further determining a colorimetric compensation amount for the entire object based on the colorimetric compensation amounts for said plurality of photometry areas.

4. The photometry device according to claim 1, wherein each of said normal light photometry sensor and said plurality of colorimetric sensors has a plurality of photometry areas, said colorimetric compensation amount calculating system determining a color for each of said plurality of photometry areas and further determining a colorimetric compensation amount for each of said plurality of photometry areas based on the determined color, said colorimetric compensation amount calculating system further compensating for the photometry value for each of said plurality of photometry areas based on said colorimetric compensation amount, and determining an exposure amount for the entire object based on the colorimetric compensation amounts for said plurality of photometry areas.

5. The photometry device according to claim 1, wherein said normal light photometry device and said plurality of colorimetric sensors meter light reflected by the object and passed through the photographing optical system of the camera, and wherein said external light sensor meters light reflected by the object but not passed through the photographing optical system of the camera.

6. The photometry device according to claim 5,
wherein said normal light sensor includes a normal light photometry sensor, the spectral sensitivity characteristic of which has a peak sensitivity-at a wavelength within a range from 500 nm through 600 nm,
wherein said plurality of colorimetric sensors include a blue light photometry sensor for metering blue light component, a green light photometry sensor for metering green light component, and a red light photometry sensor for metering red light component, and
wherein said external light sensor includes a photometry sensor having photometry areas for metering blue, green and red light components, respectively.

7. The photometry device according to claim 6, wherein said plurality of colorimetric sensors and said normal light sensors include photometric elements having the same photometric characteristics.

8. The photometry device according to claim 7, wherein said normal light photometry sensor functions as said green light sensor, and wherein output of said green light sensor is used as the output of said normal light photometry sensor.

9. A photometry device for a camera, comprising:
a normal light sensor that performs a photometry operation with respect to an object;
an exposure amount determining system that determines an exposure amount of an object in accordance with an output of said normal light sensor;
a plurality of colorimetric sensors having spectral sensitivity characteristics different from each other, said plurality of colorimetric sensors performing a colorimetric operation with respect to an image of the object through a lens of said camera;
an external light sensor that measures external light illuminating the object at spectral sensitivity characteristics corresponding to each of said plurality of colorimetric sensors, a light source color compensation amount calculation system that calculates a light source color compensation amount based on light source data;
a colorimetric compensation amount calculation system that determines a color of the object based on metered values output by said colorimetric sensors and compensated using the light source color compensation amount, and calculates a colorimetric compensation amount based on the judged color;
a colorimetric compensation system that compensates for the exposure amount based on the colorimetric compensation amount,
wherein a predetermined fixed value is used as the light source data,
wherein, if a difference between the exposure value obtained from the output of the external light sensor and the exposure value obtained based on the output of said normal light photometry sensor is greater than a predetermined reference value, operations of said colorimetric compensation amount calculation system and said colorimetric compensation system are not performed.

10. The photometry device according to claim 9, further comprising a storage device, light source data corresponding to an output of said external light sensor stored in said storage device, said fixed value being calculated from the light source data stored in said storage device.

11. The photometry device according to claim 9, wherein each of said normal light photometry sensor and said plurality of colorimetric sensors has a plurality of photometry areas, said colorimetric compensation amount calculating system determining a color for each of said plurality of photometry areas and further determining a colorimetric compensation amount for each of said plurality of photometry areas based on the determined color, said colorimetric compensation amount calculating system further determining a colorimetric compensation amount for the entire object based on the colorimetric compensation amounts for said plurality of photometry areas.

12. The photometry device according to claim 9, wherein each of said normal light photometry sensor and said plurality of colorimetric sensors has a plurality of photometry areas, said colorimetric compensation amount calculating system determining a color for each of said plurality of photometry areas and further determining a colorimetric compensation amount for each of said plurality of photometry areas based on the determined color, said colorimetric compensation amount calculating system further compensating for the photometry value for each of said plurality of photometry areas based on said colorimetric compensation amount, and determining an exposure amount for the entire object based on the colorimetric compensation amounts for said plurality of photometry areas.

13. The photometry device according to claim 9, wherein said normal light photometry device and said plurality of colorimetric sensors meter light reflected by the object and passed through the photographing optical system of the camera, and wherein said external light sensor meters light reflected by the object but not passed through the photographing optical system of the camera.

14. The photometry device according to claim 13,
wherein said normal light sensor includes a normal light photometry sensor, the spectral sensitivity characteristic of which has a peak sensitivity at a wavelength within a range from 500 nm through 600 nm,
wherein said plurality of colorimetric sensors include a blue light photometry sensor for metering blue light component a green light photometry sensor for metering green light component, and a red light photometry sensor for metering red light component, and wherein said external light sensor includes a photometry sensor having photometry areas for metering blue, green and red light components, respectively.

15. The photometry device according to claim 14, wherein said plurality of colorimetric sensors and said normal light sensors include photometric elements having the same photometric characteristics.

16. The photometry device according to claim 15, wherein said normal light photometry sensor functions as said green light sensor, and wherein output of said green light sensor is used as the output of said normal light photometry sensor.

17. A photometry device for a camera, comprising:

a normal light sensor that performs a photometry operation with respect to an object;

an exposure amount determining system that determines an exposure amount of an object in accordance with an output of said normal light sensor;

a plurality of colorimetric sensors having spectral sensitivity characteristics different from each other, said plurality of colorimetric sensors performing a colorimetric operation with respect to an image of the object through a lens of said camera;

an external light sensor that measures external light illuminating the object at spectral sensitivity characteristics corresponding to each of said plurality of colorimetric sensors;

a light source color compensation amount calculation system that calculates a light source color compensation amount based on light source data;

a colorimetric compensation amount calculation system that determines a color of the object based on metered values output by said colorimetric sensors and compensated using the light source color compensation amount, and calculates a colorimetric compensation amount based on the judged color;

a colorimetric compensation system that compensates for the exposure amount based on the colorimetric compensation amount, wherein a predetermined fixed value is used as the light source data, and wherein, the colorimetric compensation amount is compensated based on a coefficient obtained from a difference between the exposure value obtained from the output of the external light sensor and the exposure value obtained based on the output of said normal light photometry sensor.

18. The photometry device according to claim 17, further comprising a storage device, light source data corresponding to an output of said external light sensor stored in said storage device, said fixed value being calculated from the light source data stored in said storage device.

19. The photometry device according to claim 17, wherein each of said normal light photometry sensor and said plurality of colorimetric sensors has a plurality of photometry areas, said colorimetric compensation amount calculating system determining a color for each of said plurality of photometry areas and further determining a colorimetric compensation amount for each of said plurality of photometry areas based on the determined color, said colorimetric compensation amount calculating system further determining a colorimetric compensation amount for the entire object based on the colorimetric compensation amounts for said plurality of photometry areas.

20. The photometry device according to claim 17, wherein each of said normal light photometry sensor and said plurality of colorimetric sensors has a plurality of photometry areas, said colorimetric compensation amount calculating system determining a color for each of said plurality of photometry areas and further determining a colorimetric compensation amount for each of said plurality of photometry areas based on the determined color, said colorimetric compensation amount calculating system further compensating for the photometry value for each of said plurality of photometry areas based on said colorimetric compensation amount, and determining an exposure amount for the entire object based on the colorimetric compensation amounts for said plurality of photometry areas.

21. The photometry device according to claim 17, wherein said normal light photometry device and said plurality of colorimetric sensors meter light reflected by the object and passed through the photographing optical system of the camera, and wherein said external light sensor meters light reflected by the object but not passed through the photographing optical system of the camera.

22. The photometry device according to claim 21, wherein said normal light sensor includes a normal light photometry sensor, the spectral sensitivity characteristic of which has a peak sensitivity at a wavelength within a range from 500 nm through 600 nm, wherein said plurality of colorimetric sensors include a blue light photometry sensor for metering blue light component, a green light photometry sensor for metering green light component, and a red light photometry sensor for metering red light component, and wherein said external light sensor includes a photometry sensor having photometry areas for metering blue, green and red light components, respectively.

23. The photometry device according to claim 22, wherein said plurality of colorimetric sensors and said normal light sensors include photometric elements having the same photometric characteristics.

24. The photometry device according to claim 23, wherein said normal light photometry sensor functions as said green light sensor, and wherein output of said green light sensor is used as the output of said normal light photometry sensor.

25. A photometry device for a camera, comprising:

a normal light sensor that performs a photometry operation with respect to an object;

an exposure amount determining system that determines an exposure amount of an object in accordance with an output of said normal light sensor;

a plurality of colorimetric sensors having spectral sensitivity characteristics different from each other, said plurality of colorimetric sensors performing a colorimetric operation with respect to an image of the object through a lens of said camera;

an external light sensor that measures external light illuminating the object at spectral sensitivity characteristics corresponding to each of said plurality of colorimetric sensors, a light source color compensation amount calculation system that calculates a light source color compensation amount based on light source data;

a colorimetric compensation amount calculation system that determines a color of the object based on metered values output by said colorimetric sensors and compensated using the light source color compensation amount, and calculates a colorimetric compensation amount based on the judged color;

a colorimetric compensation system that compensates for the exposure amount based on the colorimetric compensation amount, wherein a metered value of said external light sensor is used as the light source data, and wherein, if a difference between the exposure value obtained from the output of the external light sensor and the exposure value obtained based on the output of said normal light photometry sensor is greater than a predetermined reference value, the colorimetric compensation amount is forcibly set to zero.

26. The photometry device according to claim 25, wherein each of said normal light photometry sensor and said plurality of colorimetric sensors has a plurality of photometry areas, said colorimetric compensation amount calculating system determining a color for each of said plurality of photometry areas and further determining a colorimetric compensation amount for each of said plurality of photometry areas based on the determined color, said colorimetric compensation amount calculating system further determining a colorimetric compensation amount for the entire object based on the colorimetric compensation amounts for said plurality of photometry areas.

27. The photometry device according to claim 25, wherein each of said normal light photometry sensor and said plurality of colorimetric sensors has a plurality of photometry areas, said colorimetric compensation amount calculating system determining a color for each of said plurality of photometry areas and further determining a colorimetric compensation amount for each of said plurality of photometry areas based on the determined color, said colorimetric compensation amount calculating system further compensating for the photometry value for each of said plurality of photometry areas based on said colorimetric compensation amount, and determining an exposure amount for the entire object based on the colorimetric compensation amounts for said plurality of photometry areas.

28. The photometry device according to claim 25 herein said normal light photometry device and said plurality of colorimetric sensors meter light reflected by the object and passed through the photographing optical system of the camera, and wherein said external light sensor meters light reflected by the object but not passed through the photographing optical system of the camera.

29. The photometry device according to claim 28,
wherein said normal light sensor includes a normal light photometry sensor, the spectral sensitivity characteristic of which has a peak sensitivity at a wavelength within a range from 500 nm through 600 nm,
wherein said plurality of colorimetric sensors include a light photometry sensor for metering blue light component, a green light photometry sensor for metering green light component, and a red light photometry sensor for metering red light component, and
wherein said external light sensor includes a photometry sensor having photometry areas for metering blue, green and red light components, respectively.

30. The photometry device according to claim 29, wherein said plurality of colorimetric sensors and said normal light sensors include photometric elements having the same photometric characteristics.

31. The photometry device according to claim 30, wherein said normal light photometry sensor functions as said green light sensor, and wherein output of said green light sensor is used as the output of said normal light photometry sensor.

32. A photometry device for a camera, comprising:
a normal light sensor that performs a photometry operation with respect to an object;
an exposure amount determining system that determines an exposure amount of an object in accordance with an output of said normal light sensor;
a plurality of colorimetric sensors having spectral sensitivity characteristics different from each other, said plurality of colorimetric sensors performing a colorimetric operation with respect to an image of the object through a lens of said camera;
an external light sensor that measures external light illuminating the object at spectral sensitivity characteristics corresponding to each of said plurality of colorimetric sensors;
a light source color compensation amount calculation system that calculates a light source color compensation amount based on light source data;
a colorimetric compensation amount calculation system that determines a color of the object based on metered values output by said colorimetric sensors and compensated using the light source color compensation amount, and calculates a colorimetric compensation amount based on the judged color;
a colorimetric compensation system that compensates for the exposure amount based on the colorimetric compensation amount,
wherein a metered value of said external light sensor is used as the light source data, and
wherein, if a difference between the exposure value obtained from the output of the external light sensor and the exposure value obtained based on the output of said normal light photometry sensor is greater than a predetermined reference value, operations of said colorimetric compensation amount calculation system and said colorimetric compensation system are not performed.

33. The photometry device according to claim 32, wherein each of said normal light photometry sensor and said plurality of colorimetric sensors has a plurality of photometry areas, said colorimetric compensation amount calculating system determining a color for each of said plurality of photometry areas and further determining a colorimetric compensation amount for each of said plurality of photometry areas based on the determined color, said colorimetric compensation amount calculating system further determining a colorimetric compensation amount for the entire object based on the colorimetric compensation amounts for said plurality of photometry areas.

34. The photometry device according to claim 32, wherein each of said normal light photometry sensor and said plurality of colorimetric sensors has a plurality of photometry areas, said colorimetric compensation amount calculating system determining a color for each of said plurality of photometry areas and further determining a colorimetric compensation amount for each of said plurality of photometry areas based on the determined color, said colorimetric compensation amount calculating system further compensating for the photometry value for each of said plurality of photometry areas based on said colorimetric compensation amount, and determining an exposure amount for the entire object based on the colorimetric compensation amounts for said plurality of photometry areas.

35. The photometry device according to claim 32, wherein said normal light photometry device and said plurality of colorimetric sensors meter light reflected by the object and passed through the photographing optical system of the camera, and wherein said external light sensor meters light reflected by the object but not passed through the photographing optical system of the camera.

36. The photometry device according to claim 35,
wherein said normal light sensor includes a normal light photometry sensor, the spectral sensitivity characteristic of which has a peak sensitivity at a wavelength within a range from 500 nm through 600 nm,
wherein said plurality of colorimetric sensors include a blue light photometry sensor for metering blue light component, a green light photometry sensor for metering green light component, and a red light photometry sensor for metering red light component, and
wherein said external light sensor includes a photometry sensor having photometry areas for metering blue, green and red light components, respectively.

37. The photometry device according to claim 36, wherein said plurality of colorimetric sensors and said normal light sensors include photometric elements having the same photometric characteristics.

38. The photometry device according to claim 37, wherein said normal light photometry sensor functions as said green light sensor, and wherein output of said green light sensor is used as the output of said normal light photometry sensor.

39. A photometry device for a camera, comprising:
a normal light sensor that performs a photometry operation with respect to an object;
an exposure amount determining system that determines an exposure amount of an object in accordance with an output of said normal light sensor;
a plurality of colorimetric sensors having spectral sensitivity characteristics different from each other, said plurality of colorimetric sensors performing a colorimetric operation with respect to an image of the object through a lens of said camera;
an external light sensor that measures external light illuminating the object at spectral sensitivity characteristics corresponding to each of said plurality of colorimetric sensors;
a light source color compensation amount calculation system that calculates a light source color compensation amount based on light source data;
a colorimetric compensation amount calculation system that determines a color of the object based on metered values output by said colorimetric sensors and compensated using the light source color compensation amount, and calculates a colorimetric compensation amount based on the judged color;
a colorimetric compensation system that compensates for the exposure amount based on the colorimetric compensation amount,
wherein a metered value of said external light sensor is used as the light source data, and
wherein, the colorimetric compensation amount is compensated based on a coefficient obtained from a difference between the exposure value obtained from the output of the external light sensor and the exposure value obtained based on the output of said normal light photometry sensor.

40. The photometry device according to claim 39, wherein each of said normal light photometry sensor and said plurality of colorimetric sensors has a plurality of photometry areas, said colorimetric compensation amount calculating system determining a color for each of said plurality of photometry areas and further determining a colorimetric compensation amount for each of said plurality of photometry areas based on the determined color, said colorimetric compensation amount calculating system further determining a colorimetric compensation amount for the entire object based on the colorimetric compensation amounts for said plurality of photometry areas.

41. The photometry device according to claim 39, wherein each of said normal light photometry sensor and said plurality of colorimetric sensors has a plurality of photometry areas said colorimetric compensation amount calculating system determining a color for each of said plurality of photometry areas and further determining a colorimetric compensation amount for each of said plurality of photometry areas based on the determined color, said colorimetric compensation amount calculating system further compensating for the photometry value for each of said plurality of photometry areas based on said colorimetric compensation amount, and determining an exposure amount for the entire object based on the colorimetric compensation amounts for said plurality of photometry areas.

42. The photometry device according to claim 39, wherein said normal light photometry device and said plurality of colorimetric sensors meter light reflected by the object and passed through the photographing optical system of the camera, and wherein said external light sensor meters light reflected by the object but not passed through the photographing optical system of the camera.

43. The photometry device according to claim 42,
wherein said normal light sensor includes a normal light photometry sensor, the spectral sensitivity characteristic of which has a peak sensitivity at a wavelength within a range from 500 nm through 600 nm,
wherein said plurality of colorimetric sensors include a blue light photometry sensor for metering blue light component, a green light photometry sensor for metering green light component, and a red light photometry sensor for metering red light component, and
wherein said external light sensor includes a photometry sensor having photometry areas for metering blue, green and red light components, respectively.

44. The photometry device according to claim 43, wherein said plurality of colorimetric sensors and said normal light sensors include photometric elements having the same photometric characteristics.

45. The photometry device according to claim 44, wherein said normal light photometry sensor functions as said green light sensor, and wherein output of said green light sensor is used as the output of said normal light photometry sensor.

46. A photometry device for a camera, comprising:
a normal light sensor that performs a photometry operation with respect to an object;
an exposure amount determining system that determines an exposure amount of an object in accordance with an output of said normal light sensor;
a plurality of colorimetric sensors having spectral sensitivity characteristics different from each other, said plurality of colorimetric sensors performing a colorimetric operation with respect to an image of the object through a lens of said camera;
an external light sensor that measures external light illuminating the object at spectral sensitivity characteristics corresponding to each of said plurality of colorimetric sensors;

a light source color compensation amount calculation system that calculates a light source color compensation amount based on light source data;

a colorimetric compensation amount calculation system that determines a color of the object based on metered values output by said colorimetric sensors and compensated using the light source color compensation amount, and calculates a colorimetric compensation amount based on the judged color;

a colorimetric compensation system that compensates for the exposure amount based on the colorimetric compensation amount, wherein one of the metered value of said external light sensor and a predetermined fixed value is selected as the light source data in accordance with a difference between the exposure value obtained from the output of the external light sensor and the exposure-value obtained based on the output of said normal light photometry sensor.

47. The photometry device according to claim 46, further comprising a storage device, light source data corresponding to an output of said external light sensor stored in said storage device, said fixed value being calculated from the light source data stored in said storage device.

48. The photometry device according to claim 46, wherein each of said normal light photometry sensor and said plurality of colorimetric sensors has a plurality of photometry areas, said colorimetric compensation amount calculating system determining a color for each of said plurality of photometry areas and further determining a colorimetric compensation amount for each of said plurality of photometry areas based on the determined color, said colorimetric compensation amount calculating system further determining a colorimetric compensation amount for the entire object based on the colorimetric compensation amounts for said plurality of photometry areas.

49. The photometry device according to claim 46, wherein each of said normal light photometry sensor and said plurality of colorimetric sensors has a plurality of photometry areas, said colorimetric compensation amount calculating system determining a color for each of said plurality of photometry areas and further determining a colorimetric compensation amount for each of said plurality of photometry areas based on the determined color, said colorimetric compensation amount calculating system further compensating for the photometry value for each of said plurality of photometry areas based on said colorimetric compensation amount, and determining an exposure amount for the entire object based on the colorimetric compensation amounts for said plurality of photometry areas.

50. The photometry device according to claim 46, wherein said normal light photometry device and said plurality of colorimetric sensors meter light reflected by the object and passed through the photographing optical system of the camera, and wherein said external light sensor meters light reflected by the object but not passed through the photographing optical system of the camera.

51. The photometry device according to claim 50,
wherein said normal light sensor includes a normal light photometry sensor, the spectral sensitivity characteristic of which has a peak sensitivity at a wavelength within a range from 500 nm through 600 nm,
wherein said plurality of colorimetric sensors include a blue light photometry sensor for metering blue light component, a green light photometry sensor for metering green light component, and a red light photometry sensor for metering red light component, and wherein said external light sensor includes a photometry sensor having photometry areas for metering blue, green and red light components, respectively.

52. The photometry device according to claim 51, wherein said plurality of colorimetric sensors and said normal light sensors include photometric elements having the same photometric characteristics.

53. The photometry device according to claim 52, wherein said normal light photometry sensor functions as said green light sensor, and wherein output of said green light sensor is used as the output of said normal light photometry sensor.

54. A photometry device for a camera, comprising:
a normal light sensor that performs a photometry operation with respect to an object;

an exposure amount determining system that determines an exposure amount of an object in accordance with an output of said normal light sensor;

a plurality of colorimetric sensors having spectral sensitivity characteristics different from each other, said plurality of colorimetric sensors performing a colorimetric operation with respect to an image of the object through a lens of said camera;

an external light sensor that measures external light illuminating the object at spectral sensitivity characteristics corresponding to each of said plurality of colorimetric sensors;

a light source color compensation amount calculation system that calculates a light source color compensation amount based on light source data;

a colorimetric compensation amount calculation system that determines a color of the object based on the metered values output by said colorimetric sensors and compensated using the light source color compensation amount, and calculates a colorimetric compensation amount based on the judged color;

a colorimetric compensation system that compensates for the exposure amount based on the colorimetric compensation amount, wherein a value within a range between the metered value of said external light sensor and a predetermined fixed value is determined as the light source data in accordance with a difference between the exposure value obtained from the output of the external light sensor and the exposure value obtained based on the output of said normal light photometry sensor.

55. The photometry device according to claim 54, further comprising a storage device, light source data corresponding to an output of said external light sensor stored in said storage device, said fixed value being calculated from the light source data stored in said storage device.

56. The photometry device according to claim 54, wherein each of said normal light photometry sensor and said plurality of colorimetric sensors has a plurality of photometry areas, said colorimetric compensation amount calculating system determining a color for each of said plurality of photometry areas and further determining a colorimetric compensation amount for each of said plurality of photometry areas based on the determined color, said colorimetric compensation amount calculating system further determining a colorimetric compensation amount for the entire object based on the colorimetric compensation amounts for said plurality of photometry areas.

57. The photometry device according to claim 54, wherein each of said normal light photometry sensor and said plurality of colorimetric sensors has a plurality of photometry areas, said colorimetric compensation amount calculating system determining a color for each of said plurality of photometry areas and further determining a colorimetric compensation amount for each of said plurality of photometry areas based on the determined color, said colorimetric compensation amount calculating system further compensating for the photometry value for each of said plurality of photometry areas based on said colorimetric compensation amount, and determining an exposure amount for the entire object based on the colorimetric compensation amounts for said plurality of photometry areas.

58. The photometry device according to claim 54, wherein said normal light photometry device and said plurality of colorimetric sensors meter light reflected by the object and passed through the photographing optical system of the camera, and wherein said external light sensor meters light reflected by the object but not passed through the photographing optical system of the camera.

59. The photometry device according to claim 58,
wherein said normal light sensor includes a normal light photometry sensor, the spectral sensitivity characteristic of which has a peak sensitivity at a wavelength within a range from 500 nm through 600 nm,
wherein said plurality of colorimetric sensors include a blue light photometry sensor for metering blue light component, a green light photometry sensor for metering green light component, and a red light photometry sensor for metering red light component, and
wherein said external light sensor includes a photometry sensor having photometry areas for metering blue, green and red light components, respectively.

60. The photometry device according to claim 59, wherein said plurality of colorimetric sensors and said normal light sensors include photometric elements having the same photometric characteristics.

61. The photometry device according to claim 60, wherein said normal light photometry system functions as said green light sensor, and wherein output of said green light sensor is used as the output of said normal light photometry sensor.

62. A photometry device for a camera, comprising:
a normal light sensor that performs a photometry operation with respect to an object;
an exposure amount determining system that determines an exposure amount of an object in accordance with an output-of said normal light sensor;
a plurality of colorimetric sensors having spectral sensitivity characteristics different from each other, said plurality of colorimetric sensors performing a colorimetric operation with respect to an image of the object through a lens of said camera;
an external light sensor that measures external light illuminating the object at spectral sensitivity characteristics corresponding to each of said plurality of colorimetric sensors;
a light source color compensation amount calculation system that calculates a light source color compensation amount based on light source data; and
a colorimetric compensation system that compensates for the exposure amount, procedures for compensating for the exposure amount being varied depending on a difference between the exposure value obtained from the output of the external light sensor and the exposure value obtained based on the output of said normal light photometry sensor.

63. The photometry device according to claim 62, wherein said colorimetric compensation system does not substantially compensate for the exposure value if the difference between the exposure value obtained from the output of the external light sensor and the exposure value obtained based on the output of said normal light photometry sensor is greater than a predetermined threshold value.

64. The photometry device according to claim 62, wherein said colorimetric compensation system determines a coefficient used for calculation of colorimetric compensation amount in accordance with the difference between the exposure value obtained from the output of the external light sensor and the exposure value obtained based on the output of said normal light photometry sensor.

65. The photometry device according to claim 62, wherein each of said normal light photometry sensor and said plurality of colorimetric sensors has a plurality of photometry areas, said colorimetric compensation amount calculating system determining a color for each of said plurality of photometry areas and further determining a colorimetric compensation amount for each of said plurality of photometry areas based on the determined color, said colorimetric compensation amount calculating system further compensating for the photometry value for each of said plurality of photometry areas based on said colorimetric compensation amount, and determining an exposure amount for the entire object based on the colorimetric compensation amounts for said plurality of photometry areas.

66. The photometry device according to claim 62, further comprising:
a light source color compensation amount calculation system that calculates a light source color compensation amount based on light source data; and
a colorimetric compensation amount calculation system that determines a color of the object based on the metered values output by said colorimetric sensors and compensated using the light source color compensation amount, and calculates a colorimetric compensation amount based on the judged color.

* * * * *